(12) United States Patent
Hagood et al.

(10) Patent No.: US 7,742,016 B2
(45) Date of Patent: Jun. 22, 2010

(54) DISPLAY METHODS AND APPARATUS

(75) Inventors: Nesbitt W. Hagood, Wellesley, MA (US); Abraham McAllister, Annandale, VA (US); Stephen Lewis, Reading, MA (US); Roger Barton, Andover, MA (US)

(73) Assignee: Pixtronix, Incorporated, Andover, MA (US)

( * ) Notice: Subject to any disclaimer, the term of this patent is extended or adjusted under 35 U.S.C. 154(b) by 1102 days.

(21) Appl. No.: 11/326,784

(22) Filed: Jan. 6, 2006

(65) Prior Publication Data

US 2006/0187190 A1 Aug. 24, 2006

Related U.S. Application Data

(60) Provisional application No. 60/676,053, filed on Apr. 29, 2005, provisional application No. 60/655,827, filed on Feb. 23, 2005.

(51) Int. Cl.
G09G 3/18 (2006.01)
(52) U.S. Cl. ............................. 345/55; 345/84; 345/87; 345/100; 359/290; 359/298
(58) Field of Classification Search ................. 345/48, 345/82–84, 87–88, 90, 76, 92, 95–96, 100, 345/108–109, 204, 214; 359/197–198, 224, 359/230, 233, 290–291, 298
See application file for complete search history.

(56) References Cited

U.S. PATENT DOCUMENTS

| 4,067,043 | A | 1/1978 | Perry |
| 4,074,253 | A | 2/1978 | Nadir |
| 4,564,836 | A | 1/1986 | Vuilleumier et al. |
| 4,582,396 | A | 4/1986 | Bos et al. |
| 4,673,253 | A | 6/1987 | Tanabe et al. |
| 4,728,936 | A | 3/1988 | Guscott et al. |
| 4,744,640 | A | 5/1988 | Phillips |
| 4,958,911 | A | 9/1990 | Beiswenger et al. |
| 4,991,941 | A | 2/1991 | Kalmanash |
| 5,005,108 | A | 4/1991 | Pristash et al. |
| 5,042,900 | A | 8/1991 | Parker |
| 5,050,946 | A | 9/1991 | Hathaway et al. |
| 5,062,689 | A | 11/1991 | Koehler |
| 5,093,652 | A | 3/1992 | Bull et al. |
| 5,128,787 | A | 7/1992 | Blonder |
| 5,136,480 | A | 8/1992 | Pristash et al. |
| 5,142,405 | A | 8/1992 | Hornbeck |

(Continued)

FOREIGN PATENT DOCUMENTS

EP 0 359 450 A2 9/1989

(Continued)

OTHER PUBLICATIONS

Clark et al, "FLC Microdisplays," Ferroelectrics, 246:97-110(2000).
Alt et al, "A Gray-Scale Addressing Technique for Thin-Film-Transistor/Liquid Crystal Displays," IBM J. Res. Develop., 36(1):11-22(Jan. 1992).
Takatori et al, "6:3 Field-Sequential Smectic LCD with TFT Pixel Amplifier," SID 01 Digest, 48-51(2001).
Feenstra et al, "Electrowetting Displays," Liquavista BV, http://www.liquavista.com/documents/electrowetting_displays_whitepaper.pdf, Retrieved on Aug. 17, 2006.
Den Boer, "Active Matrix Liquid Crystal Displays," Elsevier Science & Technology Books, ISBN #07506781365, Aug. 2005.
Lee et al, "P-25: A LCOS Microdisplay Driver with Frame Buffering Pixels," SID 02 Digest, 292-295(2002).

(Continued)

*Primary Examiner*—Richard Hjerpe
*Assistant Examiner*—Mansour M Said
(74) *Attorney, Agent, or Firm*—Ropes & Gray LLP

(57) ABSTRACT

The invention relates to methods and apparatus for forming images on a display utilizing a control matrix to control the movement of MEMs-based light modulators.

22 Claims, 21 Drawing Sheets

U.S. PATENT DOCUMENTS

| | | |
|---|---|---|
| 5,198,730 A | 3/1993 | Vancil |
| 5,202,950 A | 4/1993 | Arego et al. |
| 5,233,459 A | 8/1993 | Bozler et al. |
| 5,319,491 A | 6/1994 | Selbrede |
| 5,339,179 A | 8/1994 | Rudisill et al. |
| 5,396,350 A | 3/1995 | Beeson et al. |
| 5,416,631 A | 5/1995 | Yagi |
| 5,440,197 A | 8/1995 | Gleckman |
| 5,465,175 A | 11/1995 | Woodgate et al. |
| 5,467,104 A | 11/1995 | Furness, III et al. |
| 5,479,279 A | 12/1995 | Barbier et al. |
| 5,493,439 A | 2/1996 | Engle |
| 5,519,565 A | 5/1996 | Kalt et al. |
| 5,528,262 A | 6/1996 | McDowall et al. |
| 5,559,389 A | 9/1996 | Spindt et al. |
| 5,568,964 A | 10/1996 | Parker et al. |
| 5,578,185 A | 11/1996 | Bergeropn et al. |
| 5,579,035 A | 11/1996 | Beiswenger |
| 5,579,240 A | 11/1996 | Buus |
| 5,596,339 A | 1/1997 | Furness, III et al. |
| 5,613,751 A | 3/1997 | Parker et al. |
| 5,618,096 A | 4/1997 | Parker et al. |
| 5,619,266 A | 4/1997 | Tomita et al. |
| 5,655,832 A | 8/1997 | Pelka et al. |
| 5,659,327 A | 8/1997 | Furness, III et al. |
| 5,666,226 A | 9/1997 | Ezra et al. |
| 5,684,354 A | 11/1997 | Gleckman |
| 5,691,695 A | 11/1997 | Lahiff |
| 5,731,802 A | 3/1998 | Aras et al. |
| 5,745,203 A | 4/1998 | Valliath et al. |
| 5,745,281 A | 4/1998 | Yi et al. |
| 5,771,321 A | 6/1998 | Stern |
| 5,781,331 A | 7/1998 | Carr et al. |
| 5,784,189 A | 7/1998 | Bozler et al. |
| 5,794,761 A | 8/1998 | Renaud et al. |
| 5,801,792 A | 9/1998 | Smith et al. |
| 5,835,255 A | 11/1998 | Miles |
| 5,854,872 A | 12/1998 | Tai |
| 5,867,302 A | 2/1999 | Fleming |
| 5,876,107 A | 3/1999 | Parker et al. |
| 5,884,872 A | 3/1999 | Greenhalgh |
| 5,889,625 A | 3/1999 | Chen et al. |
| 5,894,686 A | 4/1999 | Parker et al. |
| 5,895,115 A | 4/1999 | Parker et al. |
| 5,921,652 A | 7/1999 | Parker et al. |
| 5,936,596 A | 8/1999 | Yoshida et al. |
| 5,953,469 A | 9/1999 | Zhou |
| 5,975,711 A | 11/1999 | Parker et al. |
| 5,986,628 A | 11/1999 | Tuenge et al. |
| 5,986,796 A | 11/1999 | Miles |
| 5,990,990 A | 11/1999 | Crabtree |
| 6,008,781 A | 12/1999 | Furness, III et al. |
| 6,008,929 A | 12/1999 | Akimoto et al. |
| 6,028,656 A | 2/2000 | Buhrer et al. |
| 6,030,089 A | 2/2000 | Parker et al. |
| 6,034,807 A | 3/2000 | Little et al. |
| 6,040,796 A | 3/2000 | Matsugatani et al. |
| 6,040,937 A | 3/2000 | Miles |
| 6,046,840 A | 4/2000 | Huibers |
| 6,055,090 A | 4/2000 | Miles |
| 6,079,838 A | 6/2000 | Parker et al. |
| 6,158,867 A | 12/2000 | Parker et al. |
| 6,162,657 A | 12/2000 | Schiele et al. |
| 6,168,395 B1 | 1/2001 | Quenzer et al. |
| 6,174,064 B1 | 1/2001 | Kalantar et al. |
| 6,201,633 B1 | 3/2001 | Peeters et al. |
| 6,201,664 B1 | 3/2001 | Le et al. |
| 6,206,550 B1 | 3/2001 | Fukushima et al. |
| 6,219,119 B1 | 4/2001 | Nakai |
| 6,225,991 B1 | 5/2001 | McKnight |
| 6,249,370 B1 | 6/2001 | Takeuchi et al. |
| 6,266,240 B1 | 7/2001 | Urban et al. |
| 6,282,951 B1 | 9/2001 | Loga et al. |
| 6,285,270 B1 | 9/2001 | Lane et al. |
| 6,288,824 B1 | 9/2001 | Kastalsky |
| 6,296,383 B1 | 10/2001 | Henningsen |
| 6,300,154 B2 | 10/2001 | Clark et al. |
| 6,317,103 B1 | 11/2001 | Furness, III et al. |
| 6,323,834 B1 | 11/2001 | Colgan et al. |
| 6,329,967 B1 | 12/2001 | Little et al. |
| 6,367,940 B1 | 4/2002 | Parker et al. |
| 6,388,661 B1 | 5/2002 | Richards |
| 6,402,335 B1 | 6/2002 | Kalantar et al. |
| 6,424,329 B1 | 7/2002 | Okita |
| 6,429,625 B1 | 8/2002 | LeFevre et al. |
| 6,471,879 B2 | 10/2002 | Hanson et al. |
| 6,473,220 B1 | 10/2002 | Clikeman et al. |
| 6,476,886 B2 | 11/2002 | Krusius et al. |
| 6,483,613 B1 | 11/2002 | Woodgate et al. |
| 6,498,685 B1 | 12/2002 | Johnson |
| 6,504,985 B2 | 1/2003 | Parker et al. |
| 6,507,138 B1 | 1/2003 | Rodgers et al. |
| 6,508,563 B2 | 1/2003 | Parker et al. |
| 6,523,961 B2 | 2/2003 | Ilkov et al. |
| 6,529,265 B1 | 3/2003 | Henningsen |
| 6,531,947 B1 | 3/2003 | Weaver et al. |
| 6,535,256 B1 | 3/2003 | Ishihara et al. |
| 6,535,311 B1 | 3/2003 | Lindquist |
| 6,556,258 B1 | 4/2003 | Yoshida et al. |
| 6,556,261 B1 | 4/2003 | Krusius et al. |
| 6,559,827 B1 | 5/2003 | Mangerson |
| 6,567,063 B1 | 5/2003 | Okita |
| 6,567,138 B1 | 5/2003 | Krusius et al. |
| 6,574,033 B1 | 6/2003 | Chui et al. |
| 6,582,095 B1 | 6/2003 | Toyoda |
| 6,589,625 B1 | 7/2003 | Kothari et al. |
| 6,591,049 B2 | 7/2003 | Williams et al. |
| 6,593,677 B2 | 7/2003 | Behin et al. |
| 6,600,474 B1 | 7/2003 | Heines et al. |
| 6,639,570 B2 | 10/2003 | Furness, III et al. |
| 6,639,572 B1 | 10/2003 | Little et al. |
| 6,650,455 B2 | 11/2003 | Miles |
| 6,650,822 B1 | 11/2003 | Zhou |
| 6,671,078 B2 | 12/2003 | Flanders et al. |
| 664,562 A1 | 1/2004 | Miles |
| 6,674,562 B1 | 1/2004 | Miles |
| 6,677,709 B1 | 1/2004 | Ma et al. |
| 6,680,792 B2 | 1/2004 | Miles |
| 6,690,422 B1 | 2/2004 | Daly et al. |
| 6,701,039 B2 | 3/2004 | Bourgeois et al. |
| 6,707,176 B1 | 3/2004 | Rodgers |
| 6,710,538 B1 | 3/2004 | Ahn et al. |
| 6,710,908 B2 | 3/2004 | Miles et al. |
| 6,710,920 B1 | 3/2004 | Mashitani et al. |
| 6,712,071 B1 | 3/2004 | Parker et al. |
| 6,731,355 B2 | 5/2004 | Miyashita |
| 6,731,492 B2 | 5/2004 | Goodwin-Johansson |
| 6,733,354 B1 | 5/2004 | Cathey et al. |
| 6,738,177 B1 | 5/2004 | Gutierrez et al. |
| 6,741,377 B2 | 5/2004 | Miles |
| 6,749,312 B2 | 6/2004 | Parker et al. |
| 6,750,930 B2 | 6/2004 | Yoshii et al. |
| 6,752,505 B2 | 6/2004 | Parker et al. |
| 6,755,547 B2 | 6/2004 | Parker |
| 6,762,743 B2 | 7/2004 | Yoshihara et al. |
| 6,762,868 B2 | 7/2004 | Liu et al. |
| 6,764,796 B2 | 7/2004 | Fries |
| 6,774,964 B2 | 8/2004 | Funamoto et al. |
| 6,775,048 B1 | 8/2004 | Starkweather et al. |
| 6,785,454 B2 | 8/2004 | Abe |
| 6,788,371 B2 | 9/2004 | Tanada et al. |
| 6,794,119 B2 | 9/2004 | Miles |
| 6,796,668 B2 | 9/2004 | Parker et al. |
| 6,798,935 B2 | 9/2004 | Bourgeois et al. |

| | | | | | |
|---|---|---|---|---|---|
| 6,819,465 B2 | 11/2004 | Clikeman et al. | 2002/0126387 A1 | 9/2002 | Ishikawa et al. |
| 6,825,470 B1 | 11/2004 | Bawolek et al. | 2002/0141174 A1 | 10/2002 | Parker et al. |
| 6,827,456 B2 | 12/2004 | Parker et al. | 2002/0163482 A1 | 11/2002 | Sullivan |
| 6,831,678 B1 | 12/2004 | Travis | 2002/0163484 A1 | 11/2002 | Furness, III et al. |
| 6,835,111 B2 | 12/2004 | Ahn et al. | 2002/0171327 A1 | 11/2002 | Miller et al. |
| 6,846,082 B2 | 1/2005 | Glent-Madsen et al. | 2002/0185699 A1 | 12/2002 | Reid |
| 6,847,425 B2 | 1/2005 | Tanada et al. | 2002/0196522 A1 | 12/2002 | Little et al. |
| 6,857,751 B2 | 2/2005 | Penn et al. | 2003/0007344 A1 | 1/2003 | Parker |
| 6,863,219 B1 | 3/2005 | Jacobsen et al. | 2003/0009898 A1 | 1/2003 | Slocum et al. |
| 6,864,618 B2 | 3/2005 | Miller et al. | 2003/0029705 A1 | 2/2003 | Qiu et al. |
| 6,867,192 B1 | 3/2005 | Armour | 2003/0036215 A1 | 2/2003 | Reid |
| 6,867,896 B2 | 3/2005 | Miles | 2003/0043157 A1 | 3/2003 | Miles |
| 6,879,307 B1 | 4/2005 | Stern | 2003/0048036 A1 | 3/2003 | Lemkin |
| 6,886,956 B2 | 5/2005 | Parker et al. | 2003/0058543 A1 | 3/2003 | Sheedy et al. |
| 6,887,202 B2 | 5/2005 | Currie et al. | 2003/0076649 A1 | 4/2003 | Speakman |
| 6,888,678 B2 | 5/2005 | Nishiyama et al. | 2003/0085650 A1 | 5/2003 | Cathey et al. |
| 6,897,164 B2 | 5/2005 | Baude et al. | 2003/0085867 A1 | 5/2003 | Grabert |
| 6,900,072 B2 | 5/2005 | Patel et al. | 2003/0095081 A1 | 5/2003 | Furness, III et al. |
| 6,906,847 B2 | 6/2005 | Huibers et al. | 2003/0095398 A1 | 5/2003 | Parker et al. |
| 6,911,891 B2 | 6/2005 | Qiu et al. | 2003/0102810 A1 | 6/2003 | Cross et al. |
| 6,911,964 B2 | 6/2005 | Lee et al. | 2003/0123245 A1 | 7/2003 | Parker et al. |
| 6,919,981 B2 | 7/2005 | Clikeman et al. | 2003/0123246 A1 | 7/2003 | Parker |
| 6,934,080 B2 | 8/2005 | Saccomanno et al. | 2003/0123247 A1 | 7/2003 | Parker et al. |
| 6,936,968 B2 | 8/2005 | Cross et al. | 2003/0128218 A1 | 7/2003 | Struyk |
| 6,939,013 B2 | 9/2005 | Asao | 2003/0133284 A1 | 7/2003 | Chipchase et al. |
| 6,940,631 B2 | 9/2005 | Ishikawa | 2003/0137499 A1 | 7/2003 | Iisaka |
| 6,943,495 B2 | 9/2005 | Ma et al. | 2003/0156422 A1 | 8/2003 | Tatewaki et al. |
| 6,947,107 B2 | 9/2005 | Yoshii et al. | 2003/0174422 A1 | 9/2003 | Miller et al. |
| 6,953,375 B2 | 10/2005 | Ahn et al. | 2003/0174931 A1 | 9/2003 | Rodgers et al. |
| 6,962,419 B2 | 11/2005 | Huibers | 2003/0184189 A1 | 10/2003 | Sinclair |
| 6,965,375 B1 | 11/2005 | Gettemy et al. | 2003/0190535 A1 | 10/2003 | Fries |
| 6,969,635 B2 | 11/2005 | Patel et al. | 2003/0190536 A1 | 10/2003 | Fries |
| 7,004,610 B2 | 2/2006 | Yamashita et al. | 2003/0202338 A1 | 10/2003 | Parker |
| 7,004,611 B2 | 2/2006 | Parker et al. | 2003/0231160 A1 | 12/2003 | Yoshihara et al. |
| 7,012,726 B1 | 3/2006 | Miles | 2004/0012946 A1 | 1/2004 | Parker et al. |
| 7,012,732 B2 | 3/2006 | Miles | 2004/0058532 A1 | 3/2004 | Miles et al. |
| 7,014,349 B2 | 3/2006 | Shinohara et al. | 2004/0080240 A1 | 4/2004 | Miller et al. |
| 7,042,618 B2 | 5/2006 | Selbrede et al. | 2004/0080484 A1 | 4/2004 | Heines et al. |
| 7,042,643 B2 | 5/2006 | Miles | 2004/0080927 A1 | 4/2004 | Parker et al. |
| 7,046,905 B1 | 5/2006 | Gardiner et al. | 2004/0085749 A1 | 5/2004 | Parker et al. |
| 7,050,035 B2 | 5/2006 | Iisaka et al. | 2004/0090144 A1 | 5/2004 | Miller et al. |
| 7,123,796 B2 | 10/2006 | Steckl et al. | 2004/0095739 A1 | 5/2004 | Parker et al. |
| 7,140,751 B2 | 11/2006 | Lin | 2004/0100677 A1 | 5/2004 | Huibers et al. |
| 7,227,677 B2 | 6/2007 | Ravnkilde at al. | 2004/0114346 A1 | 6/2004 | Parker et al. |
| 7,271,945 B2 | 9/2007 | Hagood et al. | 2004/0122328 A1 | 6/2004 | Wang et al. |
| 7,274,416 B2 | 9/2007 | Feenstra et al. | 2004/0125062 A1 | 7/2004 | Yamamoto et al. |
| 7,304,785 B2 | 12/2007 | Hagood et al. | 2004/0125346 A1 | 7/2004 | Huibers |
| 7,304,786 B2 | 12/2007 | Hagood et al. | 2004/0135273 A1 | 7/2004 | Parker et al. |
| 7,365,897 B2 | 4/2008 | Hagood et al. | 2004/0135951 A1 | 7/2004 | Stumbo et al. |
| 7,391,552 B2 | 6/2008 | Barton et al. | 2004/0136204 A1 | 7/2004 | Asao |
| 7,405,852 B2 | 7/2008 | Brosnihan et al. | 2004/0136680 A1 | 7/2004 | Medina et al. |
| 7,417,782 B2 | 8/2008 | Hagood et al. | 2004/0145580 A1 | 7/2004 | Perlman |
| 7,460,290 B2 | 12/2008 | Hagood, IV et al. | 2004/0157664 A1 | 8/2004 | Link |
| 7,502,159 B2 | 3/2009 | Hagood, IV et al. | 2004/0165372 A1 | 8/2004 | Parker |
| 2001/0001260 A1 | 5/2001 | Parker et al. | 2004/0171206 A1 | 9/2004 | Rodgers |
| 2001/0028993 A1 | 10/2001 | Sanford | 2004/0179146 A1 | 9/2004 | Nilsson |
| 2001/0040538 A1 | 11/2001 | Quanrud | 2004/0196215 A1 | 10/2004 | Duthaler et al. |
| 2001/0043208 A1 | 11/2001 | Furness, III et al. | 2004/0207768 A1 | 10/2004 | Liu |
| 2001/0053075 A1 | 12/2001 | Parker et al. | 2004/0218149 A1 | 11/2004 | Huibers |
| 2002/0001051 A1 | 1/2002 | Krusius et al. | 2004/0218154 A1 | 11/2004 | Huibers |
| 2002/0009275 A1 | 1/2002 | Williams et al. | 2004/0218292 A1 | 11/2004 | Huibers |
| 2002/0015215 A1 | 2/2002 | Miles | 2004/0218293 A1 | 11/2004 | Huibers |
| 2002/0024641 A1 | 2/2002 | Ilkov et al. | 2004/0223088 A1 | 11/2004 | Huibers |
| 2002/0024711 A1 | 2/2002 | Miles | 2004/0223240 A1 | 11/2004 | Huibers |
| 2002/0047172 A1 | 4/2002 | Reid | 2004/0227428 A1 | 11/2004 | Sinclair |
| 2002/0054424 A1 | 5/2002 | Miles | 2004/0233392 A1 | 11/2004 | Huibers |
| 2002/0054487 A1 | 5/2002 | Parker et al. | 2004/0240032 A1 | 12/2004 | Miles |
| 2002/0056900 A1 | 5/2002 | Liu et al. | 2004/0246275 A1 | 12/2004 | Yoshihara et al. |
| 2002/0063661 A1 | 5/2002 | Comiskey et al. | 2004/0263944 A1 | 12/2004 | Miles et al. |
| 2002/0070931 A1 | 6/2002 | Ishikawa | 2005/0002082 A1 | 1/2005 | Miles |
| 2002/0075555 A1 | 6/2002 | Miles | 2005/0002086 A1 | 1/2005 | Starkweather et al. |
| 2002/0080598 A1 | 6/2002 | Parker et al. | 2005/0007759 A1 | 1/2005 | Parker |
| 2002/0126364 A1 | 9/2002 | Miles | 2005/0024849 A1 | 2/2005 | Parker et al. |

| | | |
|---|---|---|
| 2005/0052681 A1 | 3/2005 | Kogi |
| 2005/0059184 A1 | 3/2005 | Sniegowski et al. |
| 2005/0062708 A1 | 3/2005 | Yoshihara et al. |
| 2005/0063037 A1 | 3/2005 | Selebrede et al. |
| 2005/0072032 A1 | 4/2005 | McCollum et al. |
| 2005/0088404 A1 | 4/2005 | Heines et al. |
| 2005/0093465 A1 | 5/2005 | Yonekubo et al. |
| 2005/0094240 A1 | 5/2005 | Huibers et al. |
| 2005/0094418 A1 | 5/2005 | Parker |
| 2005/0104804 A1 | 5/2005 | Feenstra et al. |
| 2005/0111238 A1 | 5/2005 | Parker |
| 2005/0111241 A1 | 5/2005 | Parker |
| 2005/0116798 A1 | 6/2005 | Bintoro et al. |
| 2005/0122560 A1 | 6/2005 | Sampsell et al. |
| 2005/0122591 A1 | 6/2005 | Parker et al. |
| 2005/0123243 A1 | 6/2005 | Steckl et al. |
| 2005/0134805 A1 | 6/2005 | Conner et al. |
| 2005/0141076 A1 | 6/2005 | Bausenwein et al. |
| 2005/0151940 A1 | 7/2005 | Asao |
| 2005/0157365 A1 | 7/2005 | Ravnkilde et al. |
| 2005/0157376 A1 | 7/2005 | Huibers et al. |
| 2005/0168789 A1 | 8/2005 | Glent-Madsen |
| 2005/0171408 A1 | 8/2005 | Parker |
| 2005/0195468 A1 | 9/2005 | Sampsell |
| 2005/0207154 A1 | 9/2005 | Parker |
| 2005/0207178 A1 | 9/2005 | Parker |
| 2005/0212734 A1 | 9/2005 | Kimura |
| 2005/0213183 A9 | 9/2005 | Miles |
| 2005/0213322 A1 | 9/2005 | Parker |
| 2005/0213323 A1 | 9/2005 | Parker |
| 2005/0213349 A1 | 9/2005 | Parker |
| 2005/0219679 A1 | 10/2005 | Ishikawa |
| 2005/0219680 A1 | 10/2005 | Ishikawa |
| 2005/0225501 A1 | 10/2005 | Srinivasan et al. |
| 2005/0225519 A1 | 10/2005 | Naugler, Jr. |
| 2005/0225732 A1 | 10/2005 | Conner et al. |
| 2005/0225827 A1 | 10/2005 | Kastalsky |
| 2005/0237596 A1 | 10/2005 | Selbrede |
| 2005/0242710 A1 | 11/2005 | Yamazaki et al. |
| 2005/0243023 A1 | 11/2005 | Reddy et al. |
| 2005/0244099 A1 | 11/2005 | Pasch et al. |
| 2005/0244949 A1 | 11/2005 | Miles |
| 2005/0245313 A1 | 11/2005 | Yoshino et al. |
| 2005/0258571 A1 | 11/2005 | Dumond et al. |
| 2005/0259198 A1 | 11/2005 | Lubart et al. |
| 2005/0286114 A1 | 12/2005 | Miles |
| 2006/0028811 A1 | 2/2006 | Ross |
| 2006/0028817 A1 | 2/2006 | Parker |
| 2006/0028840 A1 | 2/2006 | Parker |
| 2006/0028841 A1 | 2/2006 | Parker |
| 2006/0028843 A1 | 2/2006 | Parker |
| 2006/0028844 A1 | 2/2006 | Parker |
| 2006/0033975 A1 | 2/2006 | Miles |
| 2006/0044246 A1 | 3/2006 | Mignard |
| 2006/0044928 A1 | 3/2006 | Chui et al. |
| 2006/0092490 A1 | 5/2006 | McCollum et al. |
| 2006/0187190 A1 | 8/2006 | Hagood et al. |
| 2006/0187191 A1 | 8/2006 | Hagood et al. |
| 2006/0209000 A1 | 9/2006 | Sumiyoshi et al. |
| 2006/0209012 A1 | 9/2006 | Hagood |
| 2006/0250325 A1 | 11/2006 | Hagood et al. |
| 2006/0250676 A1 | 11/2006 | Hagood |
| 2006/0256039 A1 | 11/2006 | Hagood et al. |
| 2006/0262060 A1 | 11/2006 | Amundson |
| 2006/0291774 A1 | 12/2006 | Schoellmann et al. |
| 2007/0052660 A1* | 3/2007 | Montbach et al. ........... 345/102 |
| 2007/0053652 A1 | 3/2007 | Mignard et al. |
| 2007/0086078 A1 | 4/2007 | Hagood et al. |
| 2007/0091038 A1 | 4/2007 | Hagood et al. |
| 2007/0205969 A1 | 9/2007 | Hagood et al. |
| 2007/0216987 A1 | 9/2007 | Hagood et al. |
| 2007/0279727 A1 | 12/2007 | Gandhi et al. |
| 2008/0030827 A1 | 2/2008 | Hagood et al. |
| 2008/0037104 A1 | 2/2008 | Hagood et al. |
| 2008/0062500 A1 | 3/2008 | Hagood |
| 2008/0094853 A1 | 4/2008 | Kim et al. |
| 2008/0123175 A1 | 5/2008 | Hagood et al. |
| 2008/0129681 A1 | 6/2008 | Hagood et al. |
| 2008/0145527 A1 | 6/2008 | Hagood et al. |
| 2008/0158635 A1 | 7/2008 | Hagood et al. |
| 2008/0158636 A1 | 7/2008 | Hagood et al. |
| 2008/0165122 A1 | 7/2008 | Duthaler et al. |
| 2008/0174532 A1 | 7/2008 | Lewis |
| 2008/0278798 A1 | 11/2008 | Hagood et al. |
| 2008/0283175 A1 | 11/2008 | Hagood et al. |
| 2009/0034052 A1 | 2/2009 | Hagood et al. |

FOREIGN PATENT DOCUMENTS

| | | |
|---|---|---|
| EP | 0 415 625 A2 | 3/1991 |
| EP | 0 359 450 B1 | 11/1994 |
| EP | 0 495 273 B1 | 9/1996 |
| EP | 0 415 625 B1 | 1/1997 |
| EP | 0 751 340 A2 | 1/1997 |
| EP | 0 884 525 A2 | 12/1998 |
| EP | 0 751 340 B1 | 5/2000 |
| EP | 1 091 342 | 4/2001 |
| EP | 1 202 096 A2 | 5/2002 |
| EP | 1 426 190 A1 | 6/2004 |
| EP | 1 429 310 | 6/2004 |
| EP | 1 471 495 | 10/2004 |
| FR | 2 726 135 | 10/1994 |
| JP | 03-142409 | 6/1991 |
| JP | 04-249203 | 9/1992 |
| JP | 09-198906 | 7/1997 |
| JP | 11-015393 | 1/1999 |
| JP | 2002-318564 A | 10/2002 |
| JP | 2003-162904 | 6/2003 |
| WO | WO 94/01716 | 1/1994 |
| WO | WO-97/04436 | 2/1997 |
| WO | WO 98/04950 | 2/1998 |
| WO | WO 99/01696 | 1/1999 |
| WO | WO 00/50807 | 8/2000 |
| WO | WO 03/008860 A1 | 1/2003 |
| WO | WO 03/050448 A1 | 7/2003 |
| WO | WO 03/061329 A2 | 7/2003 |
| WO | WO 2004/019120 A1 | 3/2004 |
| WO | WO 2004/086098 A2 | 10/2004 |
| WO | WO-2004/088629 | 10/2004 |
| WO | WO 2005/001892 A2 | 1/2005 |
| WO | WO 2005/062908 A2 | 7/2005 |
| WO | WO-2005/073950 | 8/2005 |
| WO | WO 2006/023077 A2 | 3/2006 |
| WO | WO 2006/039315 A2 | 4/2006 |
| WO | WO 2006/052755 A2 | 5/2006 |

OTHER PUBLICATIONS

McLaughlin, "Progress in Projection and Large-Area Displays," Proceedings of the IEEE, 90(4):521-532(Apr. 2002).

Sato, "Research on Flexible Display Systems," Broadcast Technology, 21:10-15(2005).

Doane, et al, "Display Technologies in Russia, Ukraine, and Belarus," World Technology Evaluation Center Panel Report (Dec. 1994).

Kuang et al, "Dynamic Characteristics of shaped micro-actuators solved using the differential quadrature method," J. Micromech. Microeng. 14:647-655(2004).

Li et al, "Drie-Fabricated Curved-Electrode Zipping Actuators with Low Pull-In Voltage," IEE, 480-483 (2003).

Legtenberg et al, "Electrostatic Curved Electrode Actuators," Journal of Microelectromechanical Systems, 6:3(257-265)(Sep. 1997).

Steyn, Lodewyck, "Electroquasistatic Zipper Actuators: A Technology Review", Dec. 2004.

Okumura et al, "Highly-efficient backlight for liquid crystal display having no optical films," Applied Physics Letters, 83(13):2515-2517(Sep. 2003).

Feng et al, "Novel integrated light-guide plates for liquid crystal display backlight," J. Opt. A: Pure Appl. Opt., 7:111-117(2005).

Funamoto et al, "Diffusive-sheetless Backlight System for Mobile Phone," IDW/AD, 1277-1280(2005).

Kalantar et al, "Optical Micro Deflector Based Functional Light-Guide Plate for Backlight Unit," SID 00 Digest, 1029-1031(2000).

Sharp Specification No. LCP-03015 for Mobile Liquid Crystal Display Group, Sharp Corporation, Jun. 13, 2003.

Tien et al, "MEMS Actuators for Silicon Micro-Optical Elements," Proc. of SPIE, 4178:256-269, (2000).

"Prism Brightness Enhancement Films," 3M Corporation, http://products3.3m.com/catalog/us/en001/electronics_mfg/vikuiti/node_V6Q78RBQ5Tbe/root_GST1T4S9TCgv/vroot_S6Q2FD9X0Jge/gvel_GD378D0HGJgl/theme_us_vikuiti_3_0/command_AbcPageHandler/output_html Retrieved on Aug. 3, 2006.

"BLU," Heesung Precision Ltd., http://www.hspr.co.kr/eng/product/blu.asp Retrieved on Aug. 3, 2006.

Teijido, J.M., "Conception and Design of Illumination Light Pipes," Thesis No. 1498 for University of Neuchatel, http://www.unige.ch/cyberdocuments/unine/theses2000/TeijidoJM/these_front.htm 1:1-99 Retrieved on Aug. 3, 2006.

"Prism Sheet," Mitsubishi Rayon America Inc., http://www.mrany.com/data/HTML/29.htm Retrieved on Aug. 4, 2006.

"Two Proprietary Technologies Supporting OMRON Backlight," OMRON Electronics Corporation, http:/www.omron.co.jp/ecb/products/bklight/english/genri/index.html Retrieved on Aug. 3, 2006.

"MicroLens™—Re-Inventing LCD Backlighting," Global Lighting Technologies Inc., http://www.glthome.com/tech.htm Retrieved on Aug. 3, 2006.

Liu et al, "Scaling Laws of Microactuators and Potential Applications of Electroactive Polymers in MEMS," SPIE, 3669:345-354(Mar. 1999).

Vangbo et al, "A lateral symmetrically bistable buckled beam," J. Micromech. Microeng., 8:29-32(1998).

Shikida et al, "Fabrication fo an S-shaped Microactuator," Journal of Microelectromechanical Systems, 6(1):18-24(Mar. 1997).

Qiu et al, "A Curved-Beam Bistable Mechanism," Journal of Microelectromechanical Systems, 13(2):137-145(Apr. 2004).

Yasumura et al, "Fluid Damping of an Electrostatic Actuator for Optical Switching Applications," Transducers Research Foundation (2002).

Underwood, "LCoS through the looking glass," SID(2001).

Bouef, "Plasma display panels: physics, recent developments and key issues," J. Phys. D: Appl, Phys., 36:R53-R79(2003).

Yamada et al, "52.2: Invited Paper:Color Sequential LCD Based on OCB with an LED Backlight," SID 00 Digest, 1180-1183(2000).

Jepsen et al, "4.11: 0.9 SXGA Liquid Crystal on Silicon Panel with 450 Hz. Field Rate," MicroDisplay Corporation, 106-109.

Birch et al, "31.1: SXGA Resolution FLC Microdisplays," SID 02 Digest, 954-957(2002).

Koden et al, "Ferroelectric Liquid Crystal Display," (Sep. 17, 1997).

Jones et al, "29-1: Addressing τVmin Ferroelectric Liquid Crystal Displays," (1998).

Akimoto et al, "15.1: A 0.9-in UXGA/HDTV FLC Microdisplay," SID 00 Digest, 194-197(2000).

Bryan-Brown, "Ultra Low Poer Bistable LCDs," SID 00, 76-79(2000).

Hewlett et al, "DLP Cinema™ projection: A hybrid frame-rate technique for flicker-free performance," Journ of the SID 9/3, 221-226(2001).

Underwood, "A review of microdisplay technologies," SID@EID, (Nov. 21-23, 2000).

Blackstone, "Making MEMS Reliable," SPIE's OEMagazine, 32-34(Sep. 2002).

Mastrangelo et al, "Mechanical Stability and Adhesion of Microstructures Under Capillary Forces—Part I: Basic Theory," Journal of Microelectromechanical Systems, 2(1):33-43(Mar. 1993).

Mastrangelo et al, "Mechanical Stability and Adhesion of Microstructures Under Capillary Forces—Part II: Experiments," Journal of Microelectromechanical Systems, 2(1):44-55(Mar. 1993).

Johnstone et al, "Theoretical limits on the freestanding length of cantilevers produced by surface micromachining technology," J. Micromech. Microeng. 12:855-861(2002).

Maboudian et al, "Stiction reduction processes for surface micromachines," Tribology Letters, 3:215-221(1997).

"Electronic Display Lighting Tutorials," 3M Corporation, file?//D:/Optical\Vikuiti Tutorial.htm. retrieved on Aug. 10, 2006.

Roosendaal et al, "25.2: A Wide Gamut, High Aperture Mobile Spectrum Sequential Liquid Crystal Display," SID 05 Digest, 1116-1119(2005).

Feng, "High Quality Light Guide Plates that Can Control the Illumination Angle Based on Microprism Structures," Applied Physics Letters, 85(24):6016-6018(Dec. 2004).

Tagaya et al, "Thin Liquid-Crystal Display Backlight System with Highly Scattering Optical Transmission Polymers," Applied Optics, 40(34):6274-6280(Dec. 2001).

Davis, "Light Emitting Diode Source Modeling for Optical Design," Reflexite Display Optics(Oct. 2004).

Foley, "NE04-21: Microstructured Plastic Optics for Display, Lighting, and Telecommunications Applications," Fresnel Optics(2001).

Hartman, "4.1: Invited paper: Two-Terminal Devices Technologies for AMLCDs," SID 95 Digest, 7-10(1995).

Bozler et al, "Arrays of gated field-emitter cones having 0.32 μm tip-to-tip spacing," J. Vec. Sci. Technol. B, 12(2):629-632(Mar./Apr. 1994).

Goddhue et al, "Bright-field analysis of field-emission cones using high-resolution transmission electron microscopy and the effect of structural properties on current stability," J. Vac. Sci. Technol. B, 12(2):693-696(Mar. Apr. 1994).

Liang et al, "Observation of electric field gradients near field-emission cathode arrays," Appl Phys. Lett., 66(9):1147-1149(Feb. 1995).

Kalantar, "Modulation of viewing angle on an LCD surface through backlight optics," Journal of the SID, 11(4):647-652(2003).

"Microprism Technology for Liminaires," Reflexite Corporation, Technical Publication RLO-181, Rev. 2 (2003).

"Optical Design Tools for Backlight Displays," Light Tools, Optical Engineering, Publication of ROCOES, 81:90-101 (Jun. 2003).

AZ Displays, Inc., "Complete LCD Solutions," ATM3224C-NC-FTH, pp. 1-15 (Oct. 2, 2003).

International Search Report from PCT/US2007/013277 filed on Jun. 5, 2007.

Davis, "Microstructured Optics for LED Applications," Reflexite Display Optics (2002).

Hornbeck, J., "Digital Light Processing™: A New Mems-Based Display Technology," Technical Digest of the IEEJ 14th Sensor Symposium, pp. 297-304 (Jun. 4-5, 1996).

Perregaux, et al, "Arrays of Addressable High-Speed Optical Microshutters," CSEM Swiss Center for Electronics and Microtechnology Inc., Microsystems Division, pp. 232-235 (2001).

Qui et al, "A High-Current Electrothermal Bistable MEMS Relay," Micro Electro Mechanical Systems, MEMS-03 Kyoto, pp. 64-67 (Jan. 19-23, 2003).

Ravnkilde, J., et al. "Fabrication of Nickel Microshutter Arrays for Spatial Light Modulation," Mesomechanics, pp. 161-165 (2002). Also on their web site: http://www2.mic.dtu.dk/research/mems/publications/Papers/Dicon_Meso2002.pdf.

Wang et al, "Highly Space-Efficient Electrostatic Zigzag Transmissive Micro-Optic Switches for an Integrated MEMS Optical Display System," Transducers 03 Conference, 1:575-575 (Jun. 8-12, 2003).

Jepsen et al, "4.11: 0.9" SXGA Liquid Crystal on Silicon Panel with 450 Hz. Field Rate, MicroDisplay Coropration, 106-109 (Sep. 2001).

* cited by examiner

DISPLAY METHODS AND APPARATUS

CROSS-REFERENCE TO RELATED APPLICATIONS

The instant application claims priority from provisional application No. 60/655,827, filed Feb. 23, 2005 and provisional application No. 60/676,053, filed Apr. 29, 2005, the disclosures of which are incorporated herein by reference in their entirety.

FIELD OF THE INVENTION

In general, the invention relates to the field of imaging displays, in particular, the invention relates to circuits for controlling light modulators incorporated into imaging displays.

BACKGROUND OF THE INVENTION

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications. Backlit displays using mechanical light modulators have not yet demonstrated sufficiently attractive combinations of brightness and low power. There is a need in the art for fast, bright, low-powered mechanically actuated displays. Specifically there is a need for mechanically actuated displays that can be driven at high speeds and at low voltages for improved image quality and reduced power consumption.

SUMMARY OF THE INVENTION

The power needed to operate a display can be reduced, in part, by taking advantage of asymmetries in capacitance of various elements in the display. The display includes an array of pixels. In particular, each pixel in the display includes at least one actuator, which has two electrodes. One electrode has a higher capacitance than the other. In addition, of the signals used to address and actuate the pixels in the display, some signals experience larger swings in voltage magnitude than other signals and some signals are switched more frequently than others. Driving these higher-magnitude or higher-frequency voltages on the lower capacitance electrode of each pixel improves power management.

More particularly, in one aspect, the invention relates to a display apparatus that includes a shutter assembly and a control matrix. The shutter assembly includes a shutter and a drive electrode. The shutter assembly and drive electrode have significantly different capacitances. The shutter assembly is configures such that in response to the generation of a potential difference between the shutter and the drive electrode, the shutter is electrostatically drawn towards the drive electrode. In one embodiment, the shutter assembly includes a mechanical support for substantially limiting the range of motion of the shutter to a plane parallel to a substrate upon which the shutter assembly is constructed.

The control matrix includes a first voltage interconnect for applying a first voltage having a first magnitude to either the shutter or the drive electrode. The control matrix also includes a second voltage interconnect for applying a second voltage having a second magnitude to either the shutter or drive electrode. Assuming the shutter has a higher capacitance than the drive electrode, the first voltage interconnect connects to the shutter and the second voltage interconnect connects to the drive electrode if the magnitude of the voltage applied by the first voltage interconnect is smaller than the magnitude applied by the second voltage interconnect. Otherwise, the first voltage interconnect connects to the drive electrode and the second voltage connects to the shutter. Conversely, if the shutter has a lower capacitance than the drive electrode, the first voltage interconnect connects to the shutter and the second voltage interconnect connects to the drive electrode if the magnitude of the voltage applied by the first voltage interconnect is greater than the magnitude applied by the second voltage interconnect.

In one embodiment, the second voltage is at or near ground. In another embodiment, the second voltage varies between ground and about one half the first voltage. The second voltage interconnect may serve as a global actuation interconnect.

In one embodiment, application of the first voltage to the drive electrode opens the shutter. In an alternative embodiment, application of the first voltage to the drive electrode closes the shutter. In yet another embodiment, the application of the first voltage to the drive electrode only moves the shutter (open or closed) in the absence of a voltage applied to shutter via the second voltage interconnect.

In another embodiment, the shutter assembly includes a second drive electrode connected to a third voltage interconnect. Application of the first voltage to the first drive electrode results in the shutter assembly moving the shutter to an open position and application of a third voltage to the second drive electrode closes the shutter. Application of the second voltage, in one embodiment, however, prevents shutter movement.

In a second aspect, the invention relates to a method of forming an image. In one embodiment, the method includes providing a shutter assembly having a shutter and a drive electrode. The shutter and drive electrode have significantly different capacitances. A first voltage is applied to either the shutter or the drive electrode. A second voltage is applied to the other of the shutter or the drive electrode, thereby generating a potential difference between the shutter and the drive electrode. The potential difference draws the shutter towards the drive electrode. The first voltage is higher than the second voltage. Thus, if the shutter has a higher capacitance than the drive electrode, the first voltage is applied to the drive electrode. If the shutter has a lower capacitance than the drive electrode, the first voltage is applied to the shutter.

BRIEF DESCRIPTION OF THE DRAWINGS

The foregoing discussion will be understood more readily from the following detailed description of the invention with reference to the following drawings.

DESCRIPTION OF CERTAIN ILLUSTRATIVE EMBODIMENTS

To provide an overall understanding of the invention, certain illustrative embodiments will now be described, including apparatus and methods for displaying images. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

This application is related to, and incorporates herein by reference, U.S. patent application Ser. No. 11/218,690, filed Sep. 2, 2005, U.S. patent application Ser. No. 11/251,035, filed Oct. 14, 2005, U.S. patent application Ser. No. 11/251,452, filed Oct. 14, 2005, and U.S. patent application Ser. No. 11/251,034, filed Oct. 14, 2005, the disclosures of which are herein incorporated by reference.

Figure 1A:
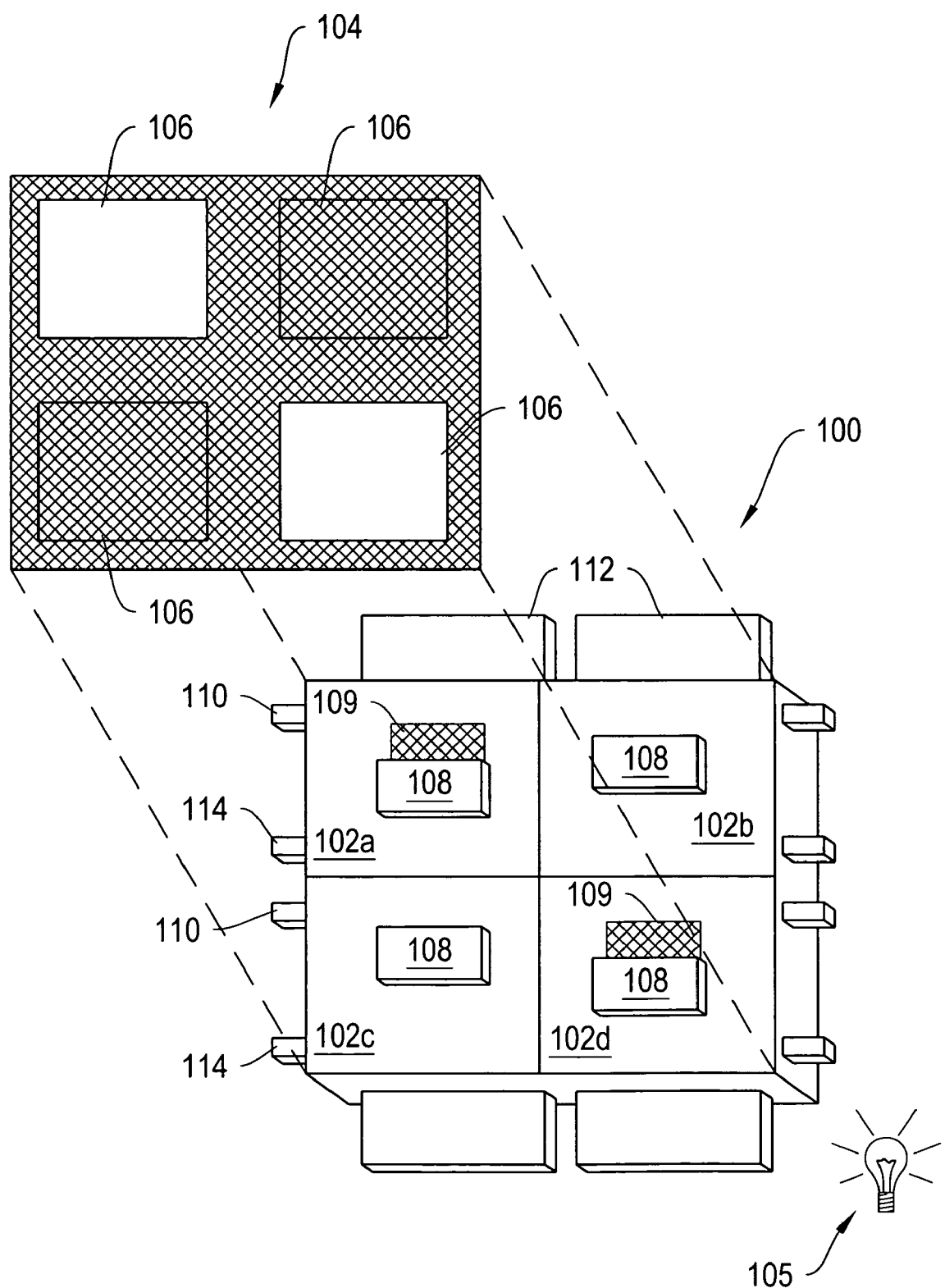
FIG. 1A is an isometric view of display apparatus, according to an illustrative embodiment of the invention.

FIG. 1A is an isometric view of a display apparatus 100, according to an illustrative embodiment of the invention. The display apparatus 100 includes a plurality of light modulators, in particular, a plurality of shutter assemblies 102a-102d (generally "shutter assemblies 102") arranged in rows and columns. In the display apparatus 100, shutter assemblies 102a and 102d are in the open state, allowing light to pass. Shutter assemblies 102b and 102c are in the closed state, obstructing the passage of light. By selectively setting the states of the shutter assemblies 102a-102d, the display apparatus 100 can be utilized to form an image 104 for a projection or backlit display, if illuminated by lamp 105. In another implementation the apparatus 100 may form an image by reflection of ambient light originating from the front of the apparatus.

In the display apparatus 100, each shutter assembly 102 corresponds to a pixel 106 in the image 104. In other implementations, the display apparatus 100 may utilize a plurality of shutter assemblies to form a pixel 106 in the image 104. For example, the display apparatus 100 may include three color-specific shutter assemblies 102. By selectively opening one or more of the color-specific shutter assemblies 102 corresponding to a particular pixel 106, the display apparatus 100 can generate a color pixel 106 in the image 104. In another example, the display apparatus 100 includes two or more shutter assemblies 102 per pixel 106 to provide grayscale in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

Each shutter assembly 102 includes a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each shutter assembly 102.

The display apparatus also includes a control matrix connected to the substrate and to the shutter assemblies for controlling the movement of the shutters. The control matrix includes a series of electrical interconnects (e.g., interconnects 110, 112, and 114), including at least one write-enable interconnect 110 (also referred to as a "scan-line interconnect") per row of pixels, one data interconnect 112 for each column of pixels, and one common interconnect 114 providing a common voltage to all pixels, or at least pixels from both multiple columns and multiples rows in the display apparatus 100. In response to the application of an appropriate voltage (the "write-enabling voltage, $V_{we}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In other implementations, the data voltage pulses control switches, e.g., transistors or other non-linear circuit elements that control the application of separate actuation voltages, which are typically higher in magnitude than the data voltages, to the shutter assemblies 102. The application of these actuation voltages then results in the electrostatic movement of the shutters 108.

Figure 1B:
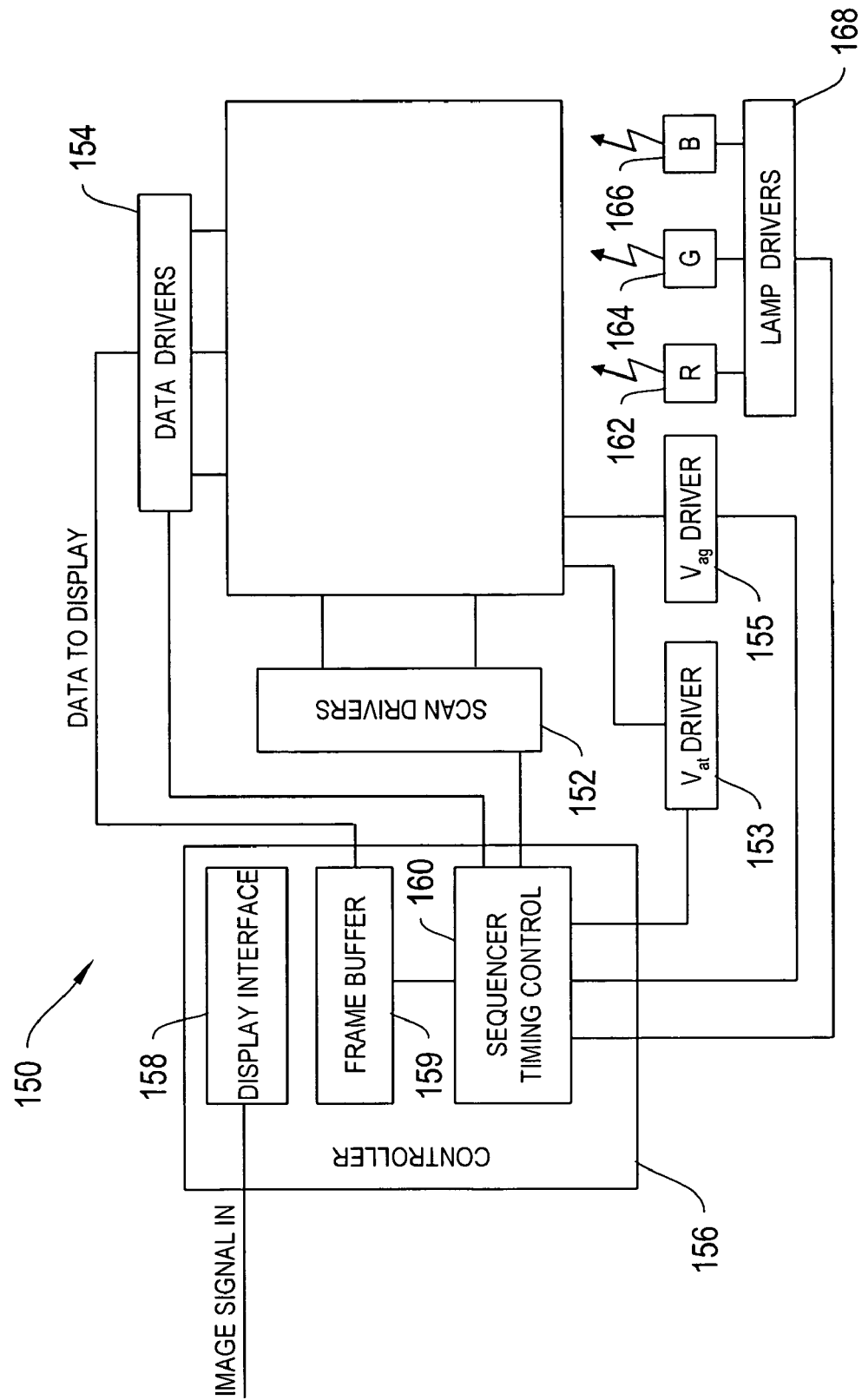
FIG. 1B is a block diagram of the a display apparatus, according to an illustrative embodiment of the invention.

FIG. 1B is a block diagram 150 of the display apparatus 100. In addition to the elements of the display apparatus 100 described above, as depicted in the block diagram 150, the display apparatus 100 includes a plurality of scan drivers 152 (also referred to as "write enabling voltage sources") and a plurality of data drivers 154 (also referred to as "data voltage sources"). The scan drivers 152 apply write enabling voltages to scan-line interconnects 110. The data drivers 154 apply data voltages to the data interconnects 112. In some embodiments of the display apparatus, the data drivers 154 are configured to provide analog data voltages to the shutter assemblies, especially where the gray scale of the image 104 is to be derived in analog fashion. In analog operation the shutter assemblies 102 are designed such that when a range of intermediate voltages is applied through the data interconnects 112 there results a range of intermediate open states in the shutters 108 and therefore a range of intermediate illumination states or gray scales in the image 104.

In other cases the data drivers 154 are configured to apply only a reduced set of 2, 3, or 4 digital voltage levels to the control matrix. These voltage levels are designed to set, in digital fashion, either an open state or a closed state to each of the shutters 108.

The scan drivers 152 and the data drivers 154 are connected to digital controller circuit 156 (also referred to as the "controller 156"). The controller includes a display interface 158 which processes incoming image signals into a digital image format appropriate to the spatial addressing and the gray scale capabilities of the display. The pixel location and gray scale data of each image is stored in a frame buffer 159 so that the data can be fed out as needed to the data drivers 154. The data is sent to the data drivers 154 in mostly serial fashion, organized in predetermined sequences grouped by rows and by image frames. The data drivers 154 can include series to parallel data converters, level shifting, and for some applications digital to analog voltage converters.

All of the drivers (e.g., scan drivers 152, data drivers 154, actuation driver 153 and global actuation driver 155) for different display functions are time-synchronized by a timing-control 160 in the controller 156. Timing commands coordinate the illumination of red, green and blue lamps 162, 164, and 166 via lamp drivers 168, the write-enabling and sequencing of specific rows of the array of pixels, the output of voltages from the data drivers 154, and for the output of voltages that provide for shutter actuation.

The controller 156 determines the sequencing or addressing scheme by which each of the shutters 108 in the array can be re-set to the illumination levels appropriate to a new image 104. New images 104 can be set at periodic intervals. For instance, for video displays, the color images 104 or frames of the video are refreshed at frequencies ranging from 10 to 300 Hertz. In some embodiments the setting of an image frame is synchronized with the illumination of a backlight such that alternate image frames are illuminated with an alternating series of colors, such as red, green, and blue. The image frames for each respective color is referred to as a color sub-frame. In this method, referred to as the field sequential color method, if the color sub-frames are alternated at frequencies in excess of 20 Hz, the human brain will average the alternating frame images into the perception of an image having a broad and continuous range of colors.

If the display apparatus 100 is designed for the digital switching of shutters 108 between open and closed states, the controller 156 can control the addressing sequence and/or the time intervals between image frames to produce images 104 with appropriate gray scale. The process of generating varying levels of grayscale by controlling the amount of time a shutter 108 is open in a particular frame is referred to as time division gray scale. In one embodiment of time division gray scale, the controller 156 determines the time period or the fraction of time within each frame that a shutter 108 is allowed to remain in the open state, according to the illumination level or gray scale desired of that pixel. In another embodiment of time division gray scale, the frame time is split into, for instance, 15 equal time-duration sub-frames according to the illumination levels appropriate to a 4-bit binary gray scale. The controller 156 then sets a distinct image into each of the 15 sub-frames. The brighter pixels of the image are left in the open state for most or all of the 15 sub-frames, and the darker pixels are set in the open state for only a fraction of the sub-frames. In another embodiment of time-division gray scale, the controller circuit 156 alters the duration of a series of sub-frames in proportion to the bit-level significance of a coded gray scale word representing an illumination value. That is, the time durations of the sub-frames can be varied according to the binary series 1, 2, 4, 8 . . . . The shutters 108 for each pixel are then set to either the open or closed state in a particular sub-frame according to the bit value at a corresponding position within the binary word for its intended gray level.

A number of hybrid techniques are available for forming gray scale which combine the time division techniques described above with the use of either multiple shutters 108 per pixel or via the independent control of backlight intensity. These techniques are described further below.

Addressing the control matrix, i.e., supplying control information to the array of pixels, is, in one implementation, accomplished by a sequential addressing of individual lines, sometimes referred to as the scan lines or rows of the matrix. By applying $V_{we}$ to the write-enable interconnect 110 for a given scan line and selectively applying data voltage pulses $V_d$ to the data interconnects 112 for each column, the control matrix can control the movement of each shutter 108 in the write-enabled row. By repeating these steps for each row of pixels in the display apparatus 100, the control matrix can complete the set of movement instructions to each pixel in the display apparatus 100.

In one alternative implementation, the control matrix applies $V_{we}$ to the write-enable interconnects 110 of multiple rows of pixels simultaneously, for example, to take advantage of similarities between movement instructions for pixels in different rows of pixels, thereby decreasing the amount of time needed to provide movement instructions to all pixels in the display apparatus 100. In another alternative implementation, the rows are addressed in a non-sequential, e.g., in a pseudo-randomized order, in order to minimize visual artifacts that are sometimes produced, especially in conjunction with the use of a coded time division gray scale.

In alternative embodiments, the array of pixels and the control matrices that control the pixels incorporated into the array may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

Shutter Assemblies

Figure 2:
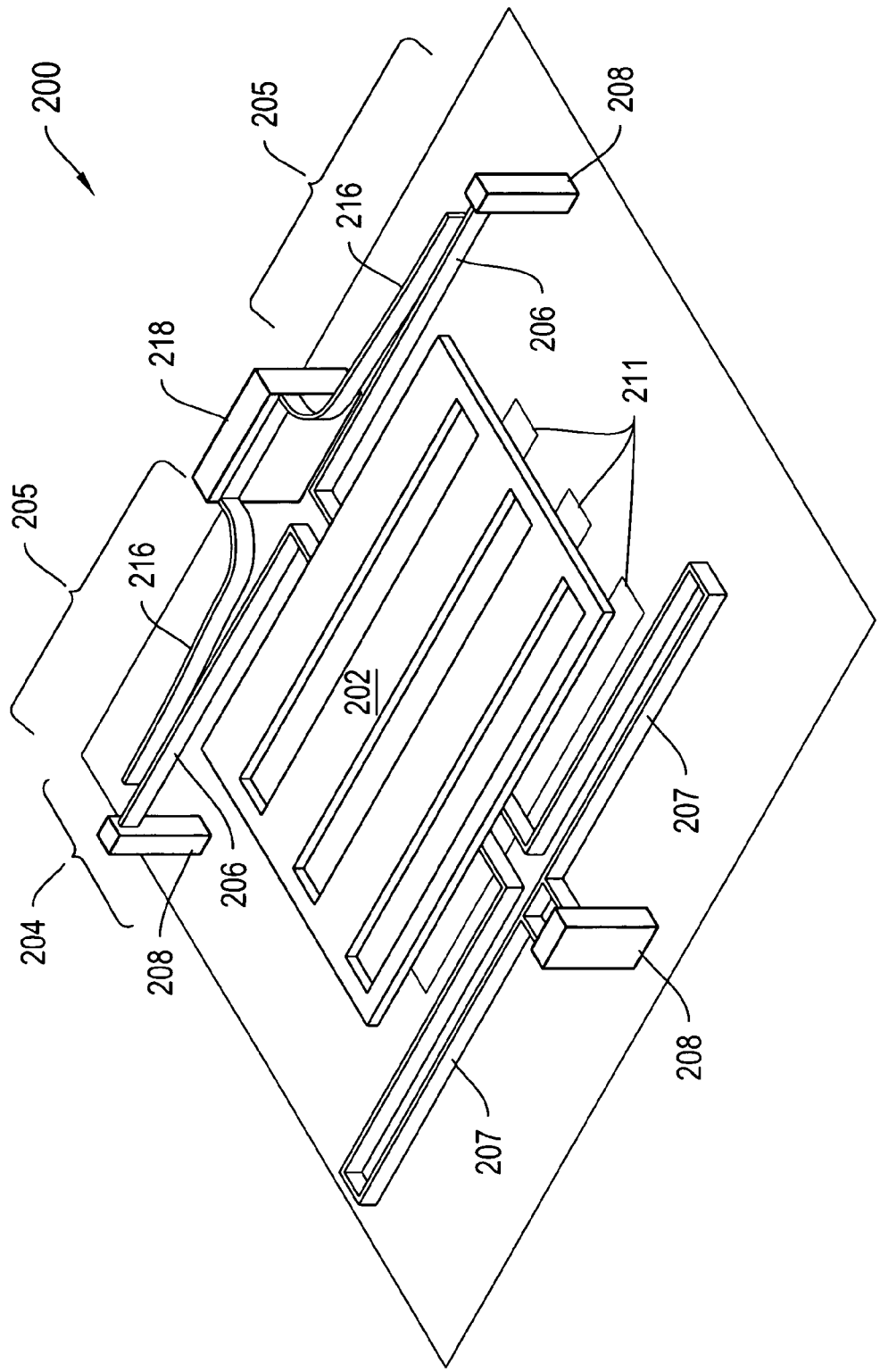
FIG. 2 is an isometric view of a shutter assembly suitable for inclusion in the display apparatus of FIG. 1, according to an illustrative embodiment of the invention.

FIG. 2 is diagram of an illustrative shutter assembly 200 suitable for incorporation into the display apparatus 100 of FIG. 1. The shutter assembly 200 includes a shutter 202 coupled to an actuator 204. The actuator 204 is formed from two separate compliant electrode beam actuators 205, as described in U.S. patent application Ser. No. 11/251,035, filed on Oct. 14, 2005. The shutter 202 couples on one side to the actuators 205. The actuators 205 move the shutter transversely over a surface in a plane of motion which is substantially parallel to the surface. The opposite side of the shutter couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface. The surface includes one or more apertures 211 for admitting the passage of light. The load anchors 208 physically connect the compliant load beams 206 and the shutter 202 to the surface and electrically connect the load beams 206 to a bias voltage, in some instances, ground.

Each actuator 204 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the shutter assembly 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 potential is removed, the load beams 206 push the shutter 202 back into its initial position, releasing the stress stored in the load beams 206.

A shutter assembly, such as shutter assembly 200, that incorporates a passive restoring force mechanism is generally referred to herein as an elastic shutter assembly. A number of elastic restoring mechanisms can be built into or in conjunction with electrostatic actuators, the compliant beams illustrated in shutter assembly 200 providing just one example. Elastic shutter assemblies can be constructed such that in an unactivated, or relaxed state, the shutters are either opened or closed. For illustrative purposes, it is assumed below that the elastic shutter assemblies described herein are constructed to be closed in their relaxed state.

As described in U.S. patent application Ser. No. 11/251, 035, referred to above, depending on the curvature of the drive beams 216 and load beams 206, the shutter assembly may either be controlled in a analog or digital fashion. When the beams have a strongly non-linear or divergent curvature (beams diverging with more than a second order curvature) the application of an analog actuation voltage across drive beams 216 and the load beams 206 results in a predetermined incremental displacement of the shutter 202. Thus, the magnitude of shutter 202 displacement can be varied by applying different magnitude voltages across the drive beams 216 and the load beams 206. Shutter assemblies 200 including more curved beams are therefore used to implement analog gray scale processes.

For shutter assemblies with less curved beams (beams diverging with second order curvature or less), the application of a voltage across the drive beams 216 and the load beams 206 results in shutter displacement if the voltage is greater than a threshold voltage ($V_{at}$). Application of a voltage equaling or exceeding $V_{at}$ results in the maximum shutter displacement. That is, if the shutter 202 is closed absent the application of a voltage equaling or exceeding the threshold, application of any voltage equaling or exceeding $V_{at}$ fully opens the shutter. Such shutter assemblies are utilized for implementing time division and/or digital area division gray scale processes in various embodiments of the display apparatus 100.

Figure 3:
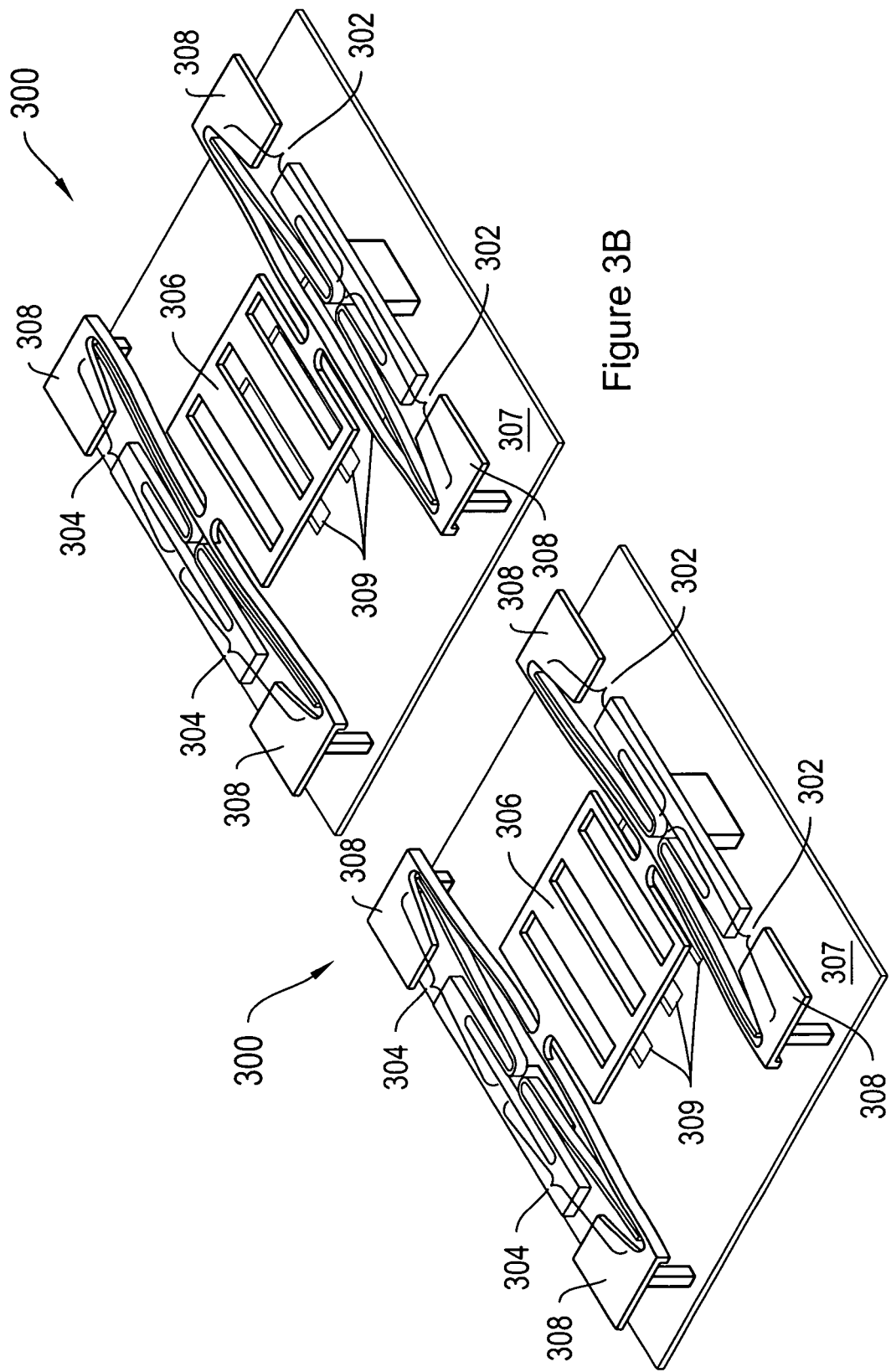
FIGS. 3A and 3B are isometric views of dual-actuated shutter assemblies suitable for inclusion in the display apparatus of FIG. 1, according to an illustrative embodiment of the invention.

FIGS. 3A and 3b are isometric views of a second shutter assembly 300 suitable for use in the display apparatus 100. FIG. 3A is a view of the second shutter assembly 300 in an open state. FIG. 3B is a view of the second shutter assembly 300 in a closed state. Shutter assembly 300 is described in further detail in U.S. patent application Ser. No. 11/251,035, referenced above. In contrast to the shutter assembly 200, shutter assembly 300 includes actuators 302 and 304 on either side of a shutter 306. Each actuator 302 and 304 is independently controlled. A first actuator, a shutter-open actuator 302, serves to open the shutter 306. A second actuator, the shutter-close actuator 304, serves to close the shutter 306. Both actuators 302 and 304 are preferably compliant beam electrode actuators. The actuators 302 and 304 open and close the shutter 306 by driving the shutter 306 substantially in a plane parallel to a surface 307 over which the shutter is suspended. The shutter 306 is suspended over the surface at via anchors 308 attached to the actuators 302 and 304. The inclusion of supports attached to both ends of the shutter 306 along its axis of movement reduces out of plane motion of the shutter 306 and confines the motion substantially to the desired plane of motion. The surface 307 includes at least one aperture 309 for admitting the passage of light through the surface 307.

Figure 4:
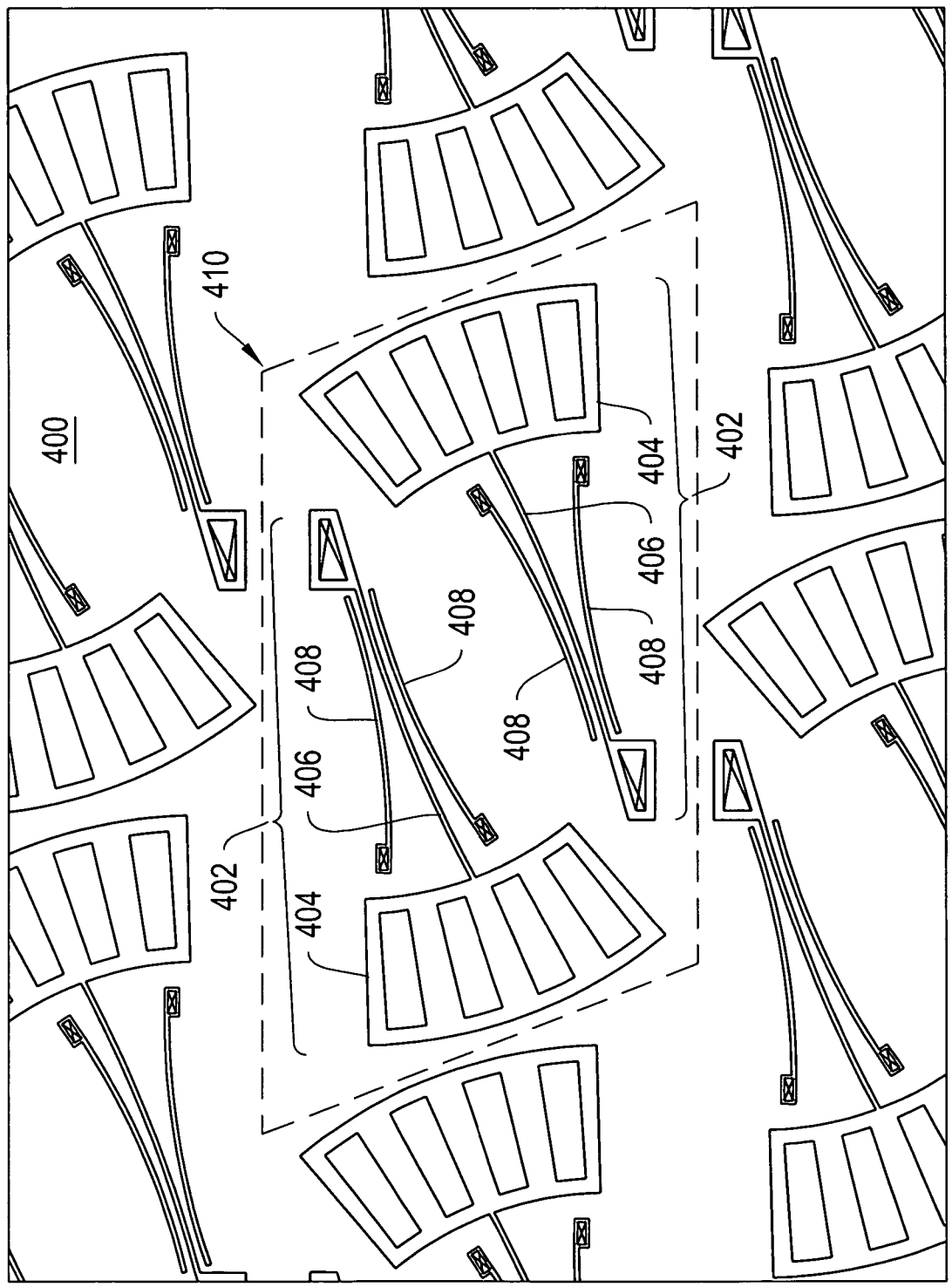
FIG. 4 is a top view of an array of shutter assemblies suitable for inclusion in the display apparatus of FIG. 1, according to an illustrative embodiment of the invention.

FIG. 4 is a top view of an array 400 of shutter assemblies 402 suitable for inclusion in the display apparatus 100. Each shutter assembly 402 includes a shutter 404, a load beam 406, and two drive beams 408. As with the shutter assemblies 200 and 300 described above, the shutter assemblies 402 modulate light by transversely driving their corresponding shutters 404 such that the shutters 404 selectively interfere with light passing through apertures in a surface over which the shutters 404 are driven.

To drive one of the shutters in one of the shutter assemblies, a voltage is applied across the load beam 406 and one of the drive beams 408. To generate the voltage, a first electric potential is applied to the selected drive beam and a second electric potential is applied to the load beam 406 and to the shutter 404. The first and second electric potentials may be of the same polarity or they may be of opposite polarities. They also may have the same magnitude or they may have different magnitudes. Either potential may also be set to ground. In order for the shutter assembly to actuate (i.e., for the shutter to change its position) the difference between the first and second potentials must equal or exceed an actuation threshold voltage $V_{at}$.

In most embodiments, $V_{at}$ is reached by applying voltages of substantially different magnitudes to the selected drive beam and the load beam. For example, assuming $V_{at}$ is 40V, the display apparatus 100 may apply 30V to the drive beam and −10V to the load beam, resulting in a potential difference of 40V. For purposes of controlling power dissipation, however, it is also important to consider and control the absolute voltage applied to each electrode with respect to the ground or package potential of the display. The power required to apply electric potentials to an array of actuators is proportional to the capacitance seen by the voltage source ($P=½ fcV^2$), where f is the frequency of the drive signal, V is the voltage of the source and C is the total capacitance seen by the source. The total capacitance has several additive components, including the capacitance that exists between the load beam and drive beam, the source-drain capacitance of transistors along an interconnect line between the voltage source and the actuator (particularly for those transistors whose gates are closed), the capacitance between the interconnect line and its surroundings, including neighboring shutter assemblies and/or crossover lines, and the capacitance between the load or drive beams and their surroundings, including neighboring shutter assemblies or the display package. Since the load beam 406 is electrically coupled to the shutter 404, the capacitance of the load beam 406 includes the capacitance of the shutter 404. Since the shutter comprises typically a large fraction of area of the pixel, the capacitance between the load beam and its surroundings can represent a significant fraction of the total capacitance seen by the voltage source. Furthermore, because of the difference in area of the combined load beam 406 and shutter 404 and the area of the drive beam 408 is significant, the capacitance between the load beam and its surroundings is typically much larger than that between the drive beam and its surroundings. As a result, the $CV^2$ power loss experienced by voltage sources connected to either the drive or the load beams will be significantly different even if the range of their voltage excursions were to be the same. For this reason, it is generally advantageous to connect the higher capacitance end of the actuator, i.e., the load beam, to a voltage source that either does not change in voltage significantly with respect to ground or package potential, or to a voltage source that does not change voltage with the highest frequencies required by the drive system. For example, if a 40 volt difference is required between the load beam 406 and the drive beam 408 to actuate the actuator, it will be advantageous if the voltage difference between the drive beam and the ground or case potential represents at least half if not most of the 40 volts.

The dashed line overlaid on the shutter assembly array 400 depicts the bounds of a single pixel 410. The pixel 410 includes two shutter assemblies 402, each of which may be independently controlled. By having two shutter assemblies 402 per pixel 410, a display apparatus incorporating the shutter assembly array 400 can provide three levels of gray scale per pixel using area division gray scale. More particularly, the pixel could be driven into the following states: both shutter assemblies closed; one shutter assembly opened and one shutter assembly closed: or both shutter assemblies open. Thus, the resulting image pixel can be off, at half brightness, or at full brightness. By having each shutter assembly 402 in the pixel 410 have different sized apertures, a display apparatus could provide yet another level of gray scale using only area division gray scale. The shutter assemblies 200, 300 and 402 of FIGS. 2, 3 and 4 can be made bi-stable. That is, the shutters can exist in at least two equilibrium positions (e.g. open or closed) with little or no power required to hold them in either position. More particularly, the shutter assembly 300 can be mechanically bi-stable. Once the shutter of the shutter assembly 300 is set in position, no electrical energy or holding voltage is required to maintain that position. The mechanical stresses on the physical elements of the shutter assembly 300 can hold the shutter in place.

The shutter assemblies 200, 300, and 402 can also be made electrically bi-stable. In an electrically bi-stable shutter assembly, there exists a range of voltages below the actuation voltage of the shutter assembly, which if applied to a closed actuator (with the shutter being either open or closed), hold the actuator closed and the shutter in position, even if an opposing force is exerted on the shutter. The opposing force may be exerted by a spring attached to an opposite end of the shutter, such as spring 207 in shutter assembly 200, or the opposing force may be exerted by an opposing actuator. The minimum voltage needed to maintain a shutter's position against such an opposing force is referred to as a maintenance voltage $V_m$.

Electrical bi-stability arises from the fact that the electrostatic force across an actuator is a strong function of position as well as voltage. The beams of the actuators in the shutter assemblies 200, 300, and 402 act as capacitor plates. The force between capacitor plates is proportional to $1/d^2$ where d is the local separation distance between capacitor plates. In a closed actuator, the local separation between actuator beams is very small. Thus, the application of a small voltage can result in a relatively strong force between the actuator beams. As a result, a relatively small voltage, such as $V_m$, can keep the actuator closed, even if other elements exert an opposing force on the actuator.

In shutter assemblies, such as 300, that provide for two separately controllable actuators (for the purpose of opening and closing the shutter respectively), the equilibrium position of the shutter will be determined by the combined effect of the voltage differences across each of the actuators. In other words, the electrical potentials of all three terminals (the shutter open drive beam, the shutter close drive beam, and the shutter/load beams), as well as shutter position, must be considered to determine the equilibrium forces on the shutter.

For an electrically bi-stable system, a set of logic rules can describe the stable states, and can be used to develop reliable addressing or digital control schemes for the shutter. These logic rules are as follows:

Let $V_s$ be the electrical potential on the shutter or load beam. Let $V_o$ be the electrical potential on the shutter-open drive beam. Let $V_c$ be the electrical potential on the shutter-close drive beam. Let the expression/$V_o-V_s$/refer to the absolute value of the voltage difference between the shutter and the shutter-open drive beam. Let $V_m$ be the maintenance voltage. Let $V_{at}$ be the actuation threshold voltage, i.e., the voltage necessary to actuate an actuator absent the application of $V_m$ to an opposing drive beam. Let $V_{max}$ be the maximum allowable potential for $V_o$ and $V_c$. Let $V_m<V_{at}<V_{max}$. Then, assuming $V_o$ and $V_c$ remain below $V_{max}$:

1. If /$V_o-V_s$/$<V_m$ and /$V_c-V_s$/$<V_m$

Then the shutter will relax to the equilibrium position of its mechanical spring.

2. If /$V_o-V_s$/$>V_m$ and /$V_c-V_s$/$>V_m$

Then the shutter will not move, i.e. it will hold in either the open or the closed state, whichever position was established by the last actuation event.

3. If $V_o-V_s$/$>V_{at}$ and /$V_c-V_s$/$<V_m$

Then the shutter will move into the open position.

4. If /$V_o-V_s$/$<V_m$ and /$V_c-V_s$/$>V_{at}$

Then the shutter will move into the closed position.

Following rule 1, with voltage differences on each actuator near to zero, the shutter will relax. In many shutter assemblies the mechanically relaxed position is only partially open or closed, and so this voltage condition is preferably avoided in an addressing scheme.

The condition of rule 2 makes it possible to include a global actuation function into an addressing scheme. By maintaining a shutter voltage which provides beam voltage differences that are at least the maintenance voltage, the absolute values of the shutter open and shutter closed potentials can be altered or switched in the midst of an addressing sequence over wide voltage ranges (even where voltage differences exceed $V_{at}$) with no danger of unintentional shutter motion.

The condition of rules 3 and 4 are those that are generally targeted during the addressing sequence to ensure the bi-stable actuation of the shutter.

The maintenance voltage difference, $V_m$, can be designed or expressed as a certain fraction of the actuation threshold voltage, $V_{at}$. For systems designed for a useful degree of bi-stability the maintenance voltage can exist in a range between 20% and 80% of $V_{at}$. This helps ensure that charge leakage or parasitic voltage fluctuations in the system do not result in a deviation of a set holding voltage out of its maintenance range—a deviation which could result in the unintentional actuation of a shutter. In some systems an exceptional degree of bi-stability or hysteresis can be provided, with $V_m$ existing over a range of 2% to 98% of $V_{at}$. In these systems, however, care must be taken to ensure that an electrode voltage condition of $V<V_m$ can be reliably obtained within the addressing and actuation time available.

Control Matrices and Methods of Operation Thereof

Figure 5A:
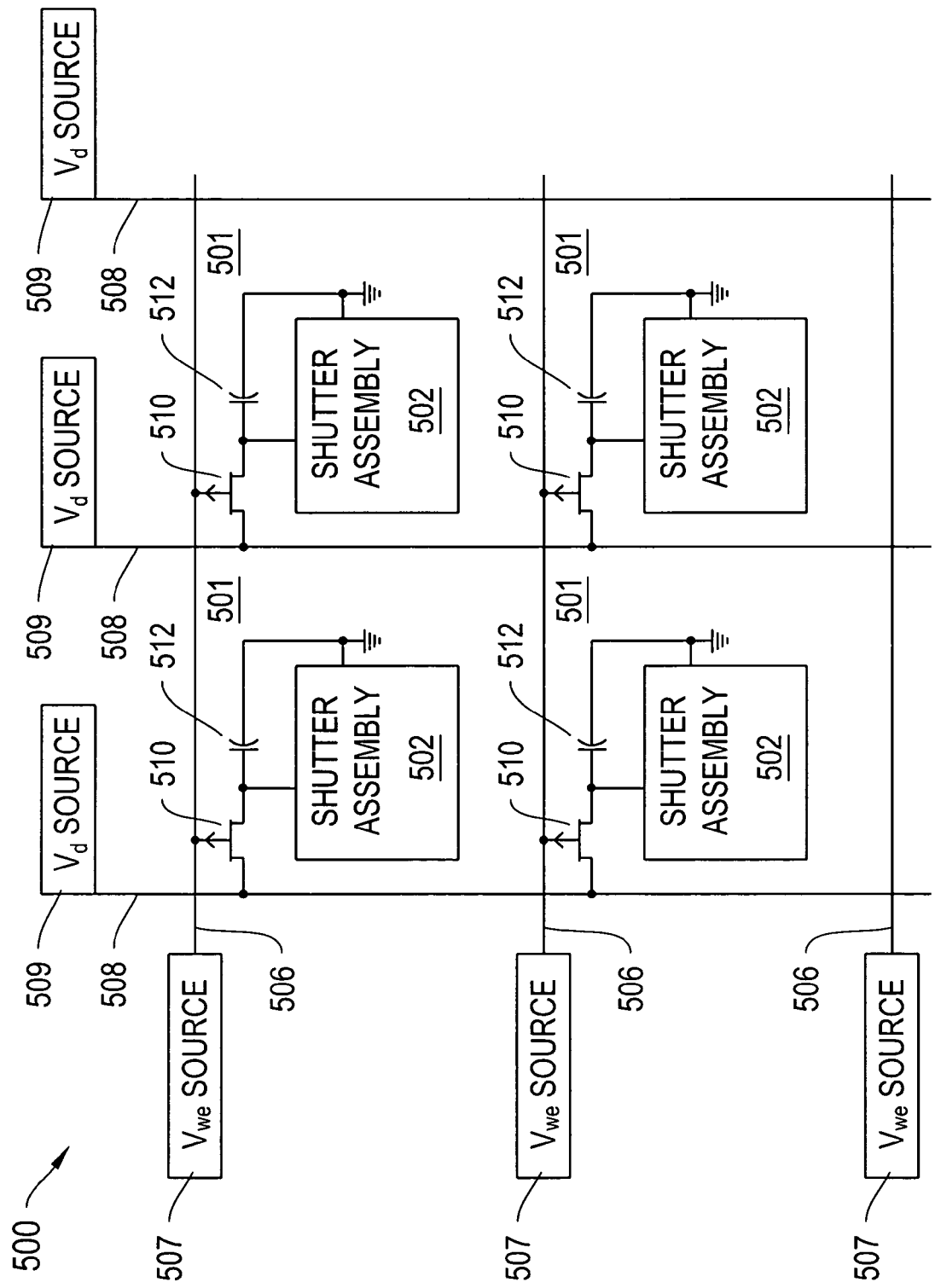
FIG. 5A is a conceptual diagram of a control matrix suitable for controlling the shutter assemblies of the display apparatus of FIG. 1, according to an illustrative embodiment of the invention.
Figure 5B:
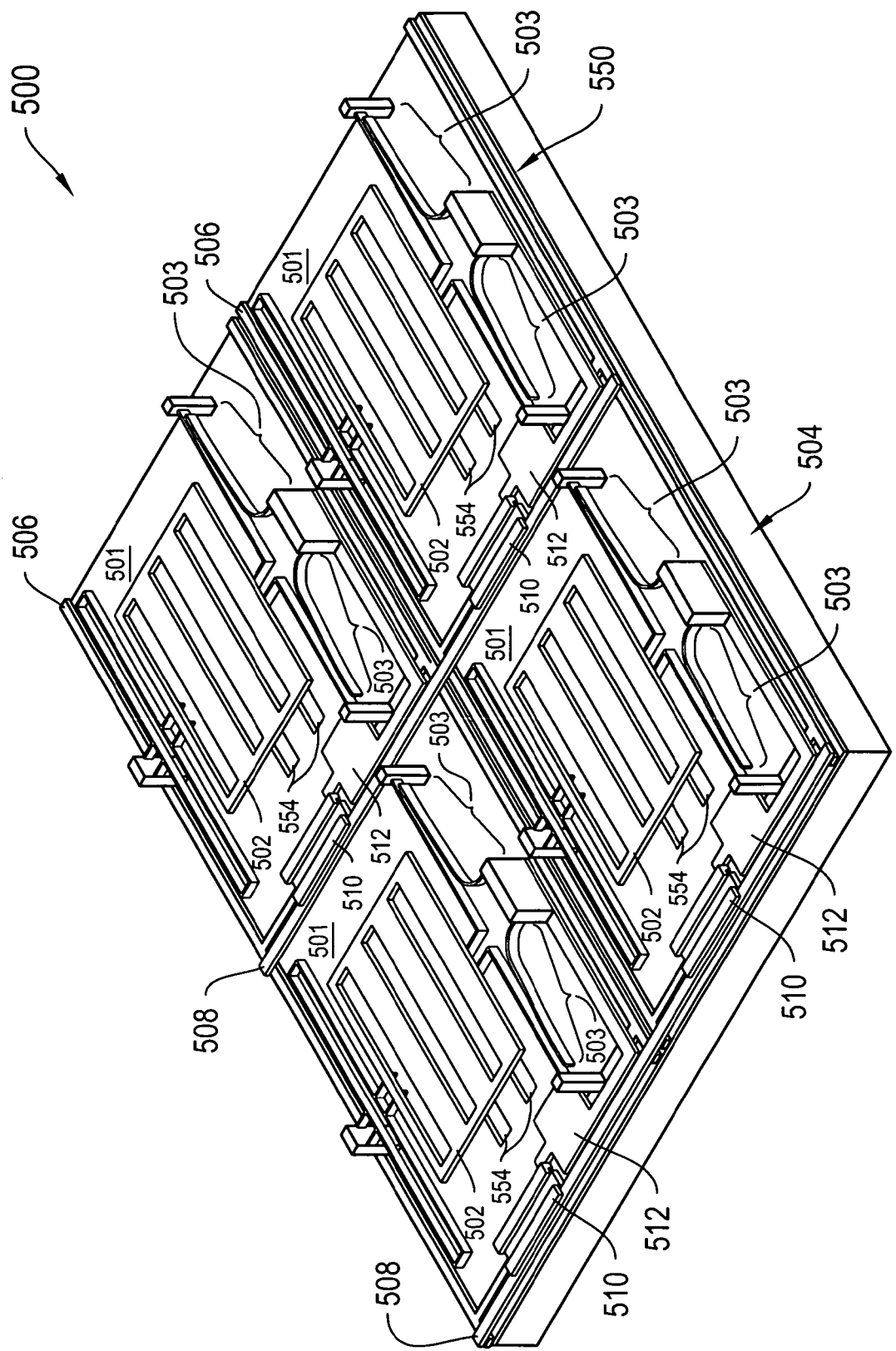
FIG. 5B is a isometric view of an array of pixels incorporating the control matrix of FIG. 5A and the shutter assemblies of FIG. 2, according to an illustrative embodiment of the invention.

FIG. 5A is a conceptual diagram of a control matrix 500 suitable for inclusion in the display apparatus 100 for addressing an array of pixels. FIG. 5B is an isometric view of a portion of an array of pixels including the control matrix 500. Each pixel 501 includes an elastic shutter assembly 502, such as shutter assembly 200, controlled by an actuator 503.

The control matrix 500 is fabricated as a diffused or thin-film-deposited electrical circuit on the surface of a substrate 504 on which the shutter assemblies 502 are formed. The control matrix 500 includes a scan-line interconnect 506 for each row of pixels 501 in the control matrix 500 and a data-interconnect 508 for each column of pixels 501 in the control matrix 500. Each scan-line interconnect 506 electrically connects a write-enabling voltage source 507 to the pixels 501 in a corresponding row of pixels 501. Each data interconnect 508 electrically connects an data voltage source, ("Vd source") 509 to the pixels 501 in a corresponding column of pixels. In control matrix 500, the data voltage $V_d$ provides the majority of the energy necessary for actuation. Thus, the data voltage source 509 also serves as an actuation voltage source.

For each pixel 501 or for each shutter assembly in the array, the control matrix 500 includes a transistor 510 and a capacitor 512. The gate of each transistor is electrically connected to the scan-line interconnect 506 of the row in the array in which the pixel 501 is located. The source of each transistor 510 is electrically connected to its corresponding data interconnect 508. The shutter assembly 502 includes an actuator with two electrodes. The two electrodes have significantly different capacitances with respect to the surroundings. The transistor connects the data interconnect 508 to the actuator electrode having the lower capacitance. More particularly the drain of each transistor 510 is electrically connected in parallel to one electrode of the corresponding capacitor 512 and to the lower capacitance electrode of the actuator. The other electrode of the capacitor 512 and the higher capacitance electrode of the actuator in shutter assembly 502 are connected to a common or ground potential. In operation, to form an image, the control matrix 500 write-enables each row in the array in sequence by applying $V_{we}$ to each scan-line interconnect 506 in turn. For a write-enabled row, the application of $V_{we}$ to the gates of the transistors 510 of the pixels 501 in the row allows the flow of current through the data interconnects 508 through the transistors to apply a potential to the actuator of the shutter assembly 502. While the row is write-enabled, data voltages $V_d$ are selectively applied to the data interconnects 508. In implementations providing analog gray scale, the data voltage applied to each data interconnect 508 is varied in relation to the desired brightness of the pixel 501 located at the intersection of the write-enabled scan-line interconnect 506 and the data interconnect 508. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 508, the actuator in the corresponding shutter assembly 502 actuates, opening the shutter in that shutter assembly 502. The voltage applied to the data interconnect 508 remains stored in the capacitor 512 of the pixel even after the control matrix 500 ceases to apply $V_{we}$ to a row. It is not necessary, therefore, to wait and hold the voltage $V_{we}$ on a row for times long enough for the shutter assembly 502 to actuate; such actuation can proceed after the write-enabling voltage has been removed from the row. The voltage in the capacitors 510 in a row remain substantially stored until an entire video frame is written, and in some implementations until new data is written to the row.

The control matrix 500 can be manufactured through use of the following sequence of processing steps:

First an aperture layer 550 is formed on a substrate 504. If the substrate 504 is opaque, such as silicon, then the substrate 504 serves as the aperture layer 550, and aperture holes 554 are formed in the substrate 504 by etching an array of holes through the substrate 504. If the substrate 504 is transparent, such as glass, then the aperture layer 550 may be formed from the deposition of a light blocking layer on the substrate 504 and etching of the light blocking layer into an array of holes. The aperture holes 554 can be generally circular, elliptical, polygonal, serpentine, or irregular in shape. As described in U.S. patent application Ser. No. 11/218,690, filed on Sep. 2, 2005, if the light blocking layer is also made of a reflective material, such as a metal, then the aperture layer 550 can act as a mirror surface which recycles non-transmitted light back into an attached backlight for increased optical efficiency. Reflective metal films appropriate for providing light recycling can be formed by a number of vapor deposition techniques including sputtering, evaporation, ion plating, laser ablation, or chemical vapor deposition. Metals that are effective for this reflective application include, without limitation, Al, Cr, Au, Ag, Cu, Ni, Ta, Ti, Nd, Nb, Si, Mo and/or alloys thereof. Thicknesses in the range of 30 nm to 1000 nm are sufficient.

Second, an intermetal dielectric layer is deposited in blanket fashion over the top of the aperture layer metal 550.

Third, a first conducting layer is deposited and patterned on the substrate. This conductive layer can be patterned into the conductive traces of the scan-line interconnect 506. Any of the metals listed above, or conducting oxides such as indium tin oxide, can have sufficiently low resistivity for this application. A portion of the scan line interconnect 506 in each pixel is positioned to so as to form the gate of a transistor 510.

Fourth, another intermetal dielectric layer is deposited in blanket fashion over the top of the first layer of conductive interconnects, including that portion that forms the gate of the transistor 510. Intermetal dielectrics sufficient for this purpose include $SiO_2$, $Si_3N_4$, and $Al_2O_3$ with thicknesses in the range of 30 nm to 1000 nm.

Fifth, a layer of amorphous silicon is deposited on top of the intermetal dielectric and then patterned to form the source, drain and channel regions of a thin film transistor active layer. Alternatively this semiconducting material can be polycrystalline silicon.

Sixth, a second conducting layer is deposited and patterned on top of the amorphous silicon. This conductive layer can be patterned into the conductive traces of the data interconnect 508. The same metals and/or conducting oxides can be used as listed above. Portions of the second conducting layer can also be used to form contacts to the source and drain regions of the transistor 510.

Capacitor structures such as capacitor 512 can be built as plates formed in the first and second conducting layers with the intervening dielectric material.

Seventh, a passivating dielectric is deposited over the top of the second conducting layer.

Eighth, a sacrificial mechanical layer is deposited over the top of the passivation layer. Vias are opened into both the sacrificial layer and the passivation layer such that subsequent MEMS shutter layers can make electrical contact and mechanical attachment to the conducting layers below.

Ninth, a MEMS shutter layer is deposited and patterned on top of the sacrificial layer. The MEMS shutter layer is patterned with shutters 502 as well as actuators 503 and is anchored to the substrate 504 through vias that are patterned into the sacrificial layer. The pattern of the shutter 502 is aligned to the pattern of the aperture holes 554 that were formed in the first aperture layer 550. The MEMS shutter layer may be composed of a deposited metal, such as Au, Cr or Ni, or a deposited semiconductor, such as polycrystalline silicon or amorphous silicon, with thicknesses in the range of 300 nanometers to 10 microns.

Tenth, the sacrificial layer is removed such that components of the MEMS shutter layer become free to move in response to voltages that are applied across the actuators 503.

Eleventh, the sidewalls of the actuator 503 electrodes are coated with a dielectric material to prevent shorting between electrodes with opposing voltages.

Many variations on the above process are possible. For instance the reflective aperture layer 550 of step 1 can be combined into the first conducting layer. Gaps are patterned into this conducting layer to provide for electrically conductive traces within the layer, while most of the pixel area remains covered with a reflective metal. In another embodiment, the transistor 510 source and drain terminals can be placed on the first conducting layer while the gate terminals are formed in the second conducting layer. In another embodiment the semiconducting amorphous or polycrystalline silicon is placed directly below each of the first and second conducting layers. In this embodiment vias can be patterned into the intermetal dielectric so that metal contacts can be made to the underlying semiconducting layer.

Figure 6:
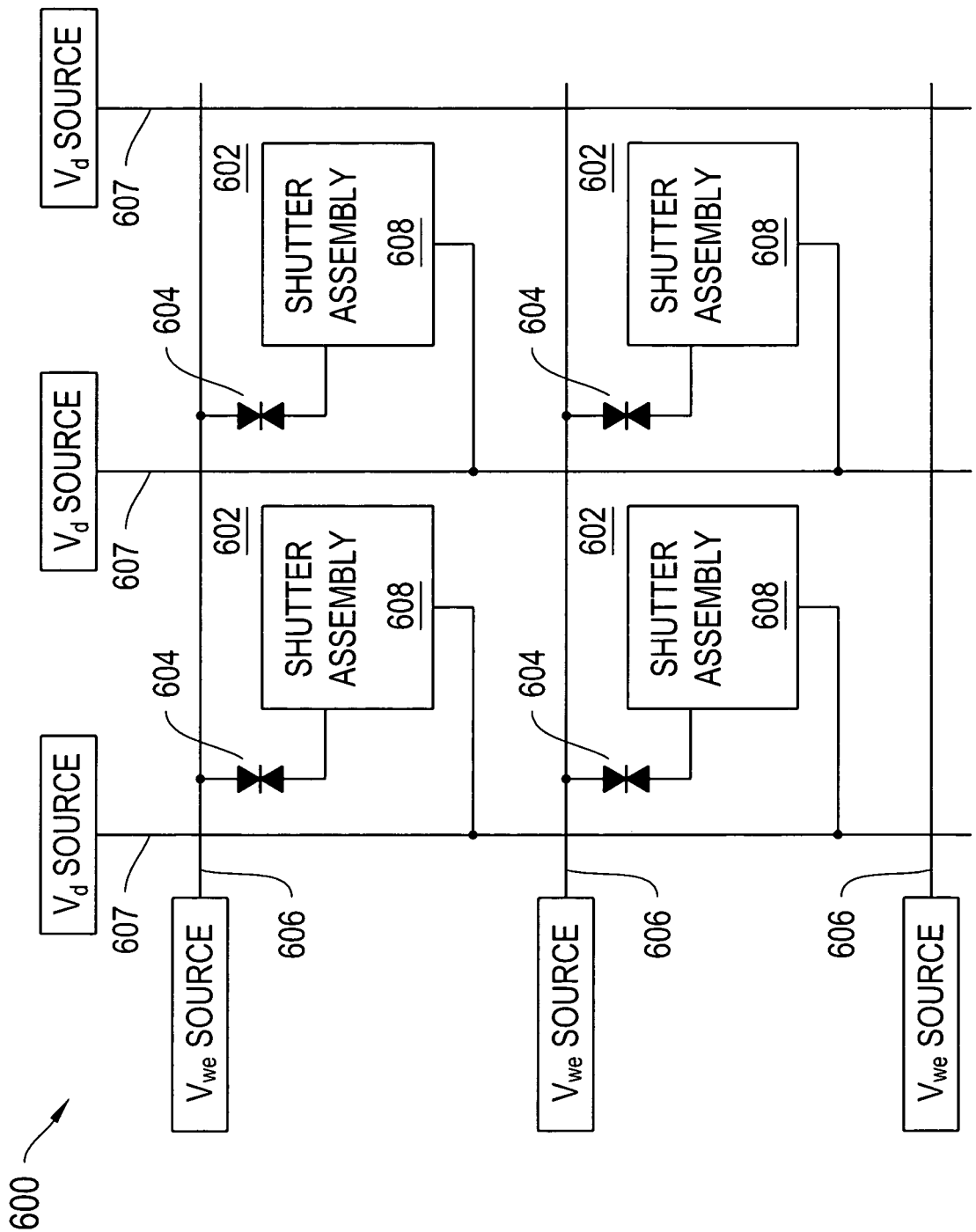
FIG. 6 is a diagram of a second control matrix suitable for controlling the shutter assemblies of the display apparatus of FIG. 1 according to an illustrative embodiment of the invention.

FIG. 6 is a diagram of a second control matrix 600 suitable for inclusion in the display apparatus 100 for addressing an array of pixels 602. The pixels 602 in the control matrix 600 forgo the use of a transistor and capacitor, as are included in control matrix 500, in favor of a metal-insulator-metal ("MIM") diode 604. The control matrix 600 includes a scan-line interconnect 606 for each row of pixels 602 in the control matrix 600 and a data interconnect 607 for each column of pixels in the control matrix 600. Each scan-line interconnect 606 electrically connects to one terminal of the MIM diode 604 of each pixel 602 in its corresponding row of pixels 602. The other terminal of the MIM diode 604 in a pixel 602 electrically connects to one of the two electrodes of a shutter assembly 608, such as shutter assembly 200, in the pixel 602.

In operation the MIM diode 604 acts as a non-linear switch element which prevents current from flowing to the shutter assembly 609 unless the voltage presented between the scan line interconnect 606 and the data line interconnect 607 exceeds a threshold voltage $V_{diode}$. Therefore, if voltage pulses provided by the data line interconnect 607 do not exceed $V_{diode}$, such data pulses will not effect that actuation of shutter assemblies 608 connected along the data line. If, however, a write-enabling voltage $V_{we}$, is applied to a scan line interconnect 606 such that a voltage difference in excess of $V_{diode}$ appears between the scan line interconnect 606 and any of the several data line interconnects 607 that cross the scan line interconnect 606, then the shutters at the intersection of the that scan line interconnect 606 and those data line interconnects 607 will receive their charge and can be actuated. In implementations providing analog gray scale, the data voltage applied to each data interconnect 607 is varied in relation to the desired brightness of the pixel 602 located at the intersection of the write-enabled scan-line interconnect 606 and the data interconnect 607. In implementations providing a digital control schemes, the data voltage is selected to be either close to $V_{we}$ (i.e., such that little or no current flows through the diode 604) or high enough such that $V_{we}-V_{diode}$ will meet or exceed $V_{at}$ (the actuation threshold voltage).

In other implementations the MIM diode 604 can be placed between the shutter assembly 608 and the data line interconnect 607. The method of operation is the same as described above. In other implementations, two MIM diodes are employed, each connected to a separate and adjacent scan line. One electrode of the shutter assembly is connected to each of the MIM diodes on the side opposite of their respective scan lines such that the voltage appearing on the shutter electrode is almost ½ of the voltage difference between the two scan lines. In this fashion it is easier to fix the potential of one of the electrodes of the actuator to a known zero or common potential.

The two electrodes of the shutter assembly 608 in the pixel 602 have significantly different capacitances with respect to the ground or case potential. Of these two electrodes, the higher capacitance electrode is preferably connected to the scan line interconnect 606 (optionally, as shown, with a diode connected between shutter 608 and the scan line interconnect 606), since the scan line typically requires smaller voltage changes (with respect to ground) than are typically required of the data line interconnect 607. The data interconnect 607 electrically connects to the lower-capacitance electrode of the shutter assembly 608.

Figure 7:
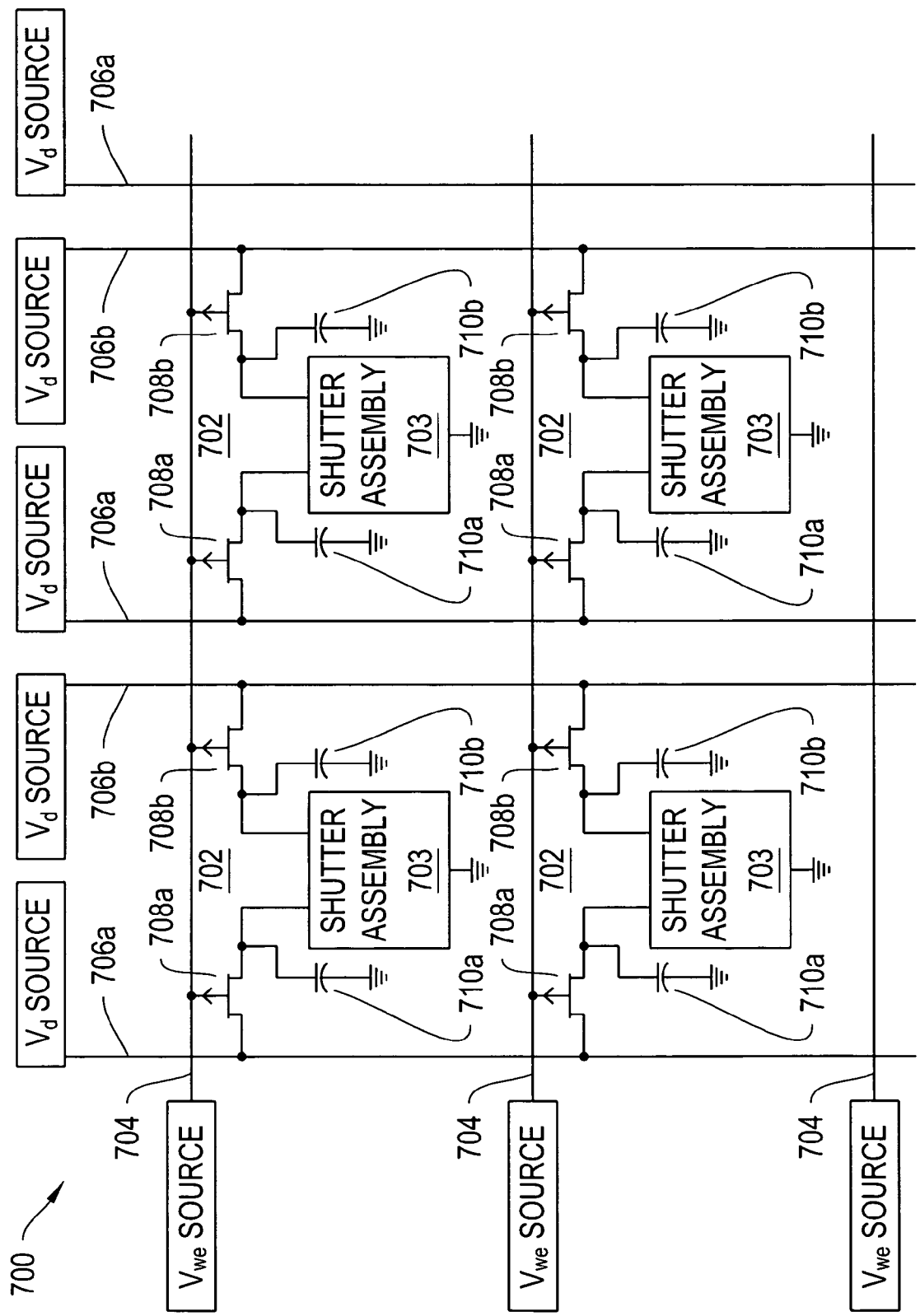
FIG. 7 is a diagram of a third control matrix suitable for controlling the shutter assemblies of the display apparatus of FIG. 1, according to an illustrative embodiment of the invention.

FIG. 7 is a diagram of a third control matrix 700 for controlling pixels 702 incorporating shutter assemblies 703 with both open and close actuators, such as shutter assemblies 300 and 402. The control matrix 700 includes scan-line interconnect 704 per row of pixels 702 in the control matrix 700 and two data interconnects 706a and 706b addressing each column of pixels 702 in the control matrix 700. One of the data interconnects is a shutter-open interconnect 706a and the other data interconnect is a shutter-close interconnect 706b.

For a given pixel 702 in the control matrix 700, the pixel 702 includes two transistor-capacitor pairs, one pair for each data-interconnect 706a and 706b addressing the pixel. The gates of both transistors in the pixel 702 electrically couple to the scan-line interconnect 704 corresponding to the row of the control matrix 700 in which the pixel 702 is located. The source of one of the transistors, the shutter-open transistor 708a, electrically connects to the shutter-open data-interconnect 706a of the column in which the pixel 702 is located. The drain of the shutter-open transistor 708a electrically connects, in parallel, to one electrode of one of the capacitors, the shutter-open capacitor 710a, and to one electrode of the shutter-open actuator of the shutter assembly 703 of the pixel. The other electrode of the shutter-open capacitor 710a electrically connects to ground or to a bias interconnect set to a common voltage among the pixels 702.

Similarly, the source of the other transistor in the pixel 702, the shutter-close transistor 708b, electrically connects to the shutter-close data interconnect 706b of the column in which the pixel 702 is located. The drain of the shutter-close transistor 708b electrically connects, in parallel, to the other of the capacitors in the pixel, the shutter-close capacitor 710b, and to one of the electrodes of the shutter-close actuator of the shutter assembly 703.

Both the shutter-open actuator and the shutter-close actuator of the shutter assembly 703 include two electrodes. One electrode in each actuator has a significantly higher capacitance than the other. The drains of the shutter-open and the shutter-close transistors electrically connect to the lower-capacitance electrodes of their corresponding actuators. The ground or bias interconnect, if any, electrically connects to the higher-capacitance electrode.

The control matrix of FIG. 7 employs n-channel transistors. Other embodiments are possible that employ p-channel MOS transistors. In other implementations, the transistors 708a and 708b can be replaced by MIM diodes or other non-linear circuit elements or switches. In other implementations the capacitors 710a and 710b can be removed altogether, their function replaced by the effective capacitance of the shutter-open and shutter-closed actuators.

In the case where multiple shutters are to be actuated within each pixel, a separate pair of shutter-open data interconnects and shutter-closed data interconnects, along with associated transistors and capacitors, can be provided for each shutter within the pixel.

Figure 8:
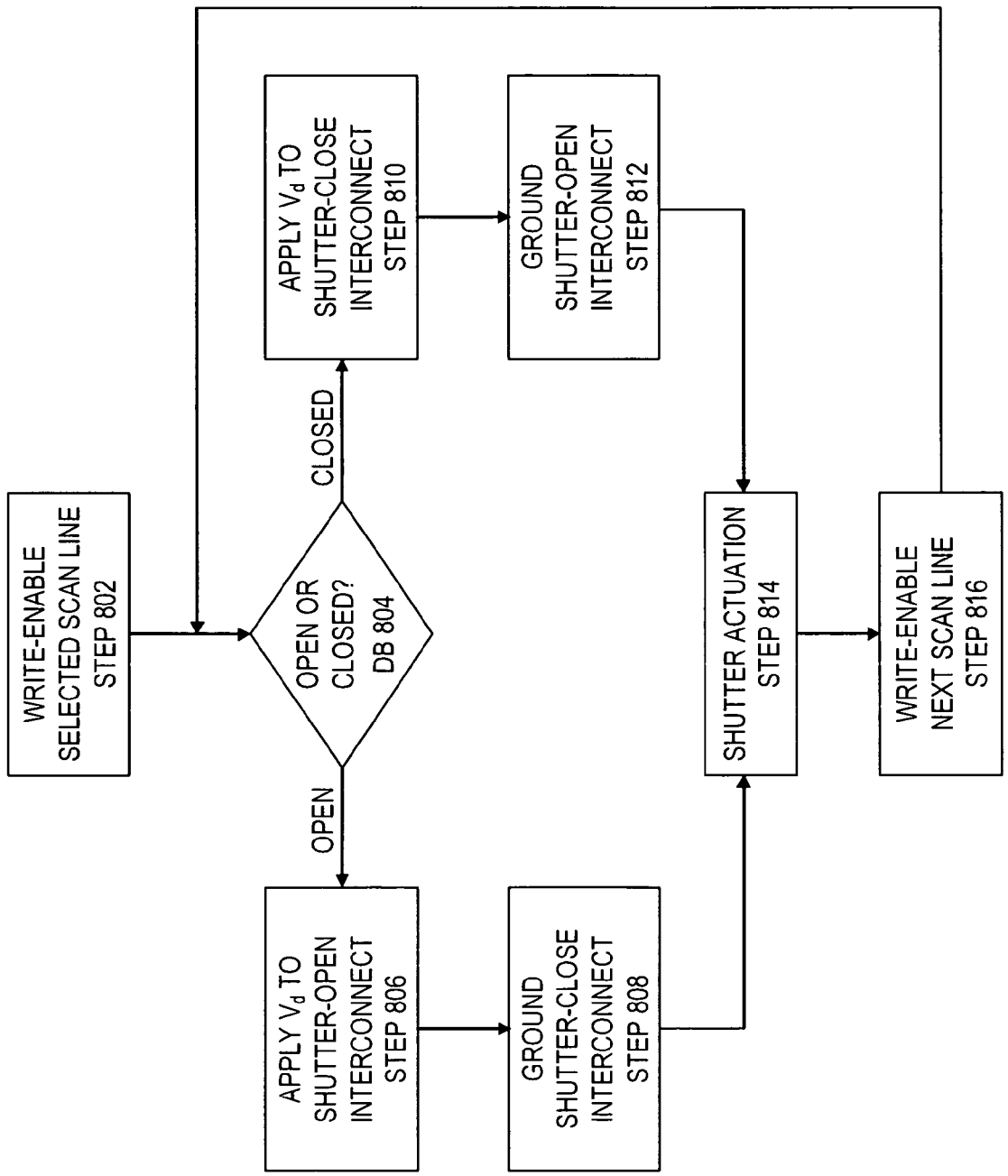
FIG. 8 is a flow chart of a method of addressing the pixels of the control matrix of FIG. 7, according to an illustrative embodiment of the invention.

FIG. 8 is flow chart of a method 800 of addressing the pixels 702 controlled by the control matrix 700 of FIG. 7 to form an image frame. The steps carried out to address a single image frame is referred to collectively as a "frame addressing cycle." The method begins by write-enabling the first scan line in the display (step 802). To do so, the control matrix 700 applies $V_{we}$, (e.g., +45V for nMOS transistors or −45V for pMOS transistors), to the scan line interconnect 704 in the control matrix 700 corresponding to the first row in the control matrix and grounds the other scan-line interconnects 704.

The control matrix 700 then writes data to each pixel 702 in the write-enabled scan line (decision block 804 to step 812). The data corresponds to the desired states of the shutter assemblies 703 in those pixels 702. For ease of understanding, the data writing process (decision block 804 to step 812) is described below in relation to a single pixel 702 in a selected column in the write-enabled scan line. At the same time data is written to this single pixel 702, the control matrix 700 also writes data in the same fashion to the remaining pixels 702 in the write-enabled scan line.

To write data to a pixel 702 at the intersection of a selected column of the control matrix 700 and the write-enabled scan line first, at decision block 804, it is determined if the shutter assembly 703 in question is to be open in the next image frame or closed. If the shutter assembly 703 is to be open, the control matrix 700 applies a data voltage, $V_d$, to the shutter-open interconnect 706a of the selected column (step 806). $V_d$ is selected to raise the voltage across the electrodes of the shutter-open actuator in the shutter assembly 703 to equal or exceed the voltage necessary for actuation, $V_{at}$. At about the same time that the control matrix 700 applies $V_d$ to the shutter-open interconnect 706a of the selected column (step 806), the control matrix 700 grounds the shutter-close interconnect 706b of the column (step 808).

If, at decision block 804, it is determined that the shutter assembly 703 is to be closed, the control matrix 700 applies the data voltage $V_d$ to the shutter-close interconnect 706b (step 810) and grounds the shutter-open interconnect 706a of the column (step 812). Once the voltage across the electrodes of the desired actuator builds up to $V_{at}$, the actuator, if not previously in the desired position, actuates (step 814), moving the shutter in the shutter assembly 703 to the desired position.

After the data is written to the pixels 702 in the scan line in steps 806-812, the control matrix 700 grounds the scan-line interconnect 704 (step 814) and write-enables the next scan line (step 816). The process repeats until all pixels 702 in the control matrix 700 are addressed. In one implementation, before addressing the first scan line in the control matrix 700, a backlight to which the control matrix is affixed is turned off. Then, after all scan lines in the control matrix 700 have been addressed, the backlight is turned back on. Synchronizing the switching of the backlight off and on with the beginning and end of a period during which a frame is addressed improves the color purity of the resultant image since then the backlight is on only when all pixels are already set to their correct image state.

An actuation event is determined by noting the voltage differences that appear across the shutter-open actuator and the shutter closed actuator. For consistent actuation, generally one of these voltage differences will be kept close to zero, or at least below a certain maintenance voltage $V_m$, while the absolute value of the other voltage difference will exceed the actuation voltage. Consistent with the actuation conditions described with respect to FIGS. 2, 3, and 4, the polarities of applied voltages, such as $V_d$, can be either negative or positive, and the voltage applied to the common potential (indicated as "ground" in FIG. 7 or at step 812), can be any voltage either positive or negative.

In some implementations, it is advantageous to periodically or occasionally reverse the sign of the voltages that appear across the actuators of shutter assembly 703 without otherwise altering the method 800 of addressing the pixels. In one case, polarity reversal can be accomplished by maintaining the common electrode of all shutters 703 at a potential close to zero while reversing the polarity of the data voltage, $V_d$. In another case polarity reversal can be accomplished by setting the common voltage to $V_{common}$, where $V_{common}$ is equal to or greater than $V_{at}$, and then providing a voltage source such that the data voltage either alternates between $V_{common}$ and $2*V_{at}$ or between zero and $V_{common}$.

Similar advantageous use of polarity reversals and the use of non-zero common voltages can be applied to the control matrices 500 and 600.

The flow chart of method 800 is drawn for the case where only digital information is written into an image frame, i.e. where the shutters are intended to be either open or closed. A similar method of image frame addressing can be employed for the provision of gray scale images built upon loading analog data through data interconnects 706a and 706b. In this case, intermediate voltages are intended to produce only partial openings of the shutters 703. The voltages applied across the shutter-open actuators will tend to move the shutters in directions opposite to the motion induced by voltages across the shutter-closed actuators. There will exist, however, pairs of complementary voltages that, when applied simultaneously across these two actuators, will result in controlled and pre-determined states of partial shutter opening.

The complementary nature of the voltages supplied to either the shutter-open interconnect 706a or the shutter-closed interconnect 706b can be used to advantage if the voltage source electronics are also designed with capability for charge recycling. Taking as an example method 800, which is designed for the loading of digital information to the image frame: voltages loaded into the interconnects at steps 806 or 810 are complementary. That is, if $V_d$ is loaded into one of the interconnects, then the other interconnect is usually grounded. Changing the state of the shutter assembly 703 (e.g. from closed to open) is conceptually, then, a matter of transferring the charge stored on one actuator over to its opposing actuator. If the energy lost on each of these transitions is $Q*V_d$, where Q is the charge stored on an actuator, then considerable power savings can be derived if the stored charge is not simply dissipated as waste energy in the voltage source electronics at each transition but is instead recycled for use on the other actuator. While complete charge recycling is difficult, methods for partial recycling are available. For example, the frame addressing method 800 can provide a step where the data line interconnects 706a and 706b are shorted together within the voltage source electronics for a brief period between steps 802 and 804. For the brief period in which these interconnects are shorted they will share the stored charge, so at least a fraction of the previous charge becomes available on whichever of the data line interconnects is to be brought back into its fully charged state.

Figure 9:
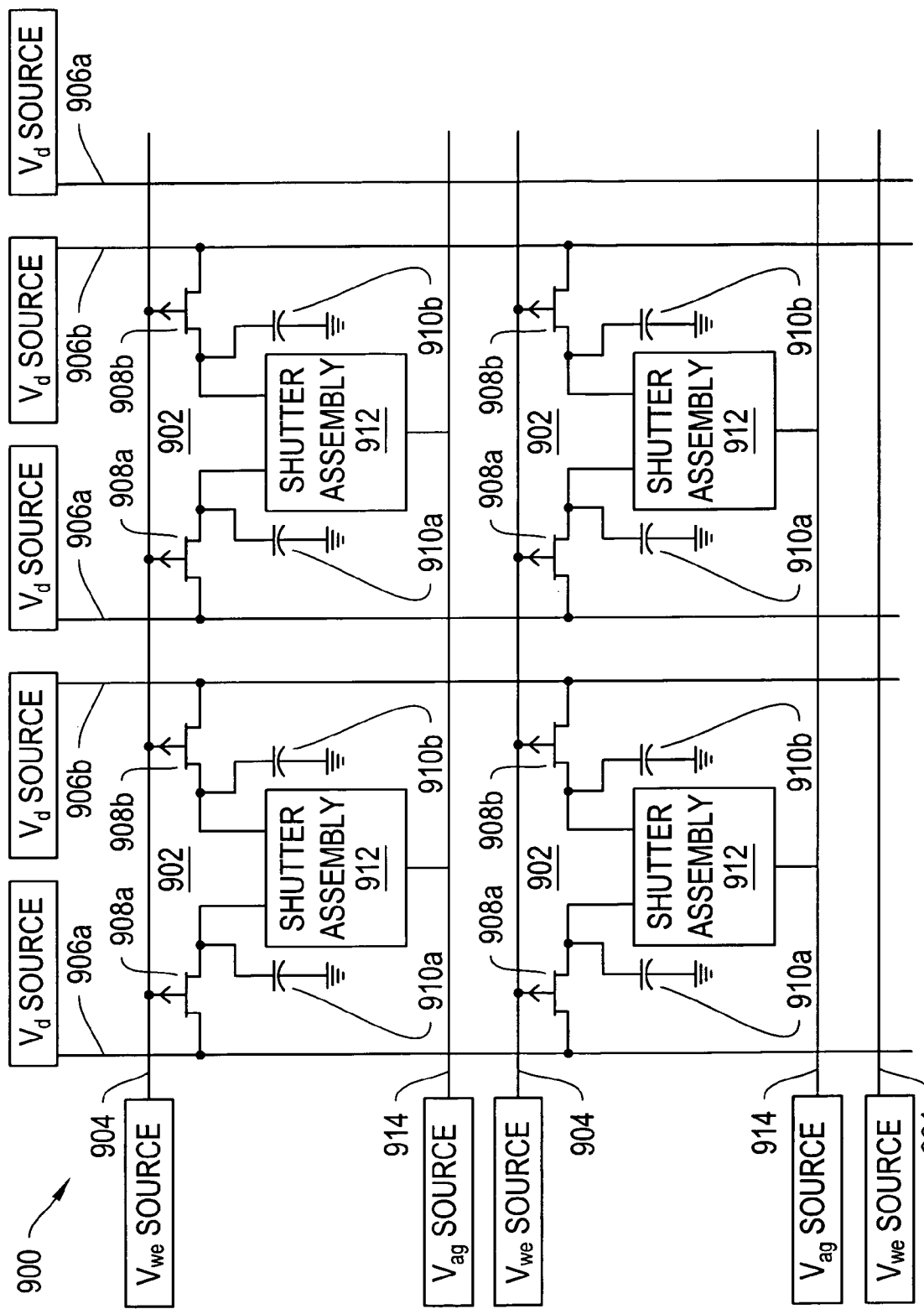
FIG. 9 is a diagram of a fourth control matrix suitable for controlling the shutter assemblies of the display apparatus of FIG. 1, according to an illustrative embodiment of the invention.

FIG. 9 is another illustrative control matrix 900 suitable for addressing an array of pixels in display device 100. The control matrix 900 is similar to the control matrix 700. That is, the control matrix 900 includes a scan-line interconnect 904 for each row of pixels in the control matrix 900 and two data interconnects, a shutter-open interconnect 906a and a shutter-close interconnect 906b, for each column of pixels 902 in the control matrix. In addition, each pixel in the control matrix 900 includes a shutter open-transistor (or optionally a diode or varistor) 908a, a shutter-close transistor (or optionally a diode or varistor) 908b, a shutter-open capacitor 910a, a shutter-close actuator 910b, and a shutter assembly 912. The shutter assembly is either mechanically and/or electrically bi-stable. The control matrix 900, however, includes an additional controllable interconnect, a global actuation interconnect 914. The global actuation interconnect 914 substantially simultaneously provides about the same voltage (a "common voltage") to pixels 902 in at least two rows and two columns of the control matrix 900. In one implementation, the global actuation interconnect 914 provides a common voltage to all pixels 902 in the control matrix 900. The higher capacitance electrode of the actuators of the shutter assemblies 912 in each pixel 902 in the control matrix 900 electrically connect to the global actuation interconnect 914 instead of to ground.

The inclusion of the global actuation interconnect 914 enables the near simultaneous actuation of pixels 902 in multiple rows of the control matrix 900. As a result, all actuators that actuate to set a given image frame (e.g., all shutters that move) can be actuated at the same time, as opposed to a row by row actuation method as described in method 800. The use of a global actuation process temporally decouples the writing of data to a pixel 902 from the actuation the shutter assembly 912 in the pixel 902.

The global actuation feature incorporated into the control matrix 900 takes advantage of the bi-stability of the shutter assemblies 912 in the control matrix 900. Actuating an electrically bi-stable shutter assembly requires that two conditions be satisfied simultaneously, that the absolute value of voltage across one electrode exceeds $V_{at}$, while the absolute value of the voltage across the other electrode is less than a maintenance voltage $V_m$. Thus, for control matrix 900, when a voltage in excess of $V_m$ is applied to one actuator of a shutter assembly 912, applying $V_{at}$ to the opposing shutter assembly is insufficient to cause the actuator to actuate.

For example, assume that the shutter-open actuator of an electrically bi-stable shutter assembly has a $V_{at}$ of 40V. At the same time, the application of 10V maintenance voltage across the electrodes of the shutter-close actuator may keep the shutter of the shutter assembly in a closed position even when 60V is applied across the electrodes of the shutter-open actuator. If a −10V bias potential is applied between the higher-capacitance electrodes of all shutter assemblies and ground via the global common interconnect, while the ground potential is applied to one of the actuation electrodes, then a data voltage of +40V can be applied to the lower-capacitance electrodes of selected actuators in the shutter assemblies, thereby yielding a +50V potential difference across those actuators, without causing the actuators to actuate. Then, by grounding the global common interconnect, the voltage across the electrodes of the selected actuators is reduced to +40V while the voltage across the opposing actuator is removed. As +40V still equals the actuation voltage of the actuator and no maintenance voltage is keeping the opposing actuator in position, the selected actuators all move in concert. Another example is described in further detail below in relation to FIG. 10.

Figure 10:
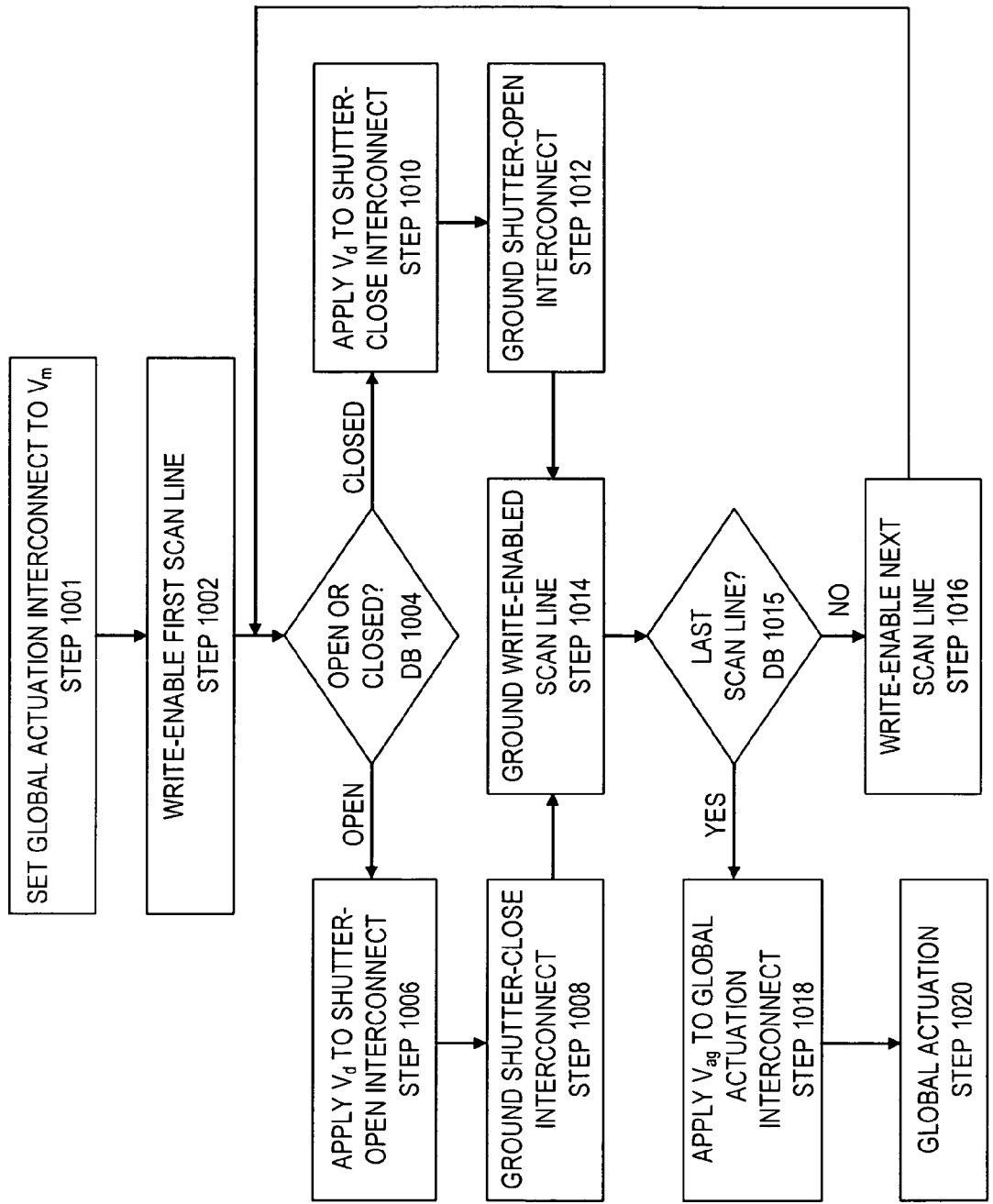
FIG. 10 is a flow chart of a method of addressing the pixels of the control matrix of FIG. 9, according to an illustrative embodiment of the invention.

FIG. 10 is flow chart of a method 1000 of addressing an image frame using the control matrix 900 of FIG. 9. The method begins by setting the global common interconnect 914 to a maintenance voltage $V_m$, e.g., ½ $V_{at}$ (step 1001) with respect to ground. Then, the control matrix 900 write-enables the first scan line in the display (step 1002). To do so, the control matrix 900 applies $V_{we}$, e.g., +45V, to a first scan-line interconnect 904 in the control matrix 900 and grounds the other scan-line interconnects 904.

The control matrix 900 then writes data to each pixel 902 in the write-enabled scan line corresponding to the desired states of those pixels in the next image frame (decision block 1004 to step 1012). The data writing process is described below in relation to a single pixel 902 in a selected column in the write-enabled scan line. At the same time that data is written to this single pixel 902, the control matrix 900 also writes data in the same fashion to the remaining pixels 902 in the write-enabled scan line.

To write data to a pixel 902, at decision block 1004, it is determined if the shutter of the shutter assembly 912 in the pixel 902 is to be in the open position in the next image frame or in the closed position. If the shutter is to be in the open position, the control matrix 900 applies a data voltage, $V_d$, to the shutter-open interconnect of the selected column (step 1006). $V_d$ is selected such that before the application of a global actuation voltage, $V_{ag}$, to the global common interconnect 914, the voltage across the shutter-open actuator in the pixel 902 remains insufficient to overcome the bias applied to the shutter-close actuator, but such that after the application of $V_{ag}$ to the global common interconnect 914, the voltage across the electrodes of the shutter-open actuator is sufficient for the shutter-open actuator to actuate. For example, if $V_{at}$ equals 40V, $V_m$ equals 20V, and $V_{ag}$ equals ground, then $V_d$ is selected to be greater than or equal to 40V, but less than the potential that would overcome $V_m$. At the same time that the control matrix 900 applies $V_d$ to the shutter-open interconnect 906a of the selected column (step 1006), the control matrix 900 grounds the shutter-close interconnect 906b of the column (step 1008).

If at decision block 1004, it is determined that the shutter is to be in the off position, the control matrix 900 applies the data voltage $V_d$ to the shutter-close interconnect 906b (step 1010) and grounds the shutter-open interconnect 906a of the column (step 1012).

After the control matrix 900 writes data to the pixels 902 in the write-enabled scan line in steps 1006-1012, the control matrix 900 grounds the currently write-enabled scan-line interconnect 904 (step 1014) and write-enables the next scan line (step 1016). The process repeats until all pixels 902 in the control matrix 900 are addressed (see decision block 1015). After all pixels in the control matrix 900 are addressed (see decision block 1015), the control matrix 900 applies the global common voltage $V_{ag}$ to the global common interconnect (step 1018), thereby resulting in a near simultaneous global actuation of the shutter assemblies 912 in the control matrix 900. Thus, for such implementations, the global common interconnect serves as a global actuation interconnect.

As with the method 800, the method 1000 may also include the synchronization of a backlight with shutter actuation. However, by using the global actuation process described above, the backlight can be kept on for a larger percentage of the time a display is in operation, therefore yielding a brighter display for the same level of driving power in a backlight. In one embodiment, a backlight is synchronized such that it is off when ever the shutters in one row of a control matrix are set for one image frame while shutters in other rows of the control matrix are set for a different image frame. In control matrices that do not employ global actuation, for every frame of video, the backlight is turned off during the entire data writing process (approximately 500 microseconds to 5 milliseconds), as each row of pixels actuates as it is addressed. In contrast, in control matrices using global actuation, the backlight can remain on while the data writing process takes place because no pixels change state until after all the data has been written. The backlight is only turned off (if at all), during the much shorter time beginning after the last scan line is written to, and ending a sufficient time after the global actuation voltage is applied for the pixels to have changed states (approximately 10 microseconds to 500 microseconds).

An actuation event in the method 1000 is determined by noting the voltage differences that appear across the shutter-open actuator and the shutter closed actuator. Consistent with the actuation conditions described with respect to FIGS. 2, 3, and 4, the polarities of applied voltages, such as $V_d$, can be either negative or positive, and the voltage applied to the global common interconnect can be any voltage either positive or negative.

In other implementations it is possible to apply the method 1000 of FIG. 10 to a selected portion of a whole array of pixels, since it may be advantageous to update different areas or groupings of rows and columns in series. In this case a number of different global actuation interconnects 914 could be routed to selected portions of the array for selectively updating and actuating different portions of the array.

In some implementations it is advantageous to periodically or occasionally reverse the sign of the voltages that appear across the actuators of shutter assembly 912 without otherwise altering the method 1000 of addressing the pixels. In one such case polarity reversal can be accomplished by reversing the signs of most of the potentials employed in Method 1000, with the exception of the write-enable voltage. In another cases voltages similar to those used in Method 1000 can be applied but with a complementary logic. Table 1 shows the differences between the nominal voltage assignments as described above for method 1000 and the voltages which could be applied in order to achieve polarity reversal on the electrodes of the shutter assemblies. In the first case, called Polarity Reversal Method 1, the voltages which appear across actuator electrodes are merely reversed in sign. Instead of applying $V_d$ to the shutter-open electrode, for instance, $-V_d$ would be applied. For the case where nMOS transistors are employed for the transistors 908a and 908b, however, a voltage shift should be employed (both gate voltages shifting down by an amount $V_d$). These gate voltage shifts ensure that the nMOS transistors operate correctly with the new voltages on the data interconnects.

TABLE 1

| Action: "Close the Shutter" | Method 1000 | Polarity Reversal Method 1 | Polarity Reveral Method 2 |
|---|---|---|---|
| Non-Enabled Row Voltage | ground | $-V_d$ | ground |
| Write-Enable Voltage | $V_{we}$ | $-V_d + V_{we}$ | $V_{we}$ |
| Voltage on shutter-closed interconnect | $V_d$ | $-V_d$ | ground |
| Voltage on shutter-open interconnect | ground | ground | $V_d$ |
| Maintenance Voltage | $V_m$ | $-V_m$ | $V_m$ |
| Global Actuation Voltage | $V_{ag}$ (near ground) | $-V_{ag}$ (near ground) | $V_d$ |

Table 1 also shows a second method, Polarity Reversal Method 2, which allows the use of similar voltages (without having to reverse signs on any interconnect drivers), but still achieves polarity reversal across all actuators. This is accomplished by driving the global actuation interconnect to the higher voltage, $V_d$, instead of toward ground as in Method 1000 in order to move selected shutters. The sequence of voltage changes in Polarity Reversal Method 2 is similar to that of Method 1000, except that a complementary logic is now employed at step 1004 when assigning voltages to the actuators of each pixel. In this Method 2, if the shutter is to be closed, then the shutter-open interconnect would be brought up to the potential $V_d$, while the shutter-closed interconnect would be grounded. In this example, after the global actuation interconnect is brought from its maintenance potential $V_m$ up to the actuation potential $V_d$, the potential across the shutter-open actuator would be near to zero (certainly less than $V_m$), while the potential across the shutter-closed actuator would be $-V_d$, sufficient to actuate the shutter to the closed position and with a polarity that is the reverse of what was applied in Method 1000. Similarly if, at step 1004, the shutter is to be opened then the shutter-closed interconnect would be brought up to the potential Vd while the shutter-open interconnect is grounded.

The control matrix 900 can alternate between the voltages used in Method 1000 and that used with the above Polarity Reversal Methods in every frame or on some other periodic basis. Over time, the net potentials applied across the actuators on shutter assemblies 1408 by the charge interconnect 1406 and the global actuation interconnect 1416 average out to about 0V.

Actuation methods, similar to method 1000, can also be applied to single-sided or elastic shutter assemblies, such as with shutter assemblies 502 in control matrix 500. Such single-sided applications will be illustrated in conjunction with FIG. 14 below.

Figure 11:
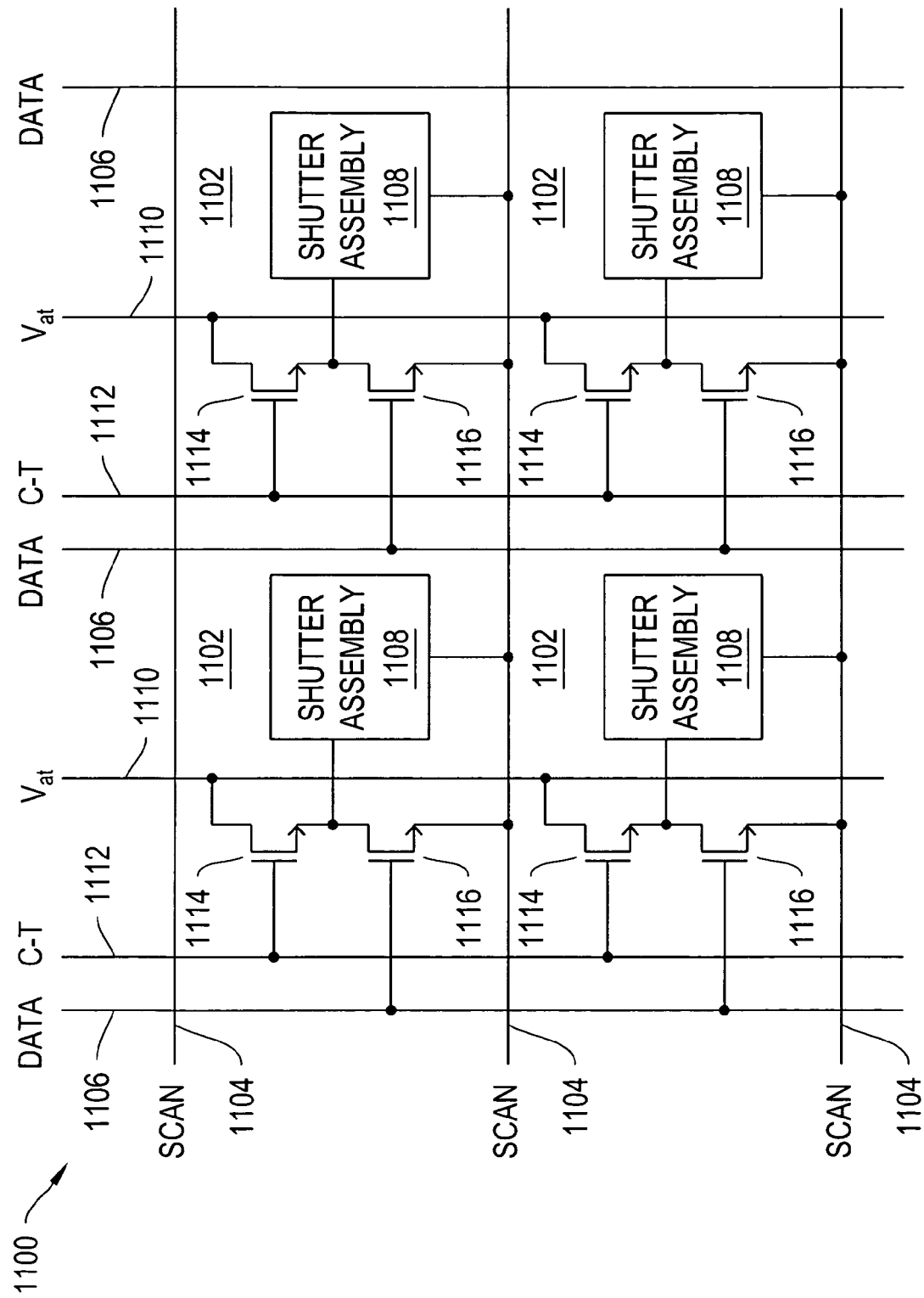
FIG. 11 is a diagram of a fifth control matrix suitable for controlling the shutter assemblies of the display apparatus of FIG. 1, according to an illustrative embodiment of the invention.

FIG. 11 is a diagram of another control matrix 1100 suitable for inclusion in the display apparatus 100. As with control matrices 700 and 900, the control matrix 1100 includes a series of scan-line interconnects 1104, with one scan-line interconnect 1104 corresponding to each row of pixels 1102 in the control matrix 1100. The control matrix 1100 includes a single data interconnect 1106 for each column of pixels 1102 in the control matrix. As such, the control matrix 1100 is suitable for controlling elastic shutter assemblies 1108, such as shutter assembly 200. As with actuator in shutter assembly 200, the actuators in the shutter assemblies 1108 in the control matrix 1100 have one higher-capacitance electrode and one lower-capacitance electrode.

In addition to the scan-line and data-interconnects 1104 and 1106, the control matrix 1100 includes a charge interconnect 1110 (also labeled as V(at)) and a charge trigger interconnect 1112 (also labeled as C-T). The charge interconnect 11100 and the charge trigger interconnect 1112 may be shared among all pixels 1102 in the control matrix 1100, or some subset thereof. For example, each column of pixels 1100 may share a common charge interconnect 1110 and a common charge trigger interconnect 1112. The following description assumes the incorporation of a globally shared charge interconnect 1110 and a globally common charge trigger interconnect 1112.

Each pixel 1102 in the control matrix 1100 includes two transistors, a charge trigger switch transistor 1114 and a discharge switch transistor 1116. The gate of the charge trigger switch transistor 1114 is electrically connected to the charge trigger interconnect 1112 of the control matrix 1100. The drain of the charge trigger switch transistor 1114 is electrically connected to the charge interconnect 1110. The charge interconnect 1110 receives a DC voltage sufficient to actuate the actuators of the shutter assembly 1108 in each pixel 1102, absent the application of any bias voltage to the scan line interconnect 1104. The source of the charge trigger switch transistor 1114 is electrically connected to the lower capacitance electrode of the actuator in the shutter assembly 1108 in the pixel 1102 and to the drain of the discharge switch transistor 1116. The gate of the discharge switch transistor 1116 is electrically connected to the data interconnect 1106 of the column of the control matrix 1100 in which the pixel 1102 is located. The source of the discharge switch transistor 1116 is electrically connected to the scan-line interconnect 1104 of the row of the control matrix 1100 in which the pixel 1102 is located. The higher-capacitance electrode of the actuator in the shutter assembly 1108 is also electrically connected to the scan-line interconnect 1104 of row corresponding to the pixel. Alternately, the higher capacitance electrode can be connected to a separate ground or common electrode.

Figure 12:
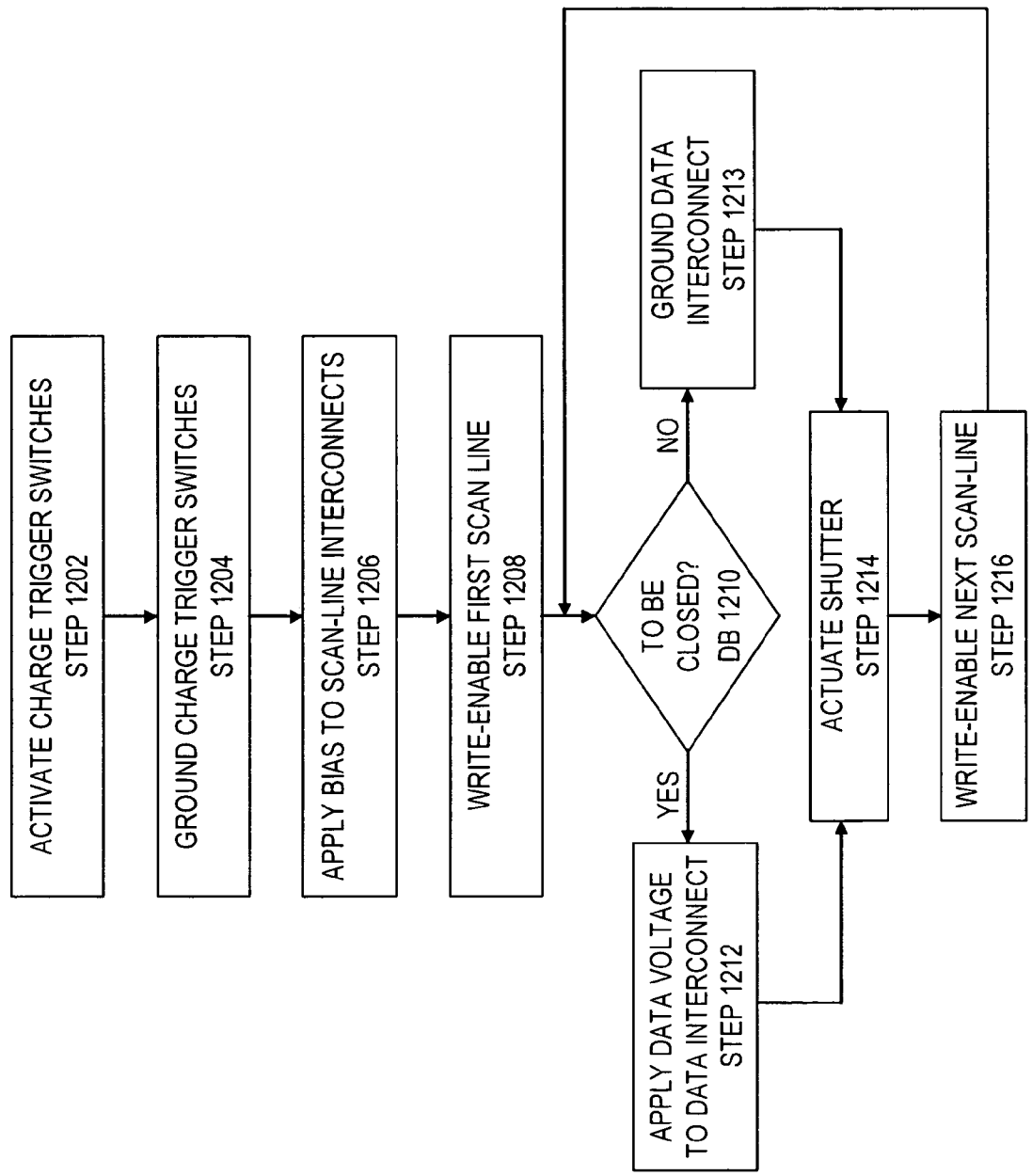
FIG. 12 is a flow chart of a method of addressing the pixels of the control matrix of FIG. 11, according to an illustrative embodiment of the invention.

FIG. 12 is a flow chart of a method 1200 of addressing the pixels incorporated into a control matrix, such as control matrix 1100, according to an illustrative embodiment of the invention. At the beginning of a frame addressing cycle, control matrix 1100 actuates all unactuated actuators of the shutter assemblies 1108 incorporated into the control matrix 1100, such that all shutter assemblies 1108 are set to the same position (open or closed) (steps 1202-1204). To do so, the control matrix 1100 applies a charge trigger voltage, e.g., 45V, to the charge trigger interconnect 1112, activating the charge trigger switch transistors 1114 of the pixels (step 1202). The electrodes of the actuators incorporated into the shutter assemblies 1108 of the pixels 1108 serve as capacitors for storing the voltage $V_{at}$ supplied over the charge interconnect 1110, e.g, 40V. The control matrix 1100 continues to apply the charge trigger voltage (step 1202) for a period of time sufficient for all actuators to actuate, and then the control matrix 1100 grounds the charge trigger switch transistor 1114 (step 1204). The control matrix 1100 applies a bias voltage $V_b$, e.g., 10V with respect to ground, to all scan-line interconnects 1104 in the control matrix 1100 (step 1206).

The control matrix 1100 then proceeds with the addressing of each pixel 1102 in the control matrix, one row at a time (steps 1208-1212). To address a particular row, the control matrix 1100 write-enables a first scan line by grounding the corresponding scan-line interconnect 1104 (step 1208). Then, at decision block 1210, the control matrix 1100 determines for each pixel 1102 in the write-enabled row whether the pixel 1102 needs to be switched out of its initial frame position. For example, if at step 1202, all shutters are opened, then at decision block 1210, it is determined whether each pixel 1102 in the write-enabled row is to be closed. If a pixel 1102 is to be closed, the control matrix 1100 applies a data voltage, for example 5V, to the data interconnect 1106 corresponding to the column in which that pixel 1102 is located (step 1212). As the scan-line interconnect 1104 for the write-enabled row is grounded (step 1208), the application of the data voltage $V_d$ to the data interconnect 1106 of the column results in a potential difference between the gate and the source of the discharge switch transistor 1116 of the correct sign and magnitude to open the channel of the transistor 1116. Once the channel of transistor 1116 is opened the charge stored in the shutter assembly actuator can be discharged to ground through the scan line interconnect 1104. As the voltage stored in the actuator of the shutter assembly 1108 dissipates, the restoring force or spring in the shutter assembly 1108 forces the shutter into its relaxed position, closing the shutter. If at decision block 1210, it is determined that no state change is necessary for a pixel 1102, the corresponding data interconnect 1106 is grounded. Although the relaxed position in this example is defined as the shutter-closed position, alternative shutter assemblies can be provided in which the relaxed state is a shutter-open position. In these alternative cases, the application of data voltage $V_d$, at step 1212, would result in the opening of the shutter.

In other implementations it is possible to apply the method 1200 of FIG. 12 to a selected portion of the whole array of pixels, since it may be advantageous to update different areas or groupings of rows and columns in series. In this case a number of different charge trigger interconnects 1112 could be routed to selected portions of the array for selectively updating and actuating different portions of the array.

As described above, to address the pixels 1102 in the control matrix 1100, the data voltage $V_d$ can be significantly less than the actuation voltage $V_{at}$ (e.g., 5V vs. 40V). Since the actuation voltage $V_{at}$ is applied once a frame, whereas the data voltage $V_d$ may be applied to each data interconnect 1106 as may times per frame as there are rows in the control matrix 1100, control matrices such as control matrix 1100 may save a substantial amount of power in comparison to control matrices which require a data voltage to be high enough to also serve as the actuation voltage.

For pixels 1102 in non-write-enabled rows, the bias voltage $V_b$ applied to their corresponding scan-line interconnects 1104 keeps the potential at their discharge transistor 1116 sources greater than the potentials at their discharge transistor 1116 gate terminals, even when a data voltage $V_d$ is applied to the data interconnect 1106 of their corresponding columns. It will be understood that the embodiment of FIG. 11 assumes the use of n-channel MOS transistors. Other embodiments are possible that employ p-channel transistors, in which case the relative signs of the bias potentials $V_b$ and $V_d$ would be reversed.

In other embodiments the discharge switch transistor 1116 can be replaced by a set of two or more transistors, for instance if the control matrix 1100 were to be built using standard CMOS technology the discharge switch transistor could be comprised of a complementary pair of nMOS and pMOS transistors.

The method 1200 assumes digital information is written into an image frame, i.e. where the shutters are intended to be either open or closed. Using the circuit of control matrix 1100, however, it is also possible to write analog information into the shutter assemblies 1108. In this case, the grounding of the scan line interconnects is provided for only a short and fixed amount of time and only partial voltages are applied through the data line interconnects 1106. The application of partial voltages to the discharge switch transistor 1116, when operated in a linear amplification mode, allows for only the partial discharge of the electrode of the shutter assembly 1108 and therefore a partial opening of the shutter.

The control matrix 1100 selectively applies the data voltage to the remaining columns of the control matrix 1100 at the same time. After all pixels have achieved their intended states (step 1214), the control matrix 1100 reapplies $V_b$ to the selected scan-line interconnect and selects a subsequent scan-line interconnect (step 1216). After all scan-lines have been addressed, the process begins again. As with the previously described control matrices, the activity of an attached backlight can be synchronized with the addressing of each frame.

Figure 13:
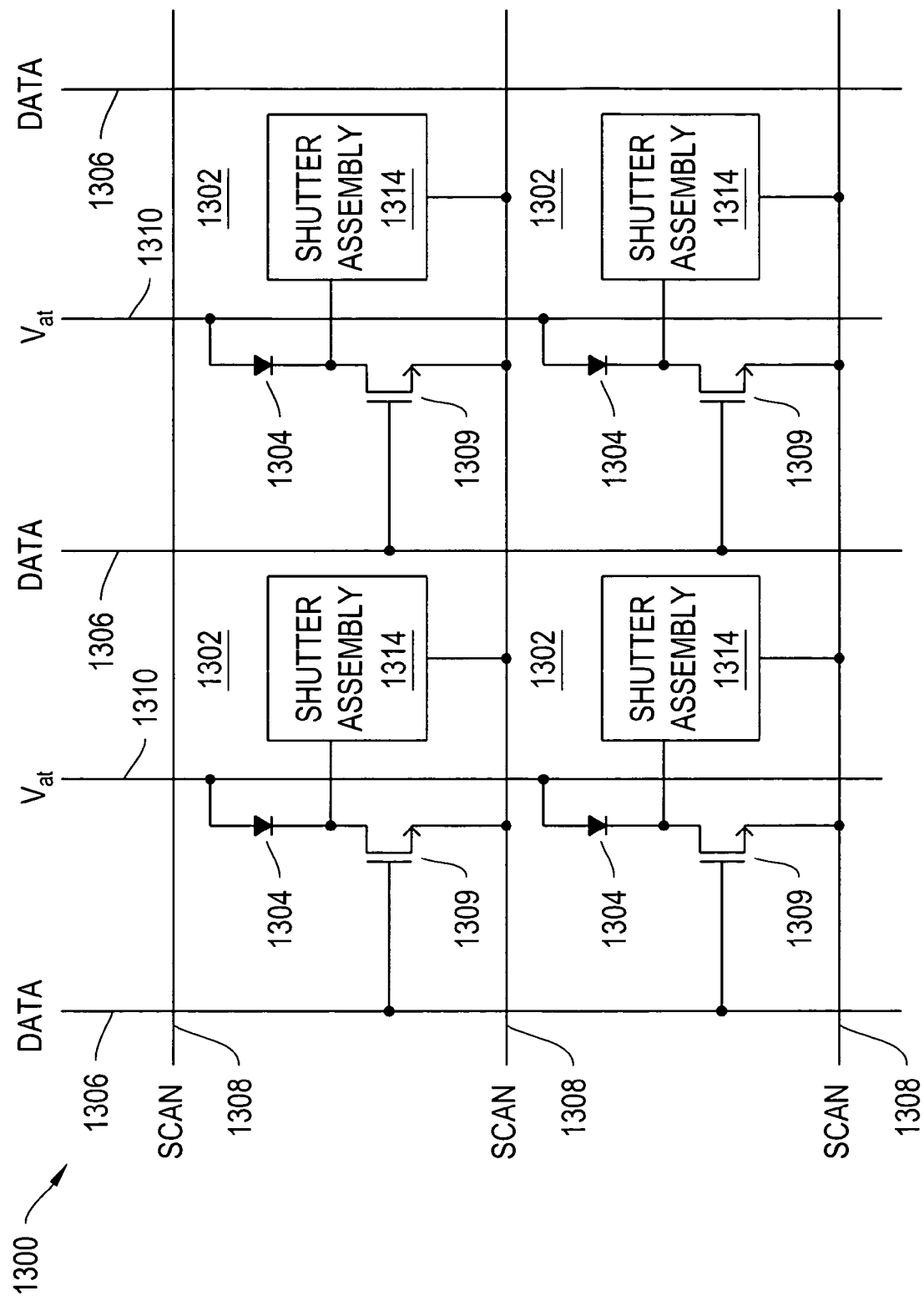
FIG. 13 is a diagram of a sixth control matrix suitable for controlling the shutter assemblies of the display apparatus of FIG. 1, according to an illustrative embodiment of the invention.

FIG. 13 is a diagram of another control matrix 1300 suitable for inclusion in the display apparatus 100, according to an illustrative embodiment of the invention. The control matrix 1300 is similar to control matrix 1100, though pixels 1302 in the control matrix 1300 include charge diodes 1304 as opposed to charge trigger switch transistors 1114, and the control matrix 1300 lacks a charge trigger interconnect 1112. More particularly, the control matrix 1300 includes one data interconnect 1306 for each column in the control matrix 1300 and one scan-line interconnect 1308 for each row in the control matrix 1300, and a discharge transistor 1309. The control matrix 1300 also includes a charge interconnect 1310 (also labeled as V(at)) similar to that incorporated into control matrix 1100.

The control matrix 1300 includes a actuation voltage source electrically connected to the charge interconnect 1310. The actuation voltage source supplies pulses of voltage at the beginning of each frame addressing cycle, allowing current to flow into the shutter assemblies 1314 of the pixels 1302 in the control matrix 1300 and thereby actuating any unactuated actuators in the shutter assemblies 1314. As a result, after the voltage pulse, all of the pixels 1302 in the control matrix 1300 are in the same state, open or closed. After the voltage pulse, when the potential of the charge interconnect 1310 has been reset to zero, the charge diode 1304 prevents the voltage stored in the shutter assemblies 1314 to be dissipated via the charge interconnect 1310. The control matrix 1300 can be controlled using a method similar to the pixel addressing method 1200. Instead of applying a voltage to the charge trigger interconnect 1112 at step 1202, the actuation voltage source supplies a voltage pulse having a duration and magnitude sufficient to open any closed shutter assemblies.

It is preferable that the higher-capacitance electrode of shutter assemblies 1108 and 1314 be connected to the scan line interconnects 1104 and 1308, while the lower-capacitance electrode be connected through transistor 1114 or through diode 1304 to the charge interconnects 1112 or 1310. The voltage changes driven onto the shutter electrodes through the charge interconnects will generally be higher in magnitude than those experienced through the scan line interconnects.

Figure 14:
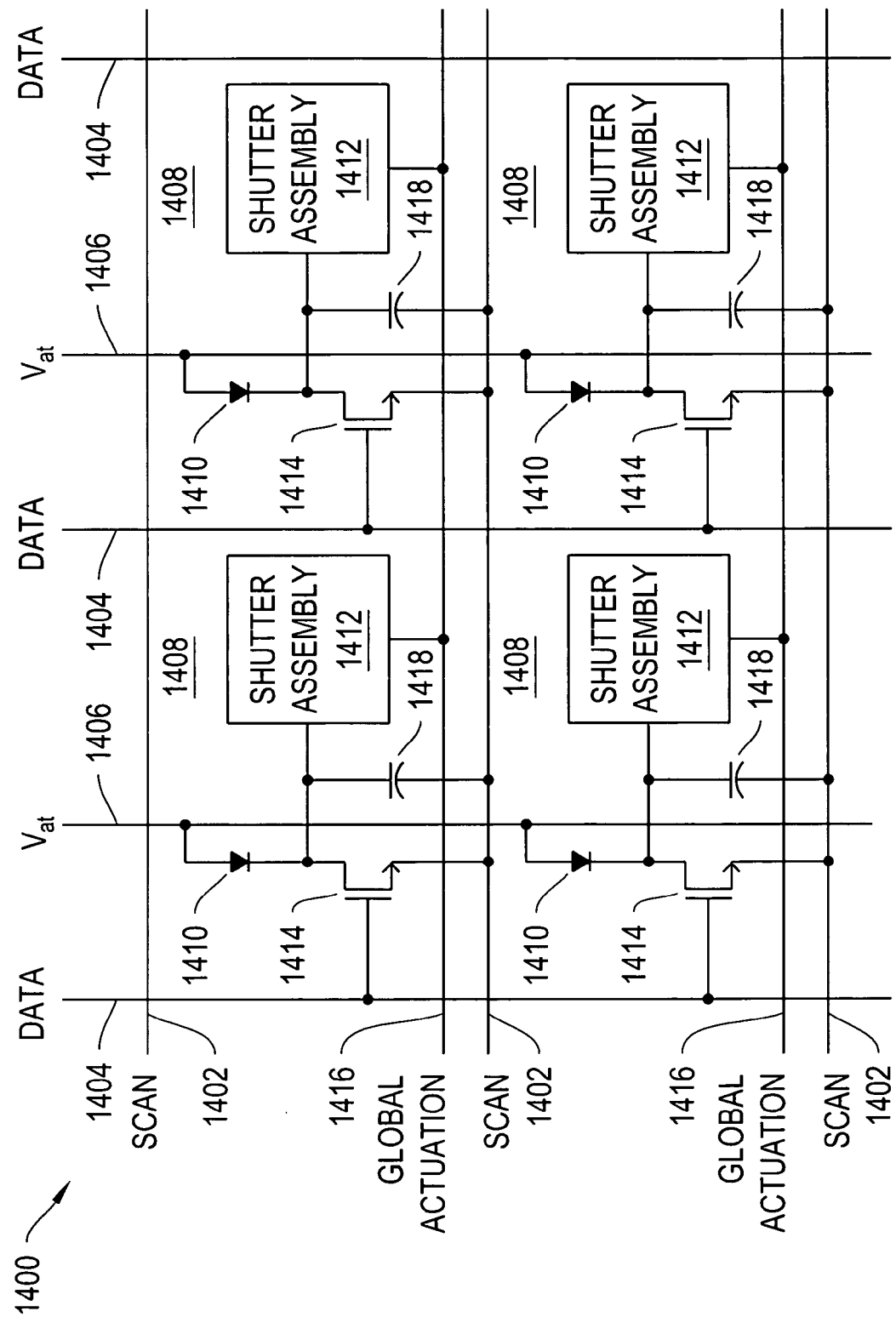
FIG. 14 is a diagram of a seventh control matrix suitable for controlling the shutter assemblies of the display apparatus of FIG. 1, according to an illustrative embodiment of the invention.

FIG. 14 is a diagram of a control matrix 1400 suitable for inclusion in the display apparatus 100. The control matrix 1400 includes the components of control matrix 1300, i.e., scan-line interconnects 1402, data-interconnects 1404, and a charge interconnect 1406. The pixels 1408 in the control matrix 1400 include a charge diode 1410, a shutter assembly 1412, and discharge transistor 1414. Control matrix 1400 also includes a global actuation interconnect 1416 for providing global actuation of the pixels 1408 in the control matrix 1400, using a method similar to that described in relation to FIGS. 9 and 10. The control matrix also includes an optional capacitor 1418, which is connected in parallel with the source and drain of the discharge transistor 1414. The capacitor helps maintain a stable voltage at one electrode of shutter assembly 1412 despite voltage changes which might be applied on the other electrode through the global actuation interconnect 1416 The interconnect 1416 is shared among pixels 1408 in multiple rows and multiple columns in the array.

The global actuation interconnect, if used in a mode similar to polarity reversal method 2 of Table 1, may be employed to ensure a 0V DC average mode of operation in addition to providing an actuation threshold voltage. To achieve 0V DC averaging, the control matrix alternates between control logics. In the first control logic, similar to that employed in the pixel addressing method 1000 and 1200, at the beginning of a frame addressing cycle, the control matrix 1400 opens the shutter assemblies 1412 of all pixels in the control matrix 1400 by storing $V_{at}$ across the electrodes of the shutter assembly 1412 actuator. The control matrix 1400 then applies a bias voltage to lock the shutter assemblies 1412 in the open state. Control matrix 1400 applies a bias voltage, e.g., $½ V_{at}$, which is greater than $V_m$, via the global actuation interconnect 1416. Then, to change the state of a shutter assembly 1412, when the row of pixels 1408 in which the shutter assembly 1412 is located is write-enabled, the control matrix 1400 discharges the stored $V_{at}$ in the shutter assembly 1412. The maintenance voltage keeps the shutter assembly 1412 open until the global actuation interconnect 1416 is grounded.

In the second control logic, which is similar to the polarity reversal method 2 of Table 1, instead of the control matrix changing the voltage applied to the global actuation interconnect 1416 from $½ V_{at}$ to ground, the control matrix changes the voltage applied to the global actuation interconnect 1416 from $½ V_{at}$ to $V_{at}$. Thus, to release a shutter in a shutter assembly 1412 to its relaxed state, the voltage applied via the charge diode 1410 must be maintained, as opposed to discharged. Therefore, in the second control logic, the control matrix 1400 discharges the stored $V_{at}$ from shutter assemblies that are to remain open, as opposed to those that are closed. The control matrix 1400 can alternate between the control logics every frame or on some other periodic basis. Over time, the net potentials applied across the actuators of the shutter assemblies 1408 by the charge interconnect 1406 and the global actuation interconnect 1416 average out to 0V.

Figure 15:
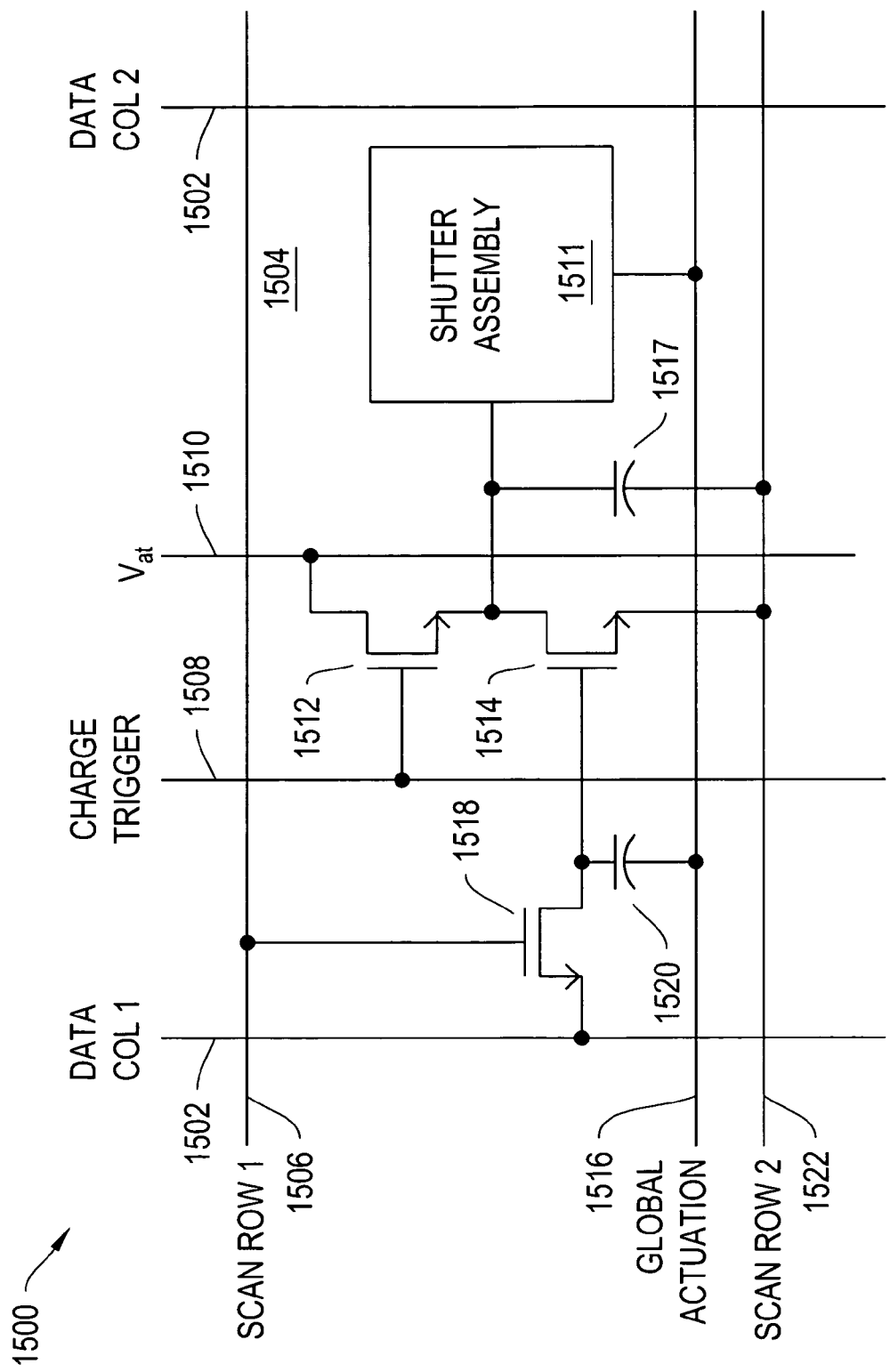
FIG. 15 is a diagram of an eighth control matrix suitable for controlling the shutter assemblies of the display apparatus of FIG. 1, according to an illustrative embodiment of the invention.

FIG. 15 is a diagram of still another suitable control matrix 1500 for inclusion in the display apparatus 100, according to an illustrative embodiment of the invention. The control matrix 1500 is similar to the control matrix 1100 of FIG. 11. Control matrix 1500 includes a data interconnect 1502 for each column of pixels 1504 in the control matrix 1500 and a scan-line interconnect 1506 for each row of pixels 1504 in the control matrix 1500. The control matrix 1500 includes a common charge trigger interconnect 1508 and a common charge interconnect 1510. The pixels 1504 in the control matrix 1500 each include an elastic shutter assembly 1511, a charge trigger switch transistor 1512 and a discharge switch transistor 1514, as described in FIG. 11. Control matrix 1500 also incorporates a global actuation interconnect 1516 and its corresponding functionality described in FIG. 9 in relation to control matrix 900. Control matrix 1500 also incorporates an optional voltage stabilizing capacitor 1517 which is connected in parallel with the source and drain of discharge switch transistor 1514.

Each pixel 1504 of control matrix 1500, also includes a third transistor, a write-enable transistor 1518, and a data store capacitor 1520. The scan-line interconnect 1506 for a row of pixels 1504 connects to the gates of the write-enable transistor 1518 incorporated into each pixel 1504 in the row. The data interconnects 1502 for the columns of the control matrix 1500 electrically connect to the source terminals of the write-enable transistors 1518 of the pixels 1504 in the column. The drain of the write-enable transistors 1518 in each pixel 1504 electrically connect in parallel to the data store capacitor 1520 and the gate terminal of the discharge trigger transistor 1514 of the respective pixels 1504.

The operation of the control matrix 1500 includes elements in common with each of the methods 1000 and 1200. At the beginning of an frame addressing cycle, a voltage is applied to the charge trigger interconnect 1508 and the charge interconnect 1510 of the control matrix 1500 to build up a potential, $V_{at}$, on one shutter assembly 1511 actuator electrode of each pixel 1504 in the control matrix 1500 to open any closed shutter assemblies 1511. These steps are similar to those performed in steps 1202 and 1204 of FIG. 12. Each row is then write-enabled in sequence, except instead of performing the write-enable as a grounding of corresponding scan-line interconnects as was done with respect to FIGS. 11, 13, and 14, the control matrix 1500 applies a write-enabling voltage $V_{we}$ to the scan-line interconnect 1506 corresponding to each row. While a particular row of pixels 1504 is write-enabled, the control matrix 1500 applies a data voltage to each data interconnect 1508 of the control matrix 1500 corresponding to a column that incorporates a pixel 1502 in the write-enabled row that is to be closed. The application of $V_{we}$ to the scan-line interconnect 1506 for the write-enabled row turns on the write-enable transistors 1518 of the pixels 1504 in the corresponding scan line. The voltages applied to the data interconnects 1502 are thereby allowed to be stored on the data store capacitors 1520 of the respective pixels 1504.

If the voltage stored on the data store capacitor 1520 of a pixel 1504 is sufficiently greater than ground, e.g., 5V, the discharge switch transistor 1514 is activated, allowing the charge applied to the corresponding shutter assembly 1511 via the charge trigger switch transistor 1514 to discharge. The discharge of the larger voltage, $V_{at}$, stored in the shutter assembly 1511, however, can take more time than is needed to store the relatively small data voltage on the data store capacitor 1520. By storing the data voltage on the data store capacitor 1520, the discharge and the mechanical actuation process can continue even after the control matrix 1500 grounds the scan-line interconnect 1506, thereby isolating the charge stored on the capacitor 1520 from its corresponding data interconnect 1502. In contrast to the discharge process presented by the control matrices in FIGS. 11, 13, and 14, therefore, the control matrix 1500 regulates the discharge switch 1514 (for controlling application of the actuation voltage $V_{at}$ on shutter assembly 1511) by means of data voltage which is stored on the capacitor 1520, instead of requiring real time communication with signals on the data interconnect 1502.

In alternative implementations, the storage capacitor 1520 and write-enable transistor 1518 can be replaced with alternative data memory circuits, such as a DRAM or SRAM circuits known in the art.

In contrast to the circuits shown in FIGS. 11, 13, and 14, the charge on the electrodes of shutter assembly 1511, when discharged, does not flow to ground by means of the scan line interconnect that corresponds to pixel 1504. Instead the source of the discharge switch transistor 1514 is connected to the scan line interconnect 1522 of the pixel in the row below it. When not write-enabled the scan line interconnects 1522 in control matrix 1500 are held at or near to the ground potential; they can thereby function as effective sinks for discharge currents in neighboring rows.

The control matrix 1500 also includes the capability for global actuation, the process or method of which is similar to that described in FIG. 10. The shutters in discharged pixels 1504 are kept in position due to the application of a maintenance voltage $V_m$, e.g., $\frac{1}{2} V_{at}$, to the global actuation interconnect 1516. After all rows have been addressed, the control matrix 1500 grounds the global actuation interconnect 1516, thereby releasing the shutters of all discharged shutter assemblies 1511 substantially in unison.

Figure 16:
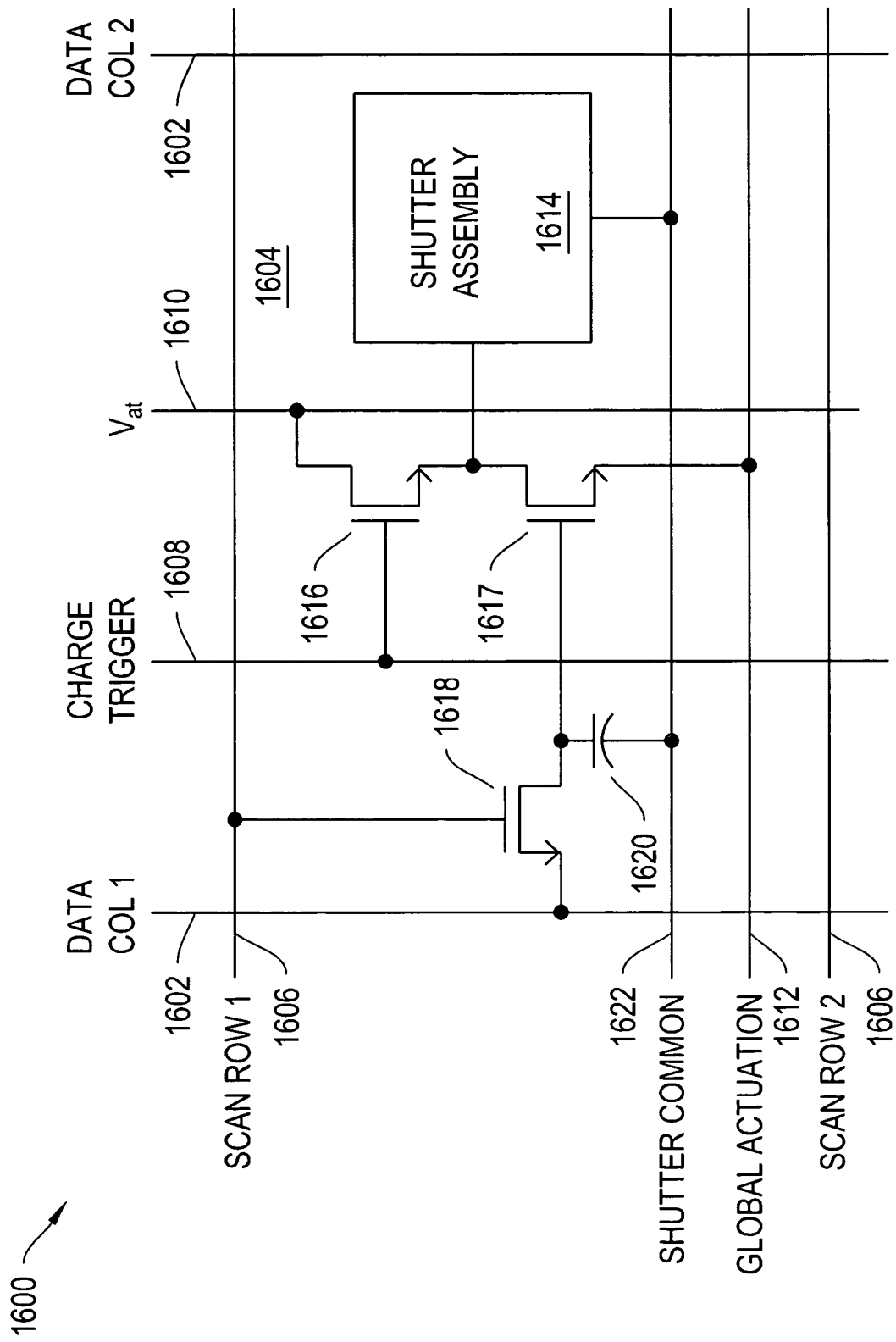
FIG. 16 is a diagram of a ninth control matrix suitable for controlling the shutter assemblies of the display apparatus of FIG. 1, according to an illustrative embodiment of the invention.

FIG. 16 is a diagram of still another suitable control matrix 1600 for inclusion in the display apparatus 100, according to an illustrative embodiment of the invention. The control matrix 1600 is similar to the control matrix 1500 of FIG. 15. Control matrix 1600 includes a data interconnect 1602 for each column of pixels 1604 in the control matrix 1600, a scan-line interconnect 1606 for each row of pixels 1604 in the control matrix 1600. The control matrix 1600 includes a common charge trigger interconnect 1608, a common charge interconnect 1610, and a global actuation interconnect 1612. The pixels 1604 in the control matrix 1600 each include an elastic shutter assembly 1614, a charge trigger switch transistor 1616, a discharge switch transistor 1617, a write-enable transistor 1618, and a data store capacitor 1620 as described in FIG. 15. The control matrix 1600 also includes a shutter common interconnect 1622 which is distinct from the global actuation interconnect 1612. These interconnects 1612 and 1622 are shared among pixels 1604 in multiple rows and multiple columns in the array.

In operation the control matrix 1600 performs the same functions as those of control matrix 1500, but by different means or methods. Most particularly, the method for accomplishing global actuation in control matrix 1600 is unique from that performed in control matrices 900, 1400, or 1500. In the previous methods, the global actuation interconnect was connected to one electrode of the shutter assembly, and applying a maintenance voltage $V_m$ to it prevented shutter actuation. In control matrix 1600, however, the global actuation interconnect 1612 is connected to the source of the discharge switch transistor 1617. Maintaining the global actuation interconnect 1612 at a potential significantly above that of the shutter common interconnect 1622 prevents the turn-on of any of the discharge switch transistors 1617, regardless of what charge is stored on capacitor 1620. Global actuation in control matrix 1600 is achieved by bringing the potential on the global actuation interconnect 1612 to the same potential as the shutter common interconnect 1622, making it possible for those discharge switch transistors 1617s to turn-on in accordance to the whether a data voltage has been stored on capacitor 1620 or not. Control matrix 1600, therefore, does not depend on electrical bi-stability in the shutter assembly 1614 in order to achieve global actuation.

Applying partial voltages to the data store capacitor 1620 allows partial turn-on of the discharge switch transistor 1617 during the time that the global actuation interconnect 1612 is brought to its actuation potential. In this fashion, an analog voltage is created on the shutter assembly 1614, for providing analog gray scale.

In the control matrix 1600, in contrast to control matrix 1500, the higher-capacitance electrode of the actuators in the shutter assemblies 1614 electrically connect to the shutter common interconnect 1622, instead of the global actuation interconnect 1612. In operation, the control matrix alternates between two control logics as described in relation to control matrix 1400 of FIG. 14. For control matrix 1600, however, when the control matrix switches between the control logics, the control matrix 1600 switches the voltage applied to the shutter common interconnect 1622 to either ground or $V_{at}$, depending on the selected control logic, instead of switching the global actuation voltage applied to the global actuation interconnect, as is done by control matrix 1400.

As in the control matrix 1300 of FIG. 13, a simple diode and/or an MIM diode can be substituted for the charge trigger transistor 1616 to perform the switching or charge loading function for each pixel in the array.

Figure 17:
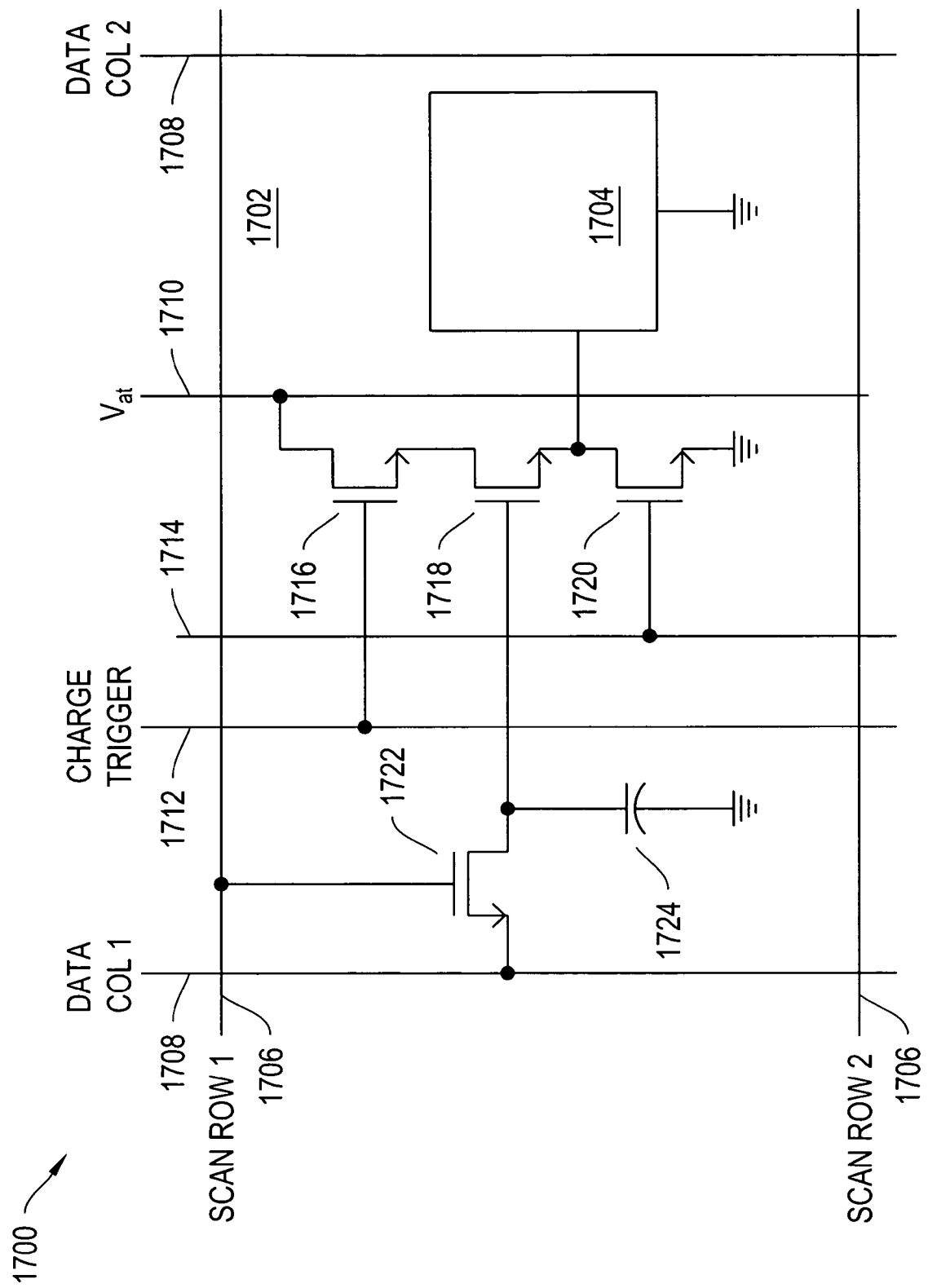
FIG. 17 is a diagram of a tenth control matrix suitable for controlling the shutter assemblies of the display apparatus of FIG. 1, according to an illustrative embodiment of the invention.

FIG. 17 is still a further suitable control matrix 1700 for inclusion in the display apparatus 100, according to an illustrative embodiment of the invention. Control matrix 1700 controls an array of pixels 1702 that include elastic shutter assemblies 1704. The control matrix 1700 preferably includes shutter assemblies that are not bi-stable, so that the shutter assemblies 1704 are better controlled in an analog fashion. That is, the application of a particular voltage to the actuator of one of the shutter assemblies 1704 results in a known incremental shutter displacement.

Control matrix 1700 includes one scan-line interconnect 1706 for each row of pixels 1702 in the control matrix 1700 and one data interconnect 1708 for each column of pixels 1702 in the control matrix 1700. The control matrix 1700 also includes a charge interconnect 1710, a charge trigger interconnect 1712, and a discharge trigger interconnect 1714. These interconnects 1710, 1712, and 1714 are shared amongst all or a subset of the pixels 1702 in the control matrix 1700. Each pixel 1702 in the control matrix 1700 includes four transistors, a charge trigger transistor 1716, a grayscale transistor 1718, a discharge transistor 1720, and a write-enable transistor 1722. The gate of the charge trigger transistor 1716 electrically connects to the charge trigger interconnect 1712. Its drain electrically connects to the charge interconnect 1710, and its source electrically connects to the grayscale transistor 1718. The gate of the grayscale transistor 1718 electrically connects, in parallel, to a data store capacitor 1724 and the write-enable transistor 1722. The source of the grayscale transistor 1718 electrically connects to the discharge transistor 1720. The gate of the discharge transistor 1720 electrically connects to the discharge interconnect 1714, and its source is grounded. Referring back to the write-enabling transistor 1722, its gate electrically connects to its corresponding scan-line interconnect 1706, and its drain electrically connects to its corresponding data interconnect 1708.

The control matrix 1700 can be utilized to provide analog gray scale to the display apparatus 100. In operation, at the beginning of a frame addressing cycle, the control matrix 1700 applies a voltage to the discharge trigger interconnect 1714, turning on the discharge transistor 1720. Any voltage stored in the actuators of the shutter assemblies 1704 in the pixels 1702 is discharged, releasing the shutters in the shutter assemblies 1704 to their rest positions. The control matrix 1700 then grounds the discharge trigger interconnect 1714. Subsequently, the control matrix 1700, in sequence applies a write-enabling voltage $V_{we}$ to each scan-line interconnect 1706, turning on the write-enabling transistors 1722 of the pixels 1702 in each corresponding row of the control matrix 1700. As the write-enabling transistor 1722 for a given row is turned on, the control matrix 1700 applies voltage pulses to each of the data-interconnects 1708 to indicate the desired brightness of each pixel 1702 in the write-enabled row of pixels 1702. After the addressing sequence is complete, the control matrix then applies a voltage to the charge trigger interconnect 1712 which turns on the charge trigger transistor 1716 so that all electrodes can be charged and all pixels actuated simultaneously.

Brightness of a pixel 1702 is determined by the duration or the magnitude of the voltage pulse applied to its corresponding data interconnect 1708. While the voltage pulse is applied to the data interconnect 1708 of the pixel, current flows through the write-enabling transistor 1722, building up a potential on the data store capacitor 1724. The voltage on the capacitor 1724 is used to control the opening of the conducting channel in the grayscale transistor 1718. This channel remains open so long as the gate-to-source voltage exceeds a certain threshold voltage. Eventually, during the charging cycle, the potential on the electrode of shutter assembly 1704 will rise to match the potential stored on the capacitor 1724, at which point the grayscale transistor will turn off. In this fashion the actuation voltage stored on the shutter assembly can be made to vary in proportion to the analog voltage stored on capacitor 1724. The resulting electrode voltage causes an incremental displacement of the shutter in the shutter assembly 1704 proportional to the resultant voltage. The shutter remains displaced from its rest position until the discharge trigger interconnect 1714 is powered again at the end of the frame addressing cycle.

As in the control matrix 1300 of FIG. 13, a simple diode and/or an MIM diode can be substituted for the charge trigger transistor 1716 to perform the switching or charge loading function for each pixel in the array.

Figure 18:
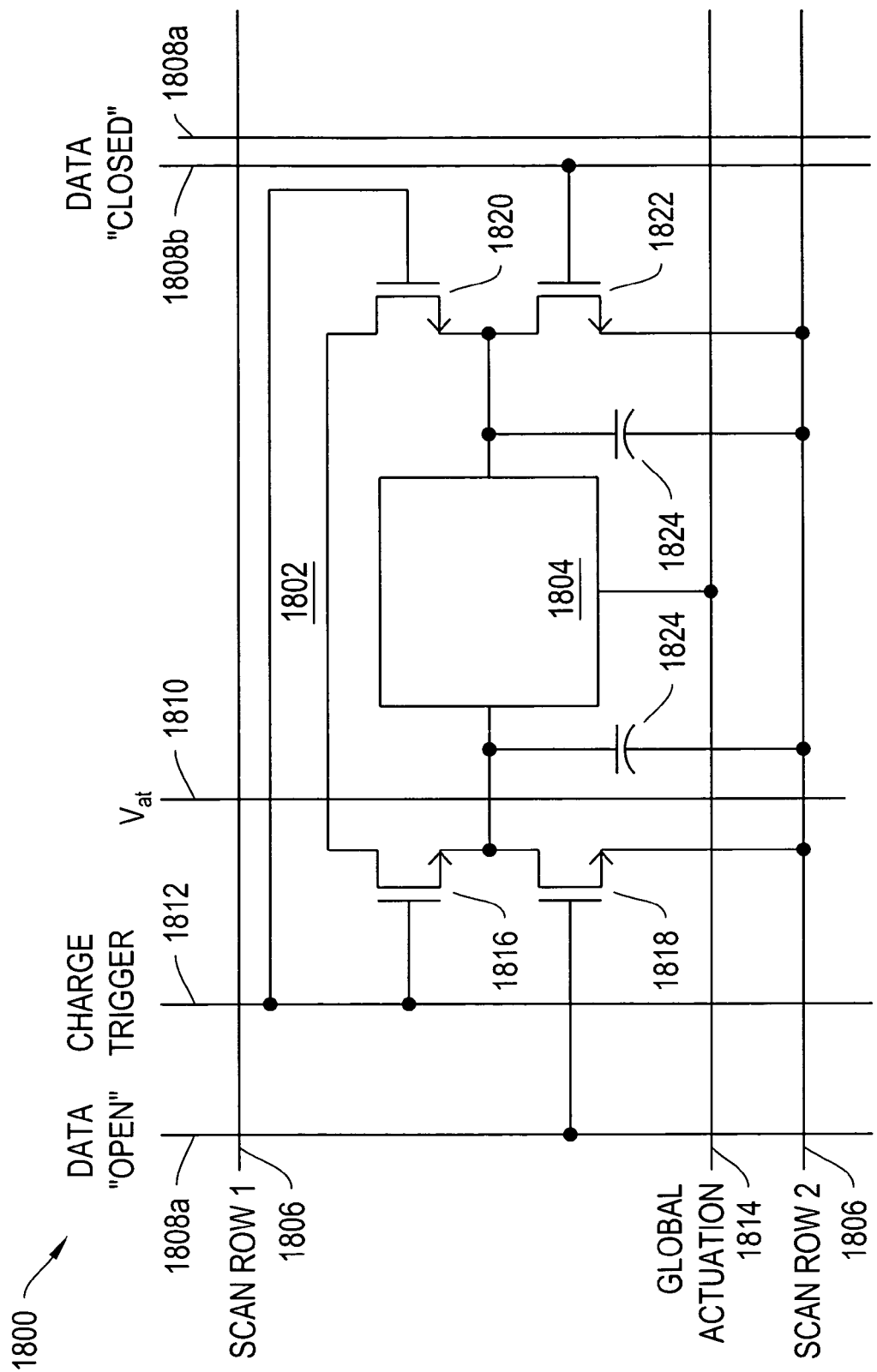
FIG. 18 is a diagram of an eleventh control matrix suitable for controlling the shutter assemblies of the display apparatus of FIG. 1, according to an illustrative embodiment of the invention.

FIG. 18 is yet another suitable control matrix 1800 for inclusion in the display apparatus 100, according to an illustrative embodiment of the invention. Control matrix 1800 controls an array of pixels 1802 that include dual-actuator shutter assemblies 1804 (i.e., shutter assemblies with both shutter-open and shutter-close actuators). The actuators in the shutter assemblies 1804 can be made either electrically bi-stable or mechanically bi-stable.

The control matrix 1800 includes a scan-line interconnect 1806 for each row of pixels 1802 in the control matrix 1800. The control matrix 1800 also includes two data interconnects, a shutter-open interconnect 1808a and a shutter-close interconnect 1808b, for each column of pixels 1802 in the control matrix 1800. The control matrix 1800 further includes a charge interconnect 1810, a charge trigger interconnect 1812, and a global actuation interconnect 1814. These interconnects 1810, 1812, and 1814 are shared among pixels 1802 in multiple rows and multiple columns in the array. In one implementation (the one described in more detail below), the interconnects 1810, 1812, and 1814 are shared among all pixels 1802 in the control matrix 1800.

Each pixel 1802 in the control matrix includes a shutter-open charge transistor 1816, a shutter-open discharge transistor 1818, a shutter-close charge transistor 1820, and a shutter-close discharge transistor 1822. The control matrix also incorporates two voltage stabilizing capacitors 1824, which are connected, one each, in parallel with the source and drain of the discharge transistors 1818 and 1822. At the beginning of each frame addressing cycle, the control matrix 1800 applies a maintenance voltage, $V_m$, e.g., ½ the voltage needed to actuate the shutter assemblies, $V_{at}$, to the global actuation interconnect 1814. The maintenance voltage locks the shutter assemblies 1804 into their current states until a global actuation is initiated at the end of the frame addressing cycle. The control matrix 1800 then applies a voltage to the charge trigger interconnect 1812, turning on the shutter-open and shutter-close transistors 1816 and 1820 of the pixels 1802 in the control matrix 1800. The charge interconnect 1810, in one implementation, carries a DC voltage equal to or greater than $V_{at}$, e.g., 40V.

As each row of pixels 1802 in the control matrix 1800 is addressed, the control matrix 1800 write-enables a row of pixels 1802 by grounding its corresponding scan-line interconnect 1806. The control matrix 1800 then applies a data voltage, $V_d$, e.g., 5V, to either the shutter-open interconnect 1808a or the shutter-close interconnect 1808b corresponding to each column of pixels 1802 in the control matrix 1800. If $V_d$ is applied to the shutter-closed interconnect 1808b of a column, the voltage stored on the shutter-close actuator of the corresponding shutter assembly 1804 is discharged via the shutter-close discharge transistor 1822. Similarly if $V_d$ is applied to the shutter-open interconnect 1808a of a column, the voltage stored on the shutter-open actuator of the corresponding shutter assembly 1804 is discharged via the shutter-open discharge transistor 1818. Generally, to ensure proper actuation, only one of the actuators, either the shutter-closed actuator or the shutter-open actuator, is allowed to be discharged for any given shutter assembly in the array.

After all rows of pixels 1802 are addressed, the control matrix 1800 globally actuates the pixels 1802 by changing the potential on the global actuation interconnect 1814 from $V_m$ to ground. The change in voltage releases the actuators from their locked in state to switch to their next state, if needed. If the global actuation interconnect were to be replaced with a constant voltage ground or common interconnect, i.e. if the global actuation method is not utilized with the control matrix 1800, then the voltage stabilizing capacitors 1824 may not be necessary.

As in the control matrix 1400 of FIG. 14, a simple diode and/or an MIM diode can be substituted for both the shutter-open charge transistor 1816 and the shutter-close charge transistor 1820.

Alternatively, it is possible to take advantage of the bistable nature of shutter assembly 1804 and substitute a resistor for both the shutter-open charge transistor 1816 and the shutter-close charge transistor 1820. When operated with a resistor, one relies on the fact that the RC charging time constant associated with the resistor and the capacitance of the actuator in the shutter assembly 1804 can be much greater in magnitude than the time necessary for discharging the actuator through either the shutter-open discharge transistor 1818 or the shutter-close discharge transistor 1822. In the time interval between when the actuator of the shutter assembly 1804 is discharged through one of the discharge transistors and when the actuator is re-charged through the resistor and the charge interconnect 1810, the correct voltage differences can be established across the actuators of the shutter assembly 1804 and the shutter assembly can be caused to actuate. After each of the open and closed actuators of the shutter assembly 1804 have been re-charged through the resistor, the shutter assembly 1804 will not re-actuate since either or both of the actuators now effectively holds the appropriate maintenance voltage, i.e, a voltage greater than $V_m$.

Figure 19:
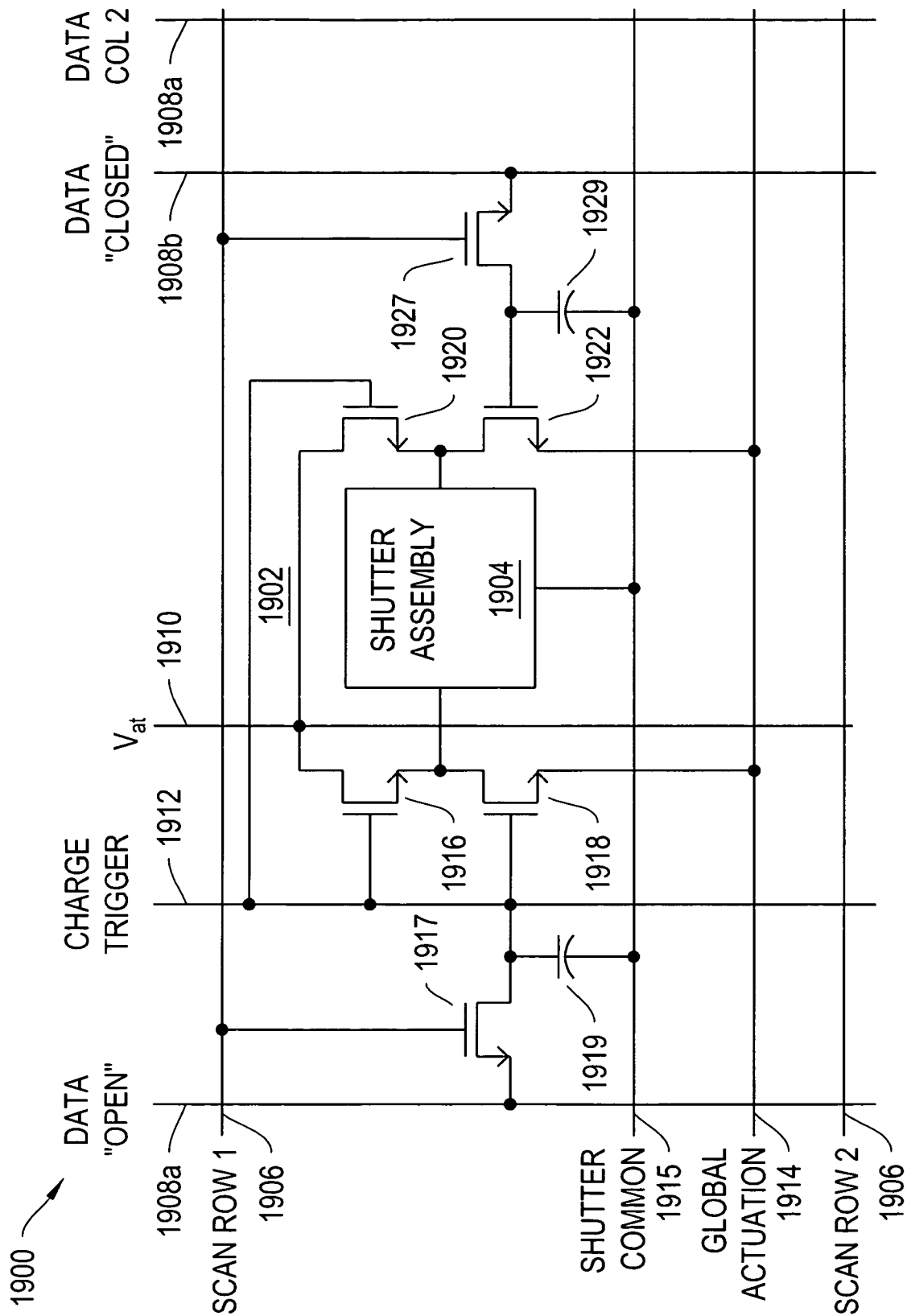
FIG. 19 is a diagram of a twelfth control matrix suitable for controlling the shutter assemblies of the display apparatus of FIG. 1, according to an illustrative embodiment of the invention.

FIG. 19 is yet another suitable control matrix 1900 for inclusion in the display apparatus 100, according to an illustrative embodiment of the invention. Control matrix 1900 controls an array of pixels 1902 that include dual-actuator shutter assemblies 1904 (i.e., shutter assemblies with both shutter-open and shutter-close actuators). The actuators in the shutter assemblies 1904 can be made either electrically bi-stable or mechanically bi-stable.

The control matrix 1900 includes a scan-line interconnect 1906 for each row of pixels 1902 in the control matrix 1900. The control matrix 1900 also includes two data interconnects, a shutter-open interconnect 1908a and a shutter-close interconnect 1908b, for each column of pixels 1902 in the control matrix 1900. The control matrix 1900 further includes a charge interconnect 1910, a charge trigger interconnect 1912, and a global actuation interconnect 1914, and a shutter common interconnect 1915. These interconnects 1910, 1912, 1914 and 1915 are shared among pixels 1902 in multiple rows and multiple columns in the array. In one implementation (the one described in more detail below), the interconnects 1910, 1912, 1914 and 1915 are shared among all pixels 1902 in the control matrix 1900.

Each pixel 1902 in the control matrix includes a shutter-open charge transistor 1916, a shutter-open discharge transistor 1918, a shutter-open write-enable transistor 1917, and a data store capacitor 1919 as described in FIGS. 16 and 18. Each pixel 1902 in the control matrix includes a shutter-close charge transistor 1920, and a shutter-close discharge transistor 1922, a shutter-close write-enable transistor 1927, and a data store capacitor 1929.

At the beginning of each frame addressing cycle the control matrix 1900 applies a voltage to the charge trigger interconnect 1912, turning on the shutter-open and shutter-close transistors 1916 and 1920 of the pixels 1902 in the control matrix 1900. The charge interconnect 1910, in one implementation, carries a DC voltage equal to or greater than $V_{at}$, e.g., 40V.

Each row is then write-enabled in sequence, as was described with respect to control matrix 1500 of FIG. 15. While a particular row of pixels 1902 is write-enabled, the control matrix 1900 applies a data voltage to either the shutter-open interconnect 1908a or the shutter-close interconnect 1908b corresponding to each column of pixels 1902 in the control matrix 1900. The application of $V_{we}$ to the scan-line interconnect 1906 for the write-enabled row turns on both of the write-enable transistors 1917 and 1927 of the pixels 1902 in the corresponding scan line. The voltages applied to the data interconnects 1908a and 1908b are thereby allowed to be stored on the data store capacitors 1919 and 1929 of the respective pixels 1902. Generally, to ensure proper actuation, only one of the actuators, either the shutter-closed actuator or the shutter-open actuator, is allowed to be discharged for any given shutter assembly in the array.

In control matrix 1900 the global actuation interconnect 1914 is connected to the source of the both the shutter-open discharge switch transistor 1918 and the shutter-close discharge transistor 1922. Maintaining the global actuation interconnect 1914 at a potential significantly above that of the shutter common interconnect 1915 prevents the turn-on of any of the discharge switch transistors 1918 or 1922, regardless of what charge is stored on the capacitors 1919 and 1929. Global actuation in control matrix 1900 is achieved by bringing the potential on the global actuation interconnect 1914 to the same potential as the shutter common interconnect 1915, making it possible for the discharge switch transistors 1918 or 1922 to turn-on in accordance to the whether a data voltage has been stored on ether capacitor 1919 or 1920. Control matrix 1900, therefore, does not depend on electrical bi-stability in the shutter assembly 1904 in order to achieve global actuation.

Applying partial voltages to the data store capacitors 1919 and 1921 allows partial turn-on of the discharge switch transistors 1918 and 1922 during the time that the global actuation interconnect 1914 is brought to its actuation potential. In this fashion, an analog voltage is created on the shutter assembly 1904, for providing analog gray scale.

In operation, the control matrix alternates between two control logics as described in relation to control matrix 1600 of FIG. 16.

As in the control matrix 1300 of FIG. 13, simple MIM diodes or varistors can be substituted for the charge trigger transistor 1616 to perform the switching or charge loading function for each pixel in the array. Also, as in control matrix 1800 of FIG. 18 it is possible to substitute a resistor for both the shutter-open charge transistor 1916 and the shutter-close charge transistor 1920.

Generally speaking any of the control matrices 1100, 1300, 1400, 1500, or 1700, which were illustrated through the use of single-actuated or elastic shutter assemblies, can be adapted advantageously for use with a dual-actuated shutter assemblies such as 1904 by reproducing the control circuit in mirror fashion for each of the open and closed actuators. As shown in method 800 of FIG. 8, the data supplied to the data-open interconnects and the data-closed interconnects will often be complementary, i.e. If a logical "1" is supplied to the data-open interconnect then a logical "0" will typically be supplied to the data closed interconnect. In additional alternative implementations, the control matrices can be modified to replace the transistors with varistors.

In alternative implementations, the control matrix keeps track of the prior position of each pixel and only applies positions to the data interconnects corresponding to a pixel if the state of the pixel for the next image frame is different than the prior position. In another alternative embodiment, the pixels include mechanically bi-stable shutter assemblies instead of just electrically bi-stable shutter assemblies. In such an embodiment, the charge trigger transistors can be replaced with resistors and the charge trigger interconnect can be omitted from the control matrix, as described above in relation to FIG. 18. The dual control logic used by control matrix 1400 may also be utilized in other implementations of control matrix 1800.

Gray Scale Techniques

Field Sequential Color

The display apparatus 100 provides high-quality video images using relatively low power. The optical throughput efficiency of a shutter-based light valve can be an order of magnitude higher than afforded by liquid crystal displays, because there is no need for polarizers or color filters in the production of the image. As described in U.S. patent application Ser. No. 11/218,690, filed on Sep. 2, 2005, a regenerative light guide can be designed which allows for 75% of the light produced in a backlight to be made available to a viewer.

Without the use of color filters, one method for producing video images in a shutter-based display is the use of field-sequential color. Color filters reduce the optical efficiency by >60% through absorption in the filters. Displays utilizing field sequential color instead use a backlight which produces pure red, green and blue light in an ordered sequence. A separate image is generated for each color. When the separate color images are alternated at frequencies in excess of 50 Hz, the human eye averages the images to produce the perception of a single image with a broad and continuous range of colors. Efficient backlights can now be produced that allow fast switching between pure colors from either light-emitting diode (LED) sources or electro-luminescent sources.

The control matrices illustrated in FIGS. 5, 6, 7, 9, 11, 13-19 provide means for generating color-specific images (color sub-frame images), with accurate gray-tones, and the means for switching between color images in rapid fashion.

Formation of accurate images with field-sequential color can be improved by synchronization between the backlight and the pixel addressing process, especially since it requires a finite period of time to switch or reset each pixel between the required states of each color sub-frame. Depending on the control matrix used to address and actuate the pixels, if the option of global actuation is not employed, then the image controller may need to pause at each row or scan line of the display long enough for the mechanical switching or actuation to complete in each row. If the backlight were to broadly illuminate the whole display in a single color while the display controller was switching states, row by row, between 2 color images, then the resulting contrast would be confused.

Consider two examples illustrating the blanking times that can be employed with the backlight during resetting of an image between colors in a synchronized display. If the shutters require 20 microseconds to actuate or move between open and closed states, if the shutters are actuated in a row-by-row fashion, and if there are 100 rows, then it would require 2 milliseconds to complete the addressing. The synchronized backlight might then be turned-off during those 2 milliseconds. Note that if the display runs at a 60 Hz frame rate with 3 colors per frame, then there is only 5.6 msec allowed per color sub-frame and, in this example, the backlight would be off 36% of the time.

Alternately, when using a global actuation scheme for switching between color sub-frames, the same resetting of the image would require only 20 microseconds for the simultaneous movement of all shutters between images. The requirements for shutter speed are now substantially relaxed. If, during the color reset, the backlight were to be off for as much as 100 microseconds, the percentage of illumination time at 60 Hz frame rate is now better than 98%. Assuming a 100 microsecond image refresh time, it is now possible to increase the frame rate to 120 Hz with no substantial loss in illumination time. Using a frame rate of 120 Hz substantially reduces image artifacts induced by field sequential color, such as color breakup in fast moving video images.

Gray Scale

The number of unique colors available in the display is dependant in part on the levels of gray scale that are available within each of the three color images. Four principle methods of producing gray scale and combinations thereof are applicable to the transverse shutter displays.

Analog Gray Scale

The first method of producing gray scale is an analog method, by which the shutters are caused to only partially obstruct an aperture in proportion to the application of a partial actuation voltage. Transverse shutters can be designed such that the percent of transmitted light is proportional to an actuation voltage, for instance through control of the shape of the actuation electrodes as described above in relation to FIG. 2 and in more detail in U.S. patent application Ser. No. 11/251,035.

For analog gray scale, the display apparatus is equipped with a digital to analog converter such that the voltage delivered to the pixels is proportional to the intended gray scale level. The proportional voltage on each actuator is maintained throughout the period of an image frame such that the proportional shutter position is maintained throughout the illumination period. The optional use of a capacitor placed in parallel with the actuators in FIGS. 2 and 17 helps to ensure that, even though some charge may leak from the pixel during the time of illumination, the voltage does not change appreciably so as to alter the shutter position during the period of illumination.

The analog gray scale has the advantage of requiring only 1 shutter in motion per pixel and the setting of only 1 image frame during the period of each color illumination. The data rates and addressing speeds for analog gray scale are therefore the least demanding amongst all alternative methods of gray scale.

Time Division Gray Scale

With proper design of the transverse shutter, a low voltage switching can be achieved which is fast. Transversely driven shutter assemblies, as described in U.S. patent application Ser. No. 11/251,035, can be built having actuation times in the range of 3 microseconds to 100 microseconds. Such rapid actuation makes possible the implementation of time division gray scale, wherein the contrast is achieved by controlling the relative on-times or duty cycles of the actuated shutters. A time division gray scale can be implemented using digital gray scale coding, in that control matrices incorporating bistable shutter assemblies recognize two states of shutter actuation, on or off. Gray scale is achieved by controlling the length of time a shutter is open.

The switching times can be appreciated by assuming the case of a 60 Hz frame rate with field sequential color. Each color sub-frame is allotted 5.6 msec. If the available time interval were to be divided into 63 segments (6-bit gray scale per color), then the smallest increment of on-time for each image, known as the least significant bit time (LSB), would be 88 microseconds. If an image for the LSB time-bit were to be constructed and displayed using a global actuation scheme, then the actuation of all shutters would need to be completed in significantly less than the 88 microsecond LSB time. If the display is addressed in a row-by-row basis then the time available for reset at each row is considerably less. For a display with 100 rows, the available actuation time can be less than 0.5 microseconds per row. A number of controller algorithms are possible for relaxing the time intervals required for addressing shutters in a row-by-row scheme (see for example N. A. Clark et. al., Ferroelectrics, v. 46, p. 97 (2000).), but in any case the time required for shutter actuation in the 6-bit gray scale example is considerably less than 20 microseconds.

Achieving multiple bits of gray scale through the use of time division multiplexing requires significant power in the addressing circuitry, since the energy lost in the actuation cycle is $\frac{1}{2}CV^2$ for each pixel through each refresh or addressing cycle in the control scheme (C is the capacitance of the pixel plus control electrodes and V is the actuation voltage). The circuit diagrams of FIGS. 11 and 13-19 reduce power requirements by decoupling and reducing the addressing voltages (the voltages required on the scan lines and data lines) from the actuation voltages (the voltages required to move a shutter).

Area Division Gray Scale

Another method that can reduce the addressing speed and power requirements of the time division gray scale is to allow for multiple shutters and actuators per pixel. A 6 bit binary time-division scheme (63 required time slots) can be reduced to a 5 bit time scheme (31 required time slots) by adding the availability of an additional gray scale bit in the spatial or area domain. The additional spatial bit can be accomplished with 2 shutters and apertures per pixel, especially if the shutters/apertures have unequal area. Similarly, if 4 shutters (with unequal areas) are available per pixel then the number of required time bits can be reduced to 3 with the result still being an effective 64 levels of gray scale per color.

Illumination Gray Scale

Another method that can relax the speed and/or real estate requirements for the above gray scale techniques is use of an illumination gray scale. The contrast achieved through the illumination of the color image can be adjusted or given finer gray levels by means of altered intensity from the backlight. If the backlight is capable of fast response (as in the case of LED backlights), then contrast can be achieved by either altering the brightness of the backlight or the duration of its illumination.

Let us consider one example, wherein it is assumed that the control matrix utilizes a global actuation scheme and that time division gray scale is accomplished through construction and display of distinct time-bit images illuminated for differing lengths of time. Take for example a 4-bit binary time coding scheme accomplished by dividing the color frame into 15 time slots. The image that is constructed for the shortest (LSB) time should be held for $\frac{1}{15}$ of the available frame time. In order to expand to a 5-bit coding scheme one could, in the time domain, divide the color frame into 31 time slots, requiring twice the addressing speed. Alternately, one could assign only 16 time slots and assign to one of these time slots an image that is illuminated at only $\frac{1}{2}$ the brightness or by a backlight that is flashed for an on period of only $\frac{1}{31}$ of the frame time. As many as 3 additional bits of gray scale can be added on top of a 4 bit time-division coding scheme by adding these short time-duration images accompanied by partial illumination. If the partial illumination bits are assigned to the smallest of the time slices, then a negligible loss of average projected brightness will result.

Hybrid Gray Scale Schemes

The four principle means of gray scale are analog gray scale, time division gray scale, area division gray scale, and illumination gray scale. It should be understood that useful control schemes can be constructed by combinations of any of the above methods, for instance by combining the use of time division, area division and the use of partial illumination. Further divisions of gray scale are also available through interpolation techniques, also known as dither. Time domain dither includes the insertion of LSB time bits only in an alternating series of color frames. Spatial domain dither, also known as half-toning, involves the control or opening of a specified fraction of neighboring pixels to produce localized areas with only partial brightness.

The invention may be embodied in other specific forms without departing from the spirit or essential characteristics thereof. The forgoing embodiments are therefore to be considered in all respects illustrative, rather than limiting of the invention.

What is claimed is:

1. A display apparatus comprising:
    a shutter assembly comprising a shutter and a drive electrode, configured such that in response to the generation of a potential difference between the shutter and the drive electrode, the shutter is electrostatically drawn towards the drive electrode; and
    a control matrix including,
        a first voltage interconnect for applying a first voltage to one of the shutter and the drive electrode, and
        a second voltage interconnect for applying a second voltage to the other of the shutter and the drive electrode, thereby generating the potential difference between the shutter,
        wherein the first voltage has a higher magnitude than the second voltage and the first voltage is applied to the one of the shutter and the drive electrode having a lower capacitance.

2. The display apparatus of claim 1, wherein the second voltage is at or near ground.

3. The display apparatus of claim 1, wherein the second voltage varies between ground and about one half the first voltage.

4. The display apparatus of claim 1, wherein the second voltage interconnect is a global actuation interconnect.

5. The display apparatus of claim 1, wherein the shutter assembly comprises a second drive electrode connected to a third voltage interconnect.

6. The display apparatus of claim 5, wherein application of the first voltage to the drive electrode results in the opening of the shutter and application of a third voltage to the second drive electrode closes the shutter.

7. The display apparatus of claim 1, wherein the application of the first voltage to the drive electrode opens the shutter.

8. The display apparatus of claim 1, wherein the application of the first voltage to the drive electrode absent the application of the second voltage opens the shutter.

9. The display apparatus of claim 1, wherein application of the second voltage to the shutter prevents movement of the shutter in response to the application of the first voltage.

10. The display apparatus of claim 1, wherein the shutter assembly comprises a mechanical support for limiting the range of motion of the shutter substantially to a movement plane parallel to at which a light source is directed.

11. The display apparatus of claim 10, wherein the shutter is electrostatically drawn substantially in the movement plane.

12. The display apparatus of claim 10, wherein the shutter is electrostatically drawn substantially in the movement plane.

13. The display apparatus of claim 1, wherein the application of the first voltage to the drive electrode opens the shutter.

14. The display apparatus of claim 1, wherein the application of the first voltage to the drive electrode absent the application of the second voltage opens the shutter.

15. The display apparatus of claim 1, wherein application of the second voltage to the shutter prevents movement of the shutter in response to the application of the first voltage.

16. The display apparatus of claim 1, wherein the shutter assembly comprises a mechanical support for limiting the range of motion of the shutter substantially to a movement plane parallel to at which a light source is directed.

17. A method of forming an image, comprising:
providing a shutter assembly comprising a shutter and a drive electrode, configured such that in response to the generation of a potential difference between the shutter and the drive electrode, the shutter is electrostatically drawn towards the drive electrode; and
applying a first voltage to one of the shutter and the drive electrode;
applying a second voltage to the other of the shutter and the drive electrode, thereby generating the potential difference between the shutter,
wherein the first voltage has a higher magnitude than the second voltage and the first voltage is applied to the one of the shutter and the drive electrode having a lower capacitance.

18. The method of claim 17, wherein the second voltage is at or near ground.

19. The method of claim 17, comprising varying the second voltage between ground and about one half the first voltage.

20. The method of claim 19, wherein the shutter assembly forms part of a pixel in an array of pixel, and varying the second voltage provides for global actuation of a plurality of pixels in the array of pixels.

21. The method of claim 17, wherein the shutter assembly comprises a second drive electrode connected to a third voltage interconnect.

22. The method of claim 21, applying the first voltage to the drive electrode opens the shutter and applying a third voltage to the second drive electrode closes the shutter.

* * * * *